US011849724B2

(12) United States Patent
Singh et al.

(10) Patent No.: US 11,849,724 B2
(45) Date of Patent: Dec. 26, 2023

(54) LIQUID FERTILIZER-DISPERSIBLE COMPOSITIONS AND METHODS THEREOF

(71) Applicant: Bayer CropScience LP, St. Louis, MO (US)

(72) Inventors: Milind Singh, Apex, NC (US); David A. Long, Chapel Hill, NC (US); Aveen Alkhatib, Davis, CA (US)

(73) Assignee: Bayer CropScience LP, St. Louis, MO (US)

( * ) Notice: Subject to any disclaimer, the term of this patent is extended or adjusted under 35 U.S.C. 154(b) by 457 days.

(21) Appl. No.: 16/639,521

(22) PCT Filed: Aug. 15, 2018

(86) PCT No.: PCT/US2018/000145
§ 371 (c)(1),
(2) Date: Feb. 14, 2020

(87) PCT Pub. No.: WO2019/035881
PCT Pub. Date: Feb. 21, 2019

(65) Prior Publication Data
US 2021/0127684 A1 May 6, 2021

Related U.S. Application Data

(60) Provisional application No. 62/546,733, filed on Aug. 17, 2017, provisional application No. 62/553,486, filed on Sep. 1, 2017.

(51) Int. Cl.
| | | |
|---|---|---|
| *A01N 63/22* | (2020.01) | |
| *A01N 63/23* | (2020.01) | |
| *A01N 63/25* | (2020.01) | |
| *A01N 63/30* | (2020.01) | |
| *A01N 25/22* | (2006.01) | |
| *C05G 3/60* | (2020.01) | |
| *C05G 3/70* | (2020.01) | |
| *C05G 5/27* | (2020.01) | |
| *C05G 3/50* | (2020.01) | |
| *A01N 25/04* | (2006.01) | |
| *A01N 43/14* | (2006.01) | |
| *A01N 43/40* | (2006.01) | |
| *A01N 51/00* | (2006.01) | |
| *C05C 1/00* | (2006.01) | |
| *C05C 9/00* | (2006.01) | |
| *C05G 1/00* | (2006.01) | |

(52) U.S. Cl.
CPC ............ *A01N 25/22* (2013.01); *A01N 25/04* (2013.01); *A01N 43/14* (2013.01); *A01N 43/40* (2013.01); *A01N 51/00* (2013.01); *A01N 63/22* (2020.01); *A01N 63/23* (2020.01); *A01N 63/25* (2020.01); *A01N 63/30* (2020.01); *C05C 1/00* (2013.01); *C05C 9/00* (2013.01); *C05G 1/00* (2013.01); *C05G 3/50* (2020.02); *C05G 3/60* (2020.02); *C05G 3/70* (2020.02); *C05G 5/27* (2020.02)

(58) Field of Classification Search
CPC ........ A01N 25/22; A01N 25/04; A01N 43/14; A01N 43/40; A01N 51/00; A01N 63/22; A01N 63/23; A01N 63/25; A01N 63/30; A01N 25/02; C05C 1/00; C05C 9/00; C05G 1/00; C05G 3/50; C05G 3/60; C05G 3/70; C05G 5/27
See application file for complete search history.

(56) References Cited

U.S. PATENT DOCUMENTS

| | | |
|---|---|---|
| 4,879,837 A | 11/1989 | Capizzi et al. |
| 5,405,953 A | 4/1995 | Banker et al. |
| 8,048,916 B2 | 11/2011 | Uekawa et al. |
| 9,185,915 B2 * | 11/2015 | Guilhabert-Goya ... C07K 14/32 |
| 9,883,676 B2 | 2/2018 | Beau et al. |
| 10,159,257 B2 | 12/2018 | Beau et al. |
| 10,499,656 B2 | 12/2019 | Beau et al. |
| 10,703,775 B2 | 7/2020 | Kimmelshue et al. |
| 2014/0349377 A1 * | 11/2014 | Lauraeus ................. C12N 1/20 |
| | | 435/253.6 |
| 2016/0227782 A1 | 8/2016 | Oevreboe et al. |
| 2020/0054023 A1 | 2/2020 | Beau et al. |

(Continued)

FOREIGN PATENT DOCUMENTS

| | | |
|---|---|---|
| CN | 102910979 B | 7/2014 |
| CN | 104470359 A | 3/2015 |

(Continued)

OTHER PUBLICATIONS

Grover, M. et al., Molecular and Biochemical Approaches for Characterization of Antifungal Trait of a Potent Biocontrol Agent Bacillus subtilis RP24, 2010, Curr. Microbiology, vol. 60, pp. 99-106. (Year: 2010).*

(Continued)

*Primary Examiner* — Alton N Pryor

(57) ABSTRACT

The present disclosure relates to the field of agrochemical compositions and formulations. In an aspect, the present disclosure provides for a composition in combination with a fibril or microfibril or nanofibril structuring agent. In yet another aspect, the disclosure provides for a composition comprising: (a) an agricultural bioactive material, a fungicide, insecticide, herbicide, and/or plant growth regulator; (b) a fibril or microfibril or nanofibril structuring agent; and (c) optionally, an auxiliary surface active agent. The disclosure further provides for a comprising a composition described herein mixed or combined with a liquid fertilizer.

15 Claims, 34 Drawing Sheets

(56) References Cited

U.S. PATENT DOCUMENTS

Figure 1A:
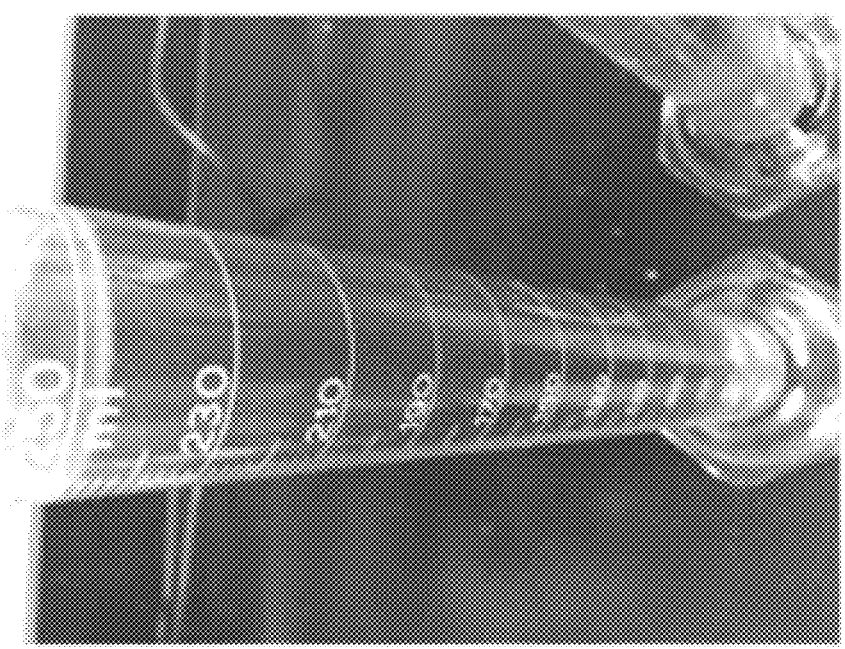
Figure 1A:
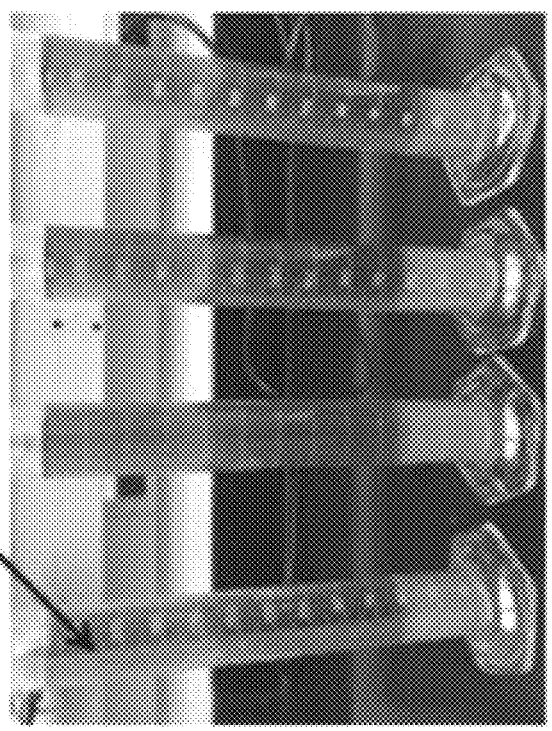
Figure 1B:
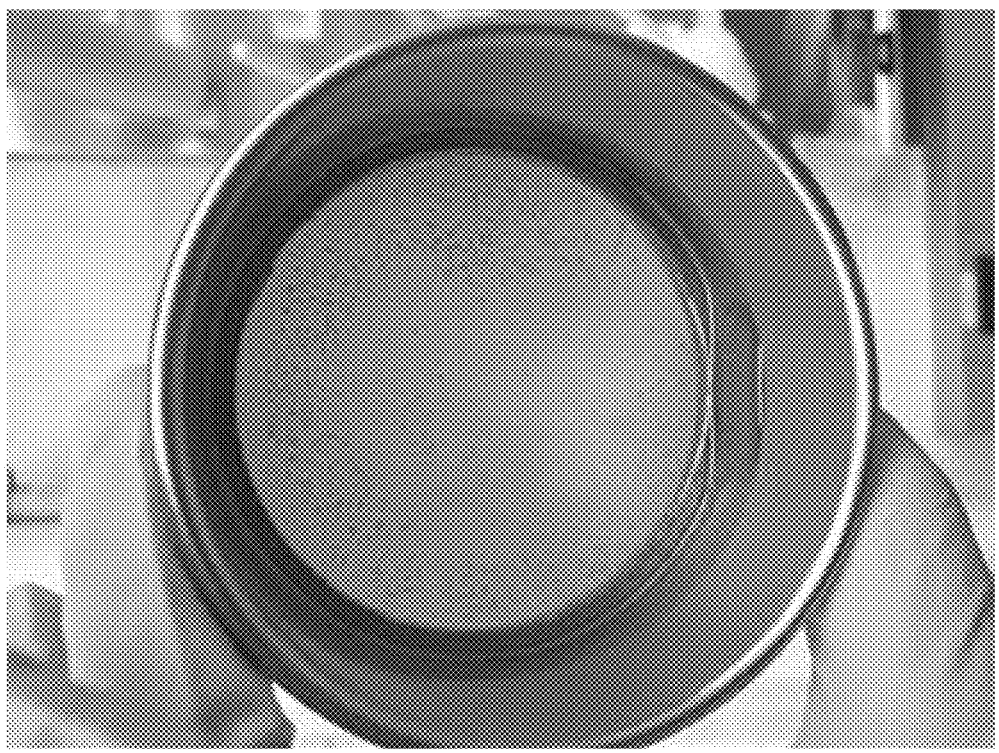
Figure 1B:
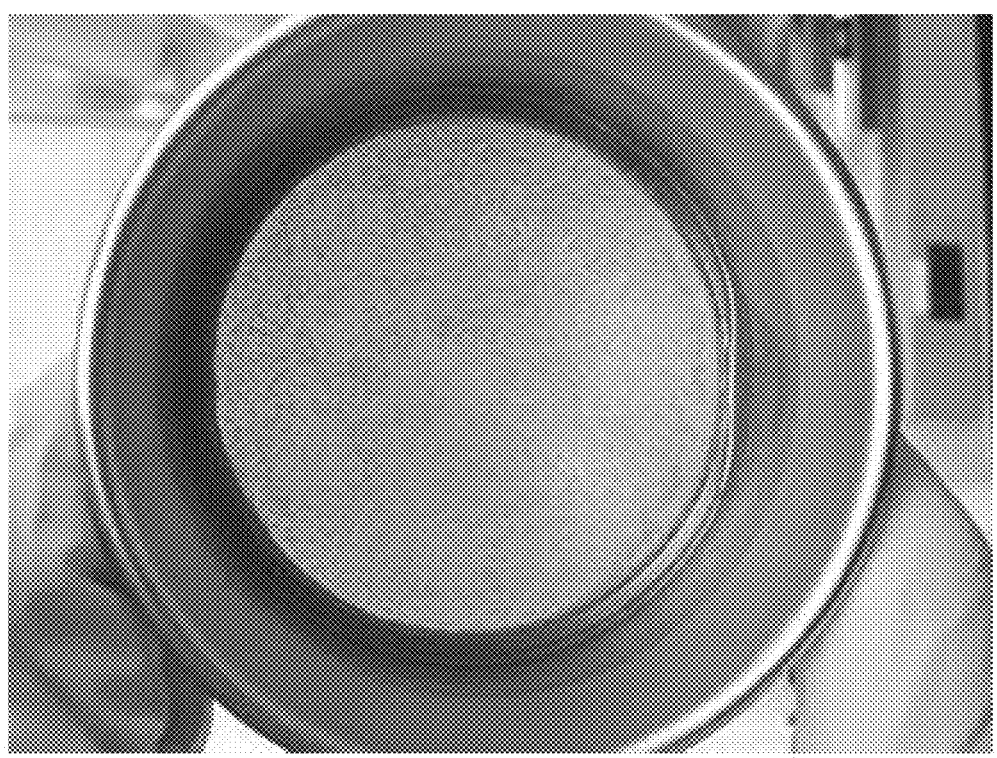
Figure 2A:
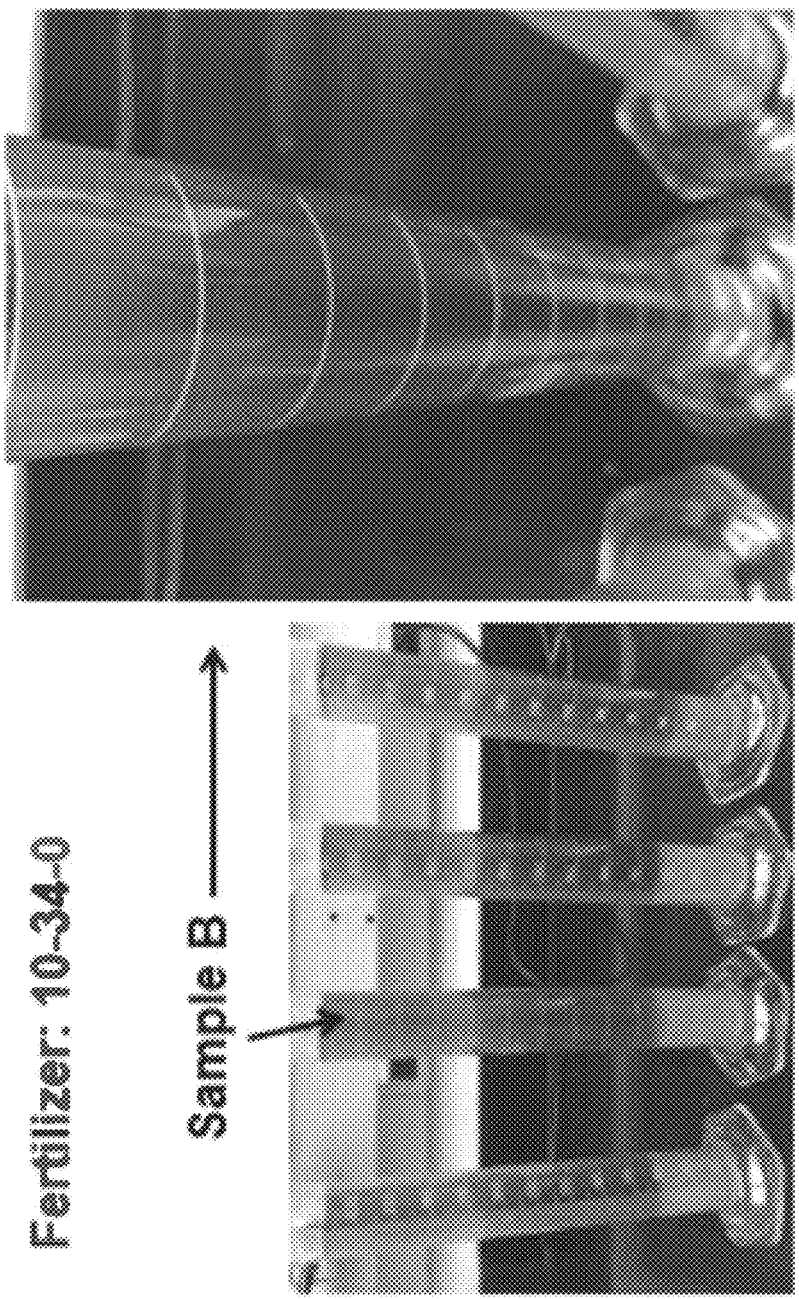
Figure 2B:
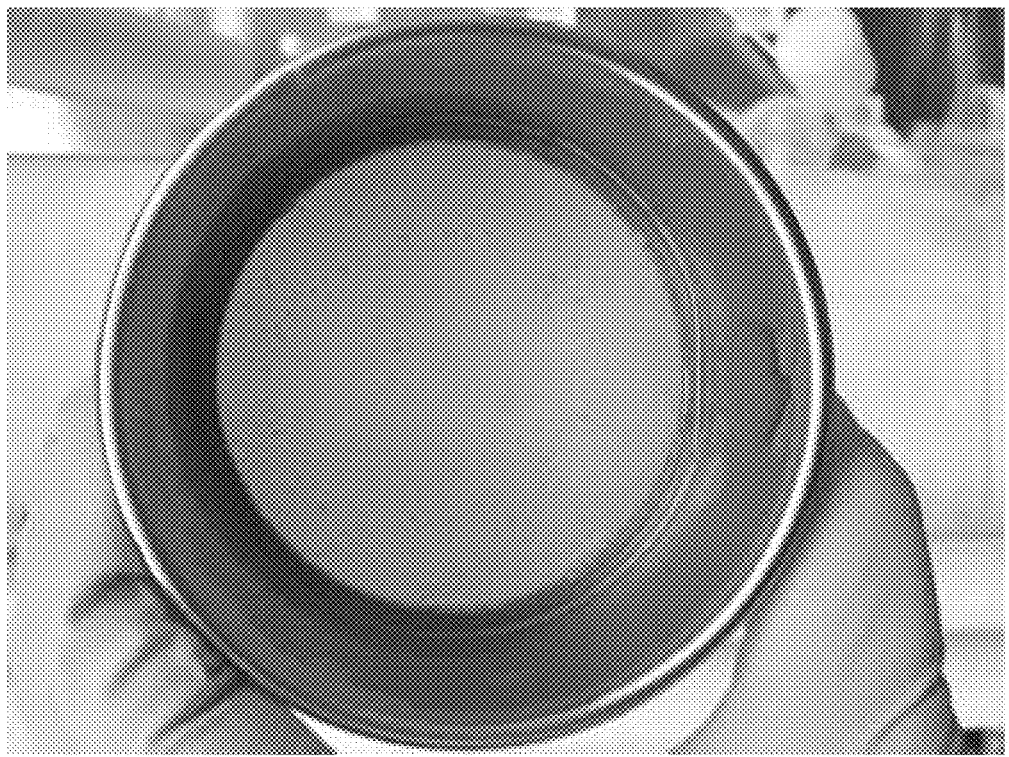
Figure 2B:
Figure 3A:
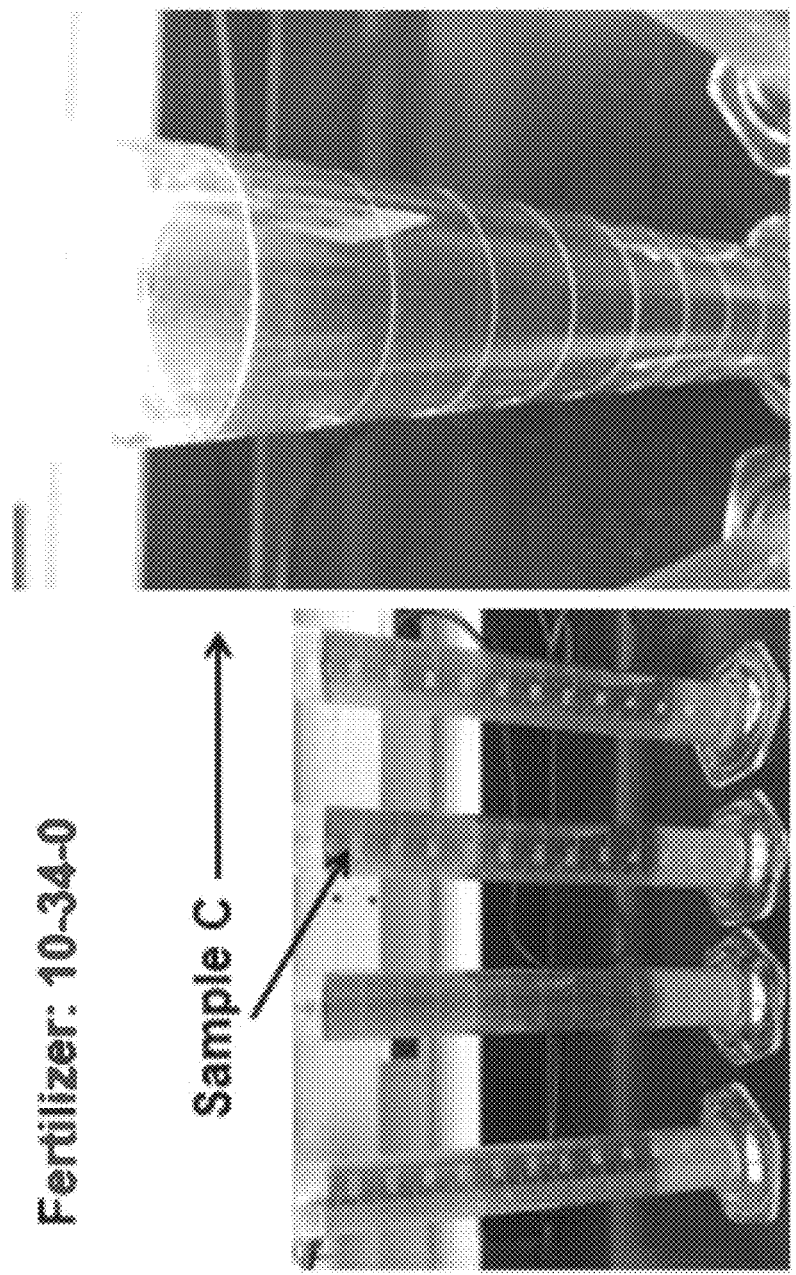
Figure 3B:
Figure 3B:
Figure 4A:
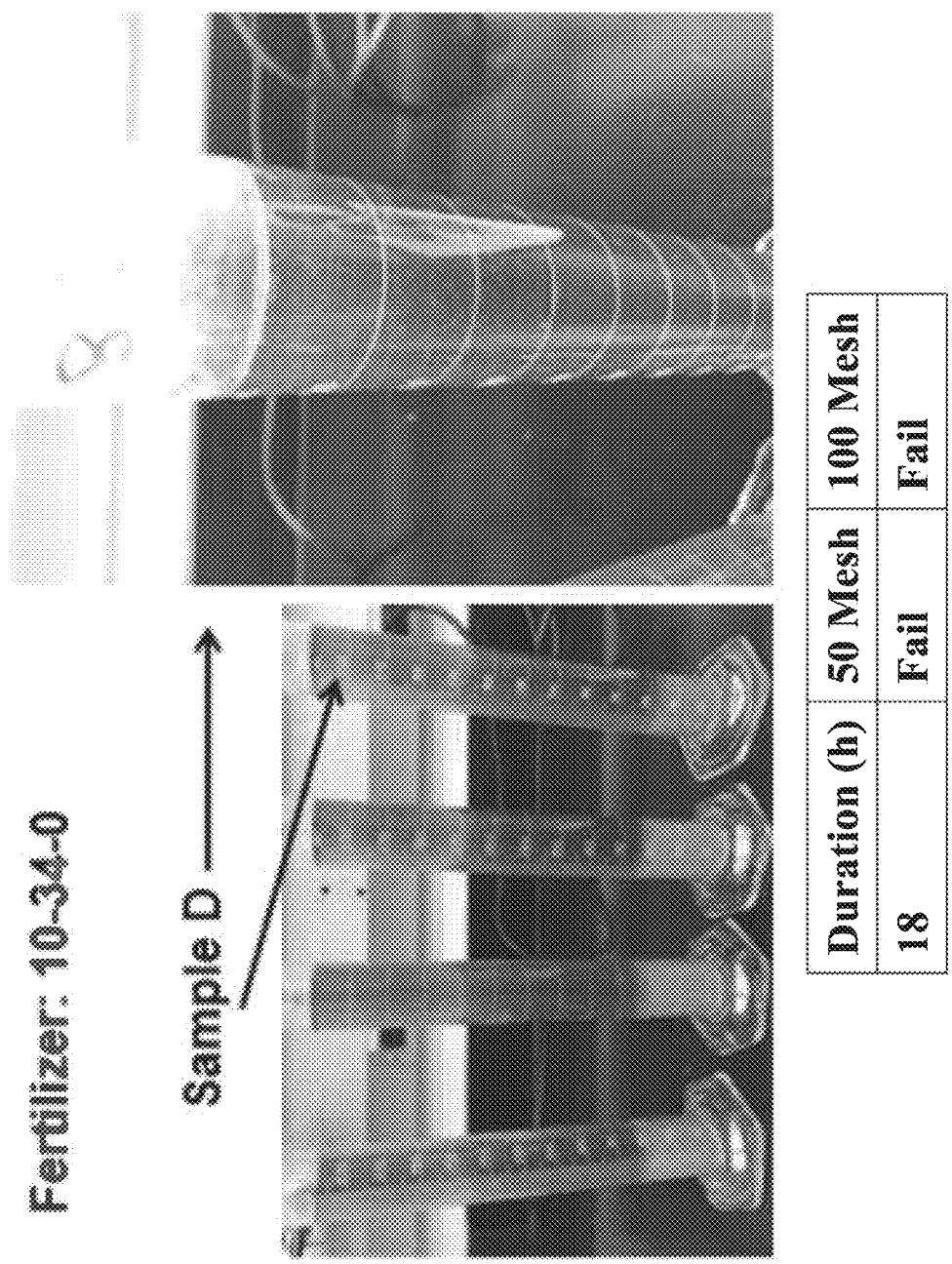
Figure 4B:
Figure 4B:
Figure 5A:
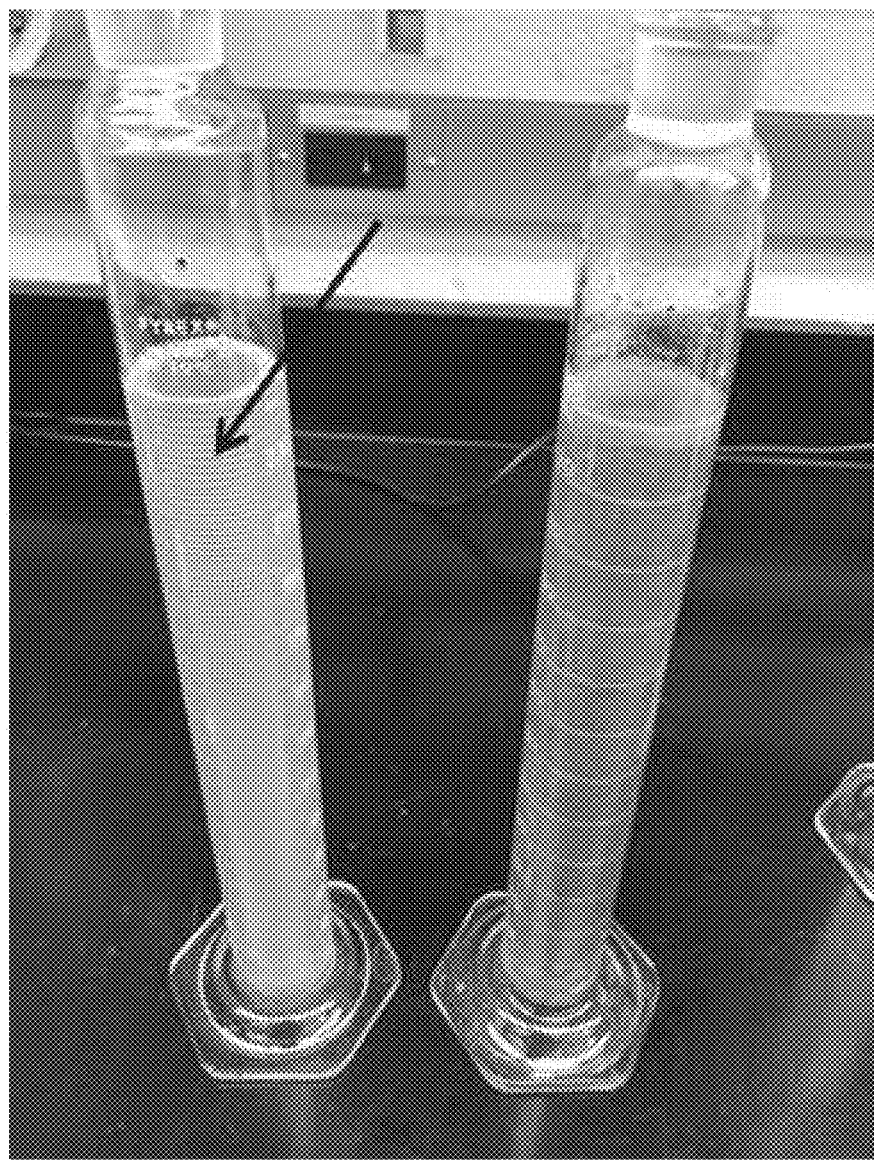
Figure 5B:
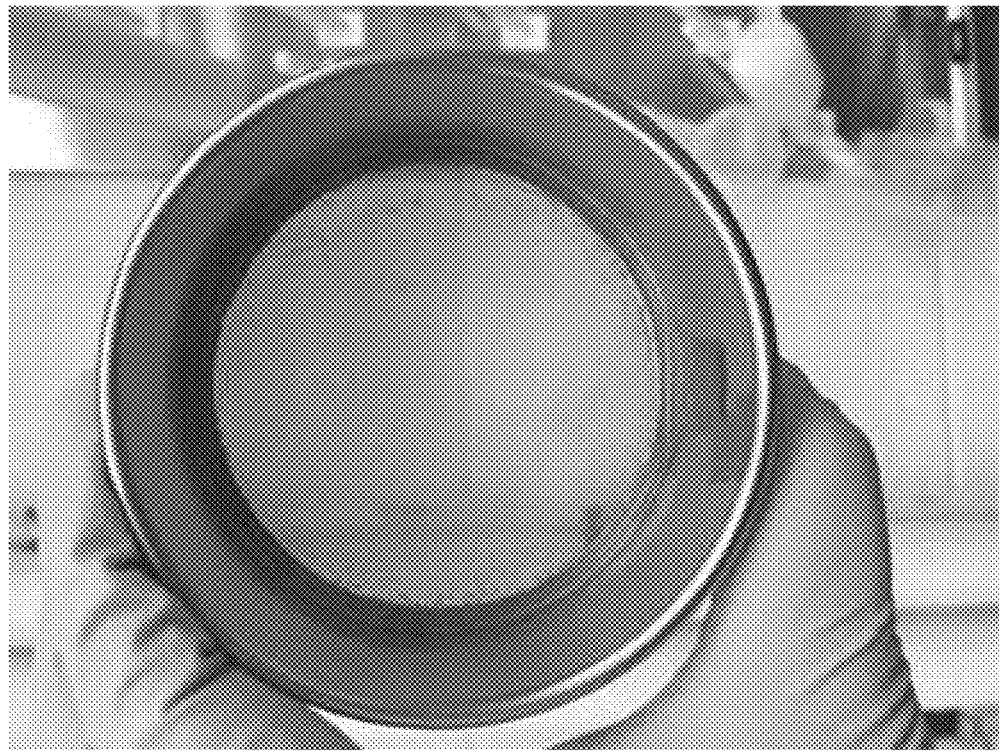
Figure 5B:
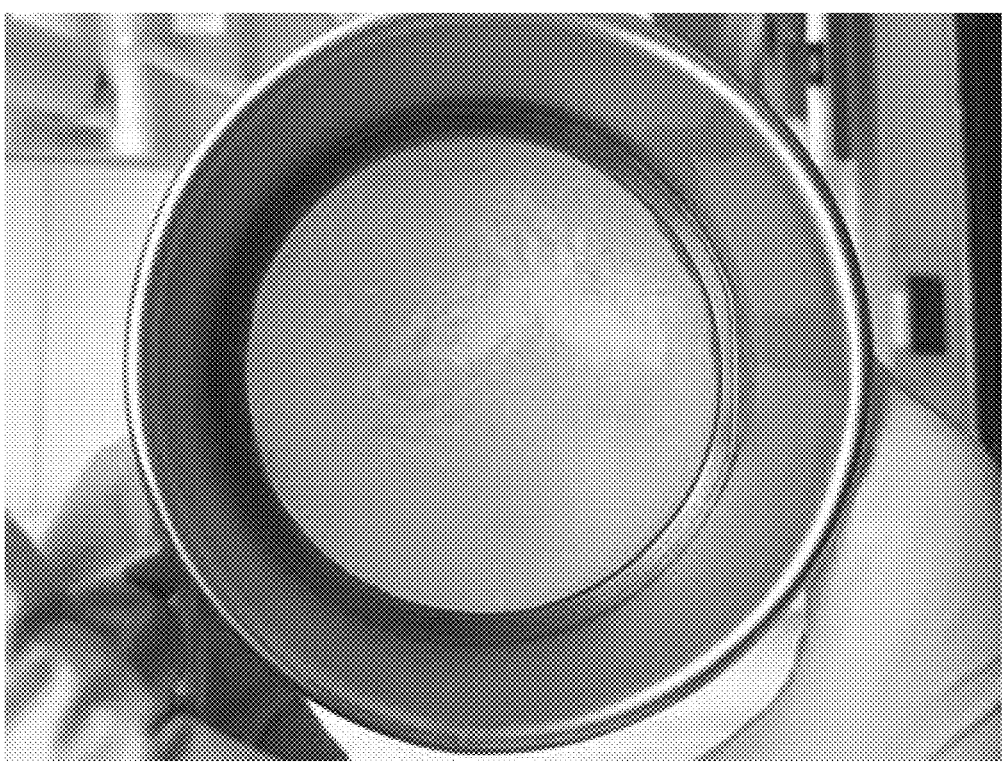
Figure 6A:
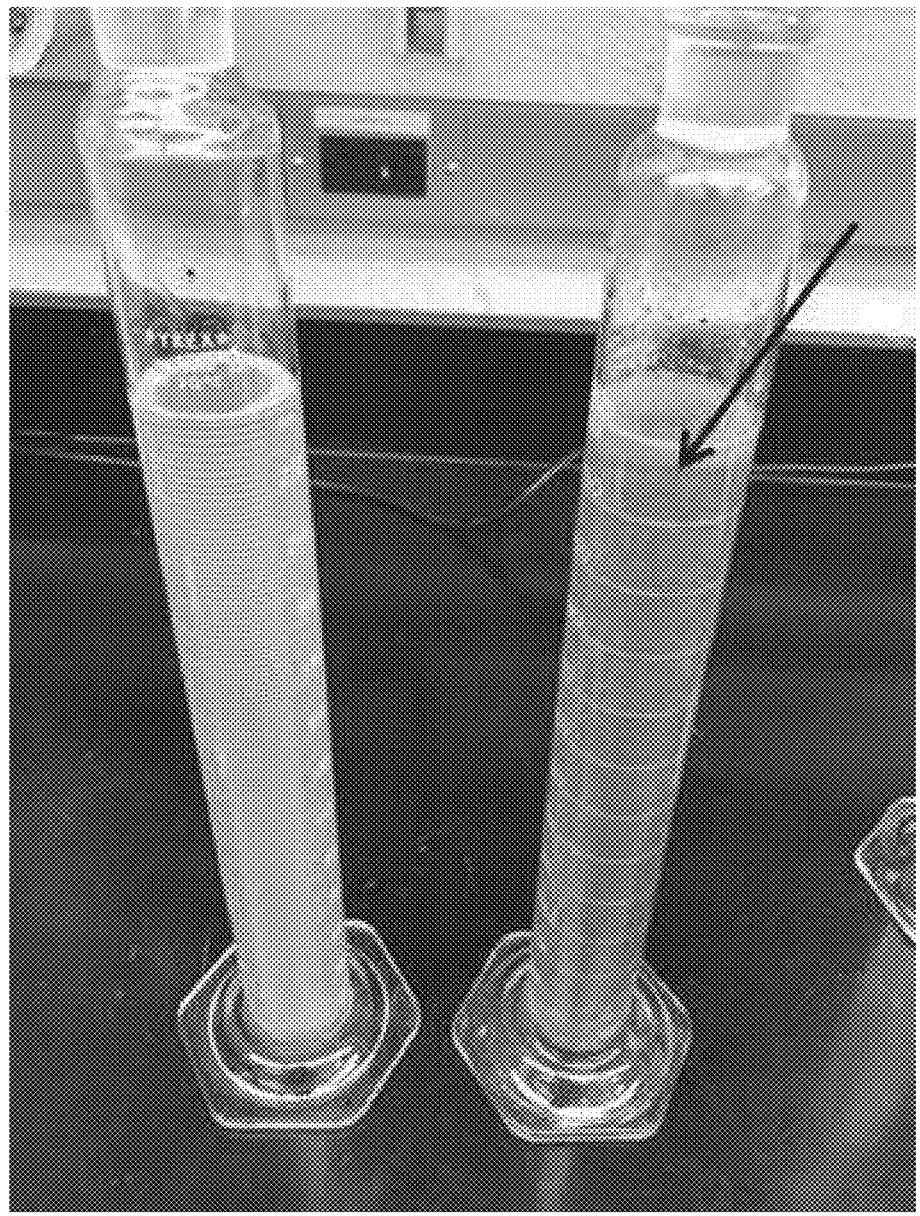
Figure 6B:
Figure 6B:
Figure 7A:
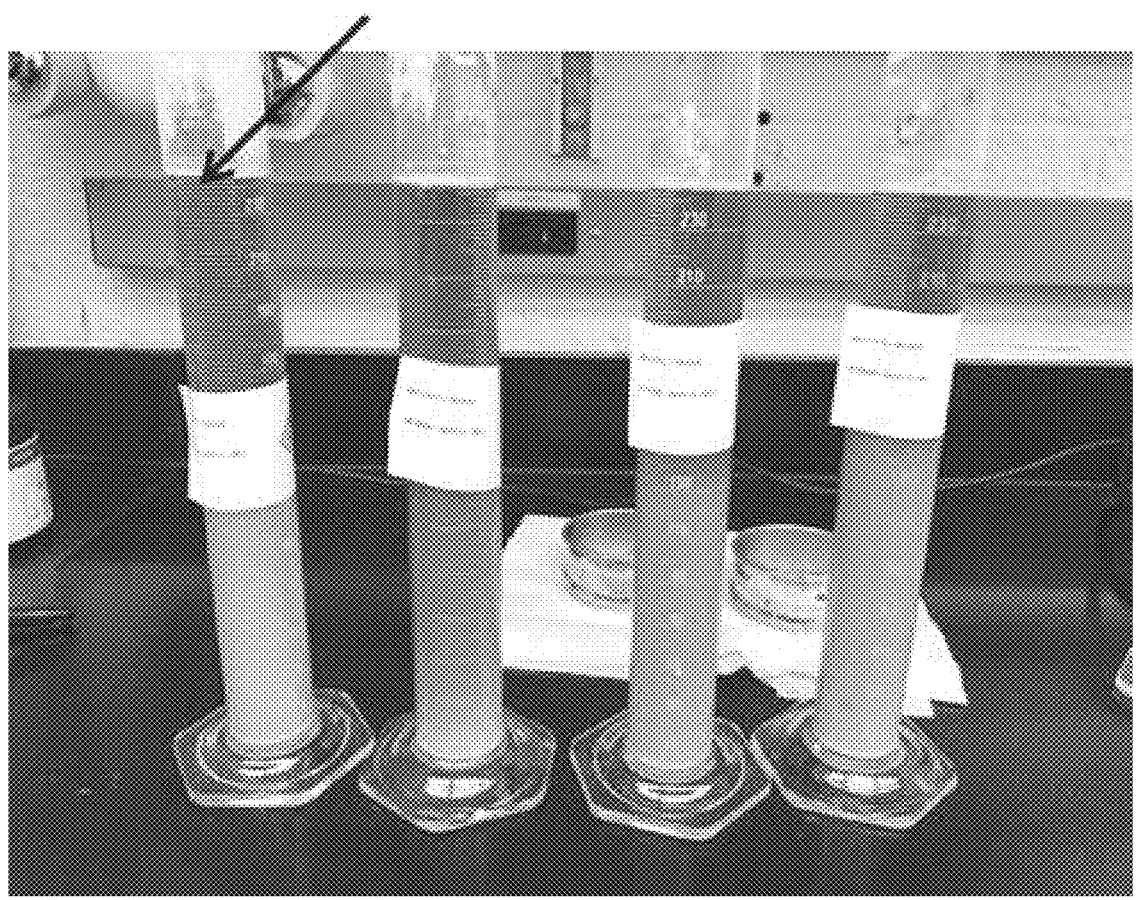
Figure 7B:
Figure 7B:
Figure 8A:
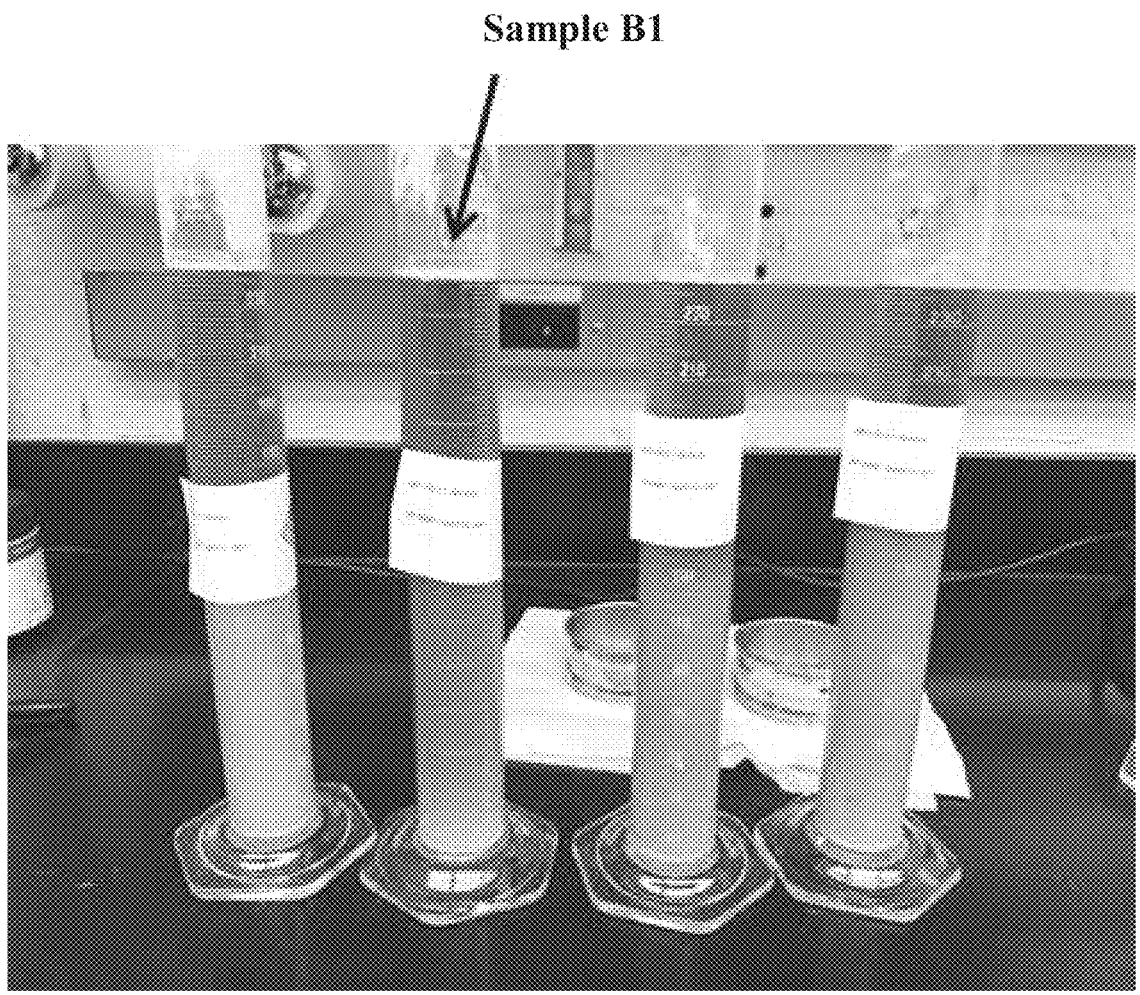
Figure 8B:
Figure 8B:
Figure 9A:
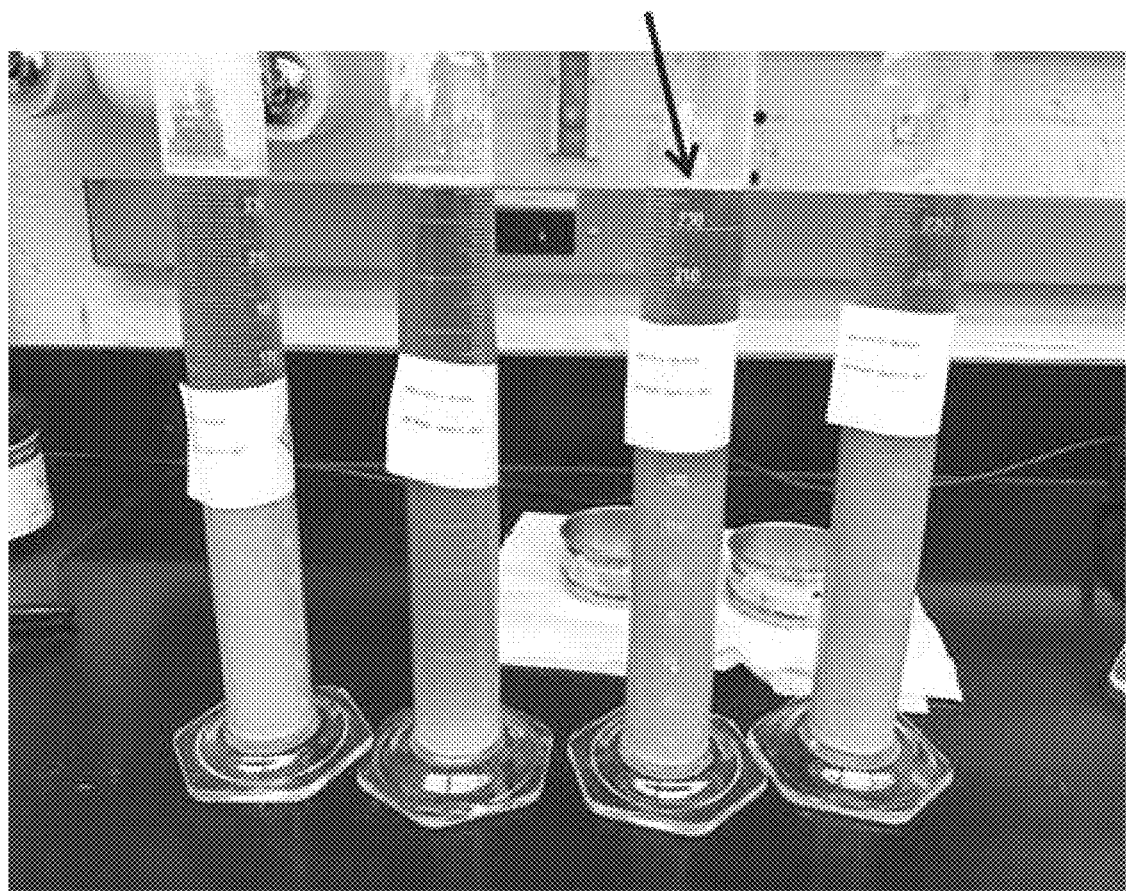
Figure 9B:
Figure 9B:

2021/0204550 A1 7/2021 Görtz et al.
2021/0244031 A1 8/2021 Collins et al.

FOREIGN PATENT DOCUMENTS

| CN | 105028906 A | * | 11/2015 |
|----|----|----|----|
| EP | 3178323 A1 | | 6/2017 |
| JP | 2011-057571 A | | 3/2011 |
| JP | 2014-507130 A | | 3/2014 |
| WO | 01/66600 A1 | | 9/2001 |
| WO | 2012/87980 A1 | | 6/2012 |
| WO | 2013178661 A1 | | 12/2013 |
| WO | 2015/011704 A1 | | 1/2015 |
| WO | 2016/045795 A1 | | 3/2016 |
| WO | 2016128620 A1 | | 8/2016 |

OTHER PUBLICATIONS

Chen, H. et al., Screening the Fusarium graminearum Inhibitory Mutant Strain for Bacillus subtilis by Atmospheric-Pressure Plasma Jet, 2010, Journal of Applied Microbiology, vol. 108, pp. 96-103. (Year: 2010).*

International Search Report and Written Opinion of the International Searching Authority for International Patent Application No. PCT/US2018/000145, dated Dec. 10, 2018, 28 pages.

* cited by examiner

50 Mesh

100 Mesh

50 Mesh

100 Mesh

50 Mesh

100 Mesh

50 Mesh

100 Mesh

Sample E

Fertilizer 32-0-0

| Duration (h) | 50 Mesh | 100 Mesh |
|---|---|---|
| 18 | None | None |

50 Mesh

100 Mesh

Sample F

Fertilizer 6-24-6

| Duration (h) | 50 Mesh | 100 Mesh |
|---|---|---|
| 18 | Almost none | Marginal |

50 Mesh

100 Mesh

Sample A1

Fertilizer 10-34-0

| Duration (h) | 50 Mesh | 100 Mesh |
|---|---|---|
| 16 | +++ | ++ |

50 Mesh

100 Mesh

Fertilizer 10-34-0

| Duration (h) | 50 Mesh | 100 Mesh |
|---|---|---|
| 16 | --- | --- |

50 Mesh

100 Mesh

Fertilizer 10-34-0

| Duration (h) | 50 Mesh | 100 Mesh |
|---|---|---|
| 16 | +++ | + |

50 Mesh

100 Mesh

Sample D1

Fertilizer 10-34-0

| Duration (h) | 50 Mesh | 100 Mesh |
|---|---|---|
| 16 | +++ | + |

50 Mesh

100 Mesh

Sample E1

Fertilizer 32-0-0

| Duration (h) | 50 Mesh | 100 Mesh |
|---|---|---|
| 16 | +++ | + |

Fertilizer 32-0-0

| Duration (h) | 50 Mesh | 100 Mesh |
|---|---|---|
| 16 | ++ | + |

Fertilizer 32-0-0

| Duration (h) | 50 Mesh | 100 Mesh |
|---|---|---|
| 16 | +++ | |

50 Mesh

100 Mesh

Sample H1

Fertilizer 32-0-0

| Duration (h) | 50 Mesh | 100 Mesh |
|---|---|---|
| 16 | ++ | |

FIG. 15

*B. thuringiensis* + xanthum gum + Fertilizer 10-34-0

50 Mesh

100 Mesh

| Duration (h) | 50 Mesh | 100 Mesh |
|---|---|---|
| 18 | --- | --- |

FIG. 16

B. thuringiensis + EXILVA® FORTE + Fertilizer 10-34-0

50 Mesh

100 Mesh

| Duration (h) | 50 Mesh | 100 Mesh |
|---|---|---|
| 18 | +++ | + |

FIG. 17

*B. thuringiensis* + EXILVA® PIANO + Fertilizer 10-34-0

50 Mesh

100 Mesh

| Duration (h) | 50 Mesh | 100 Mesh |
|---|---|---|
| 18 | + | + |

*B. megaterium* + xanthum gum + Fertilizer 10-34-0

**50

*B. megaterium* + EXILVA® FORTE + Fertilizer 10-34-0

50 Mesh

100 Mesh

| Duration (h) | 50 Mesh | 100 Mesh |
|---|---|---|
| 18 | ++ | |

*B. megaterium* + EXILVA® PIANO + Fertilizer 10-34-0

50 Mesh

100 Mesh

| Duration (h) | 50 Mesh | 100 Mesh |
|---|---|---|
| 18 | + | + |

LIQUID FERTILIZER-DISPERSIBLE COMPOSITIONS AND METHODS THEREOF

CROSS-REFERENCE TO RELATED APPLICATIONS

The present application is a 35 U.S.C. § 371 national phase entry of PCT/US2018/000145, filed on Aug. 15, 2018, which claims priority to U.S. Provisional Patent Application No. 62/546,733, filed Aug. 17, 2017, and U.S. Provisional Patent Application No. 62/553,486, filed Sep. 1, 2017, all of which are hereby incorporated by reference in their entirety.

FIELD

The present disclosure relates to the field of agrochemical compositions and formulations. In an aspect, the present disclosure provides for a composition in combination with a fibril, microfibril, or nanofibril structuring agent. In yet another aspect, the disclosure provides for a composition comprising: (a) an agriculturally bioactive material, comprising a fungicide, insecticide, nematicide, herbicide, herbicide safener, plant growth regulator; and/or plant health promoter biostimulant, or combinations thereof; (b) a fibril, microfibril, or nanofibril structuring agent; and (c) optionally, a surface active agent. The disclosure further provides for a composition described herein which can be mixed or combined with a fertilizer, for example, a liquid fertilizer.

BACKGROUND

Figure 10A:
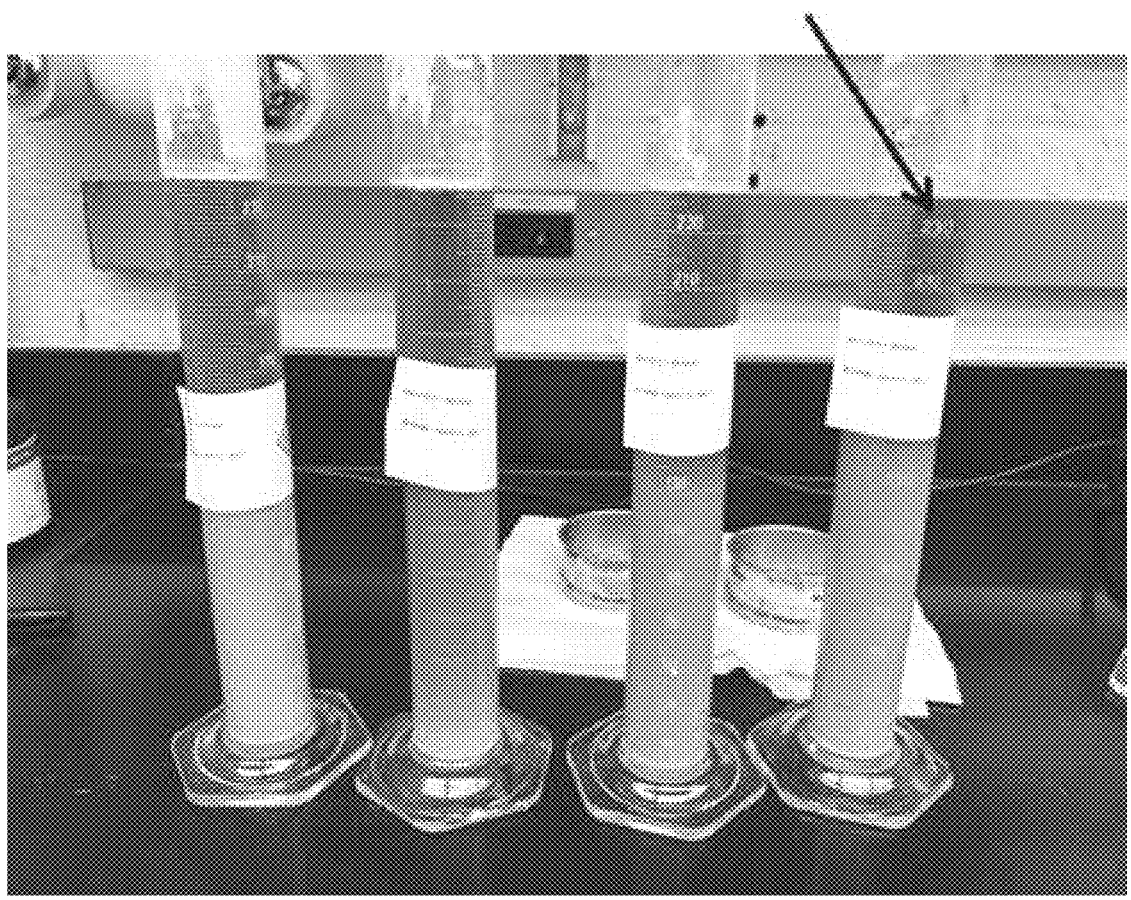
Figure 10B:
Figure 10B:

It is desirable to formulate an agriculturally bioactive material, comprising a fungicide, insecticide, nematicide, herbicide, herbicide safener, plant growth regulator; and/or plant health promoter biostimulant, or combinations thereof for use when mixed with liquid fertilizers. A formulation of an agricultural bioactive material that is readily dispersible in liquid fertilizers is desirable in the agricultural industry for the convenience of application that it offers. Advantages include uniform application without clogging application equipment, and ease of application that does not require pre-dilution or pre-slurry prior to mixing with the liquid fertilizer.

There are stability and efficacy issues involved with mixtures containing agriculturally bioactive material compositions and liquid fertilizers. When a traditional composition containing an agriculturally bioactive material is combined with a liquid fertilizer, particularly a high-phosphate starter fertilizer, components (such as surface active agents, viscosity modifiers, wetting agents, and antifreeze) can influence the uniformity of the dispersion of bioactive composition in the liquid fertilizer. Non-uniform dispersion results in residue collected on the application filters and non-uniform application of the mixture. These phenomena are not desirable as they reduce the efficiency of application due to stoppages (to clear the application equipment filter) as well as poor biological performance due to non-uniform application. Sometimes, dilution of formulation in water before adding to the liquid fertilizer is used as a means to mitigate such phenomena. However, it is not desirable due to an additional preparation step, and can reduce the area covered in one application load.

Compatibility of fertilizers with pesticides in tank-mixtures has proved a persistently troublesome problem. For example, chloronicontinyl (CNI) insecticides are known to be effective insecticides in agricultural and non-agricultural pest control, a known problem of this class of insecticides and other pesticides in general is the compatibility with fertilizers, particularly liquid fertilizer compositions.

A major challenge also lies in the unpredictability and complex nature of the final tank-mixtures. There are two general types of incompatibility of pesticides and fertilizers: chemical and physical. For example, chemical incompatibility of a pesticide and fertilizer occurs when a pesticide is hydrolyzed or subjected to other unwanted chemical reactions. Physical incompatibility occurs most frequently when the tank mixture forms an agglomerate due to, e.g., coagulation, flocculation, gelling, or precipitation of crystals. The mixtures may form hard packed agglomerates or oil globules. Physical incompatibility present difficulties since the malfunctioning tank-mixture plugs conventional spray filters and nozzles.

The problem can be persistent despite the use of compatibility agents which mostly are organic surfactants. In several cases, even dilution in water may not help.

Xanthan gum is a common cellulose based polysaccharide thickener used in agrochemical formulations. Xanthan gum helps to control the rheological properties of the formulation and exhibits shear thinning characteristics which are important during application. Though there are benefits to the use of xanthan gum as a thickener, it has been known to be problematic in fertilizer ready formulations. Typically when mixed with a high-phosphate starter fertilizer, the interaction of the cellulose based xanthan gum and fertilizer results in phase separation and subsequent flocculation. These flocculants clog the mesh in application equipment resulting in problematic and undesirable application. As an alternative to xanthan gum, thickening agents include silica and clay-based thickeners. Both silica and clay-based thickeners exhibit less robustness and versatility during the scale-up of formulations and result in less desirable physical characteristics compared to xanthan gum. It is desirable to identify a thickener for use in agrochemical formulations that is compatible with high-phosphate fertilizers.

A solution to these technical problems is provided herein.

BRIEF DESCRIPTION OF THE FIGURES

FIGS. 1A and 1B describe "Sample A," HiCFU with no structuring agent and Fertilizer 10-34-0.

FIGS. 2A and 2B describe "Sample B," HiCFU with 2.5% structural agent (microfibrillar cellulose; EXILVA® FORTE (10%)) and Fertilizer 10-34-0.

FIGS. 3A and 3B describe "Sample C," HiCFU with 2.5% structural agent (microfibrillar cellulose; EXILVA® PIANO (10%)) and Fertilizer 10-34-0.

FIGS. 4A and 4B describe "Sample D," HiCFU with 2.5% xanthan gum (2%) and Fertilizer 10-34-0.

FIGS. 5A and 5B describe "Sample E," HiCFU with 2.5% structural agent (microfibrillar cellulose; EXILVA® FORTE (10%)) and Fertilizer 32-0-0.

FIGS. 6A and 6B describe "Sample F," HiCFU with 2.5% structural agent (microfibrillar cellulose; EXILVA® FORTE (10%)) and Fertilizer 6-24-6.

FIGS. 7A and 7B describe "Sample A1," FLU (Fluopyram)+CTD (Clothianidin) SC 414 (228 g/L+186 g/L) base with no structuring agent and Fertilizer 10-34-0.

FIGS. 8A and 8B describe "Sample B1," FLU+CTD SC 414 (228 g/L+186 g/L) base with 5% xanthan gum MX (2% solution in water) and Fertilizer 10-34-0.

FIGS. 9A and 9B describe "Sample C1," FLU+CTD SC 414 (228 g/L+186 g/L) base with 5.0% structural agent (microfibrillar cellulose; EXILVA® FORTE (10% paste)) and Fertilizer 10-34-0.

FIGS. 10A and 10B describe "Sample D1," FLU+CTD SC 414 (228 g/L+186 g/L) base with 5.0% structural agent (microfibrillar cellulose; EXILVA® PIANO (10% paste)) and Fertilizer 10-34-0.

Figure 11A:
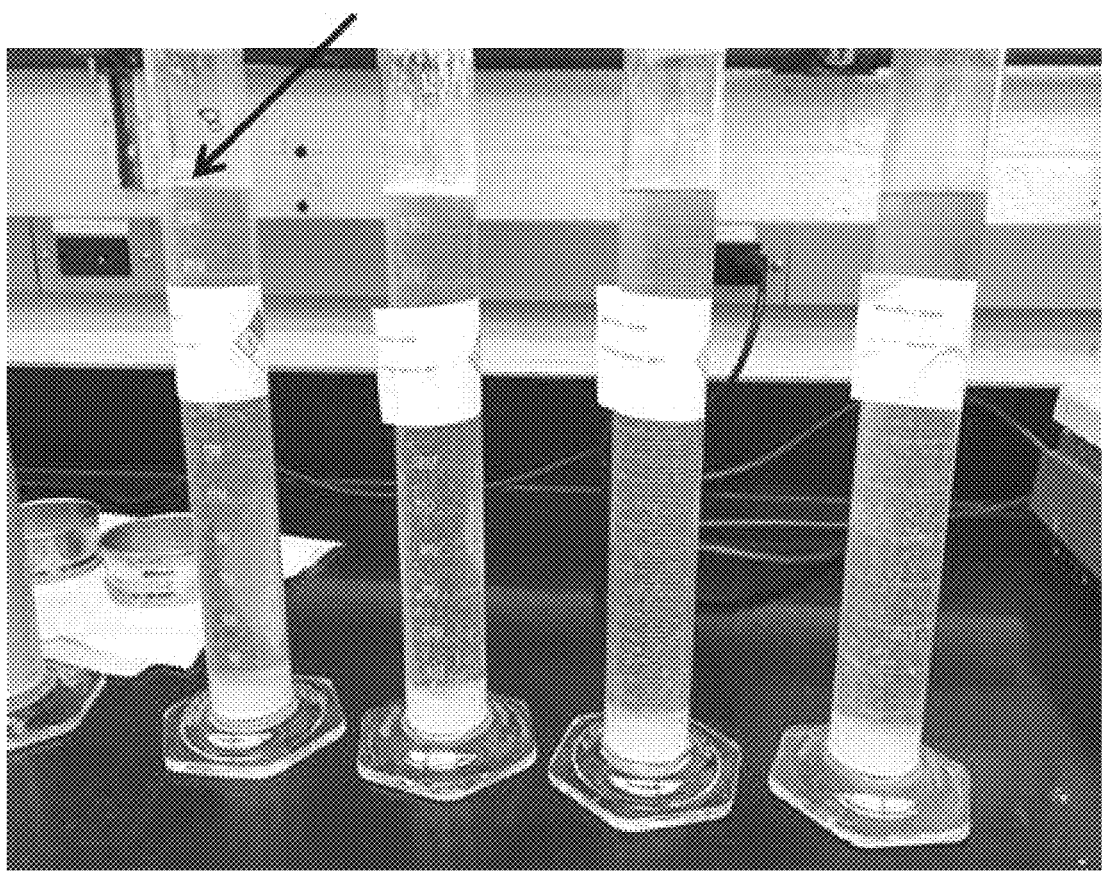
Figure 11B:

FIG. 11A and 11B describe "Sample E1," FLU+CTD SC 414 (228 g/L+186 g/L) base with no structuring agent and Fertilizer 32-0-0.

Figure 12A:
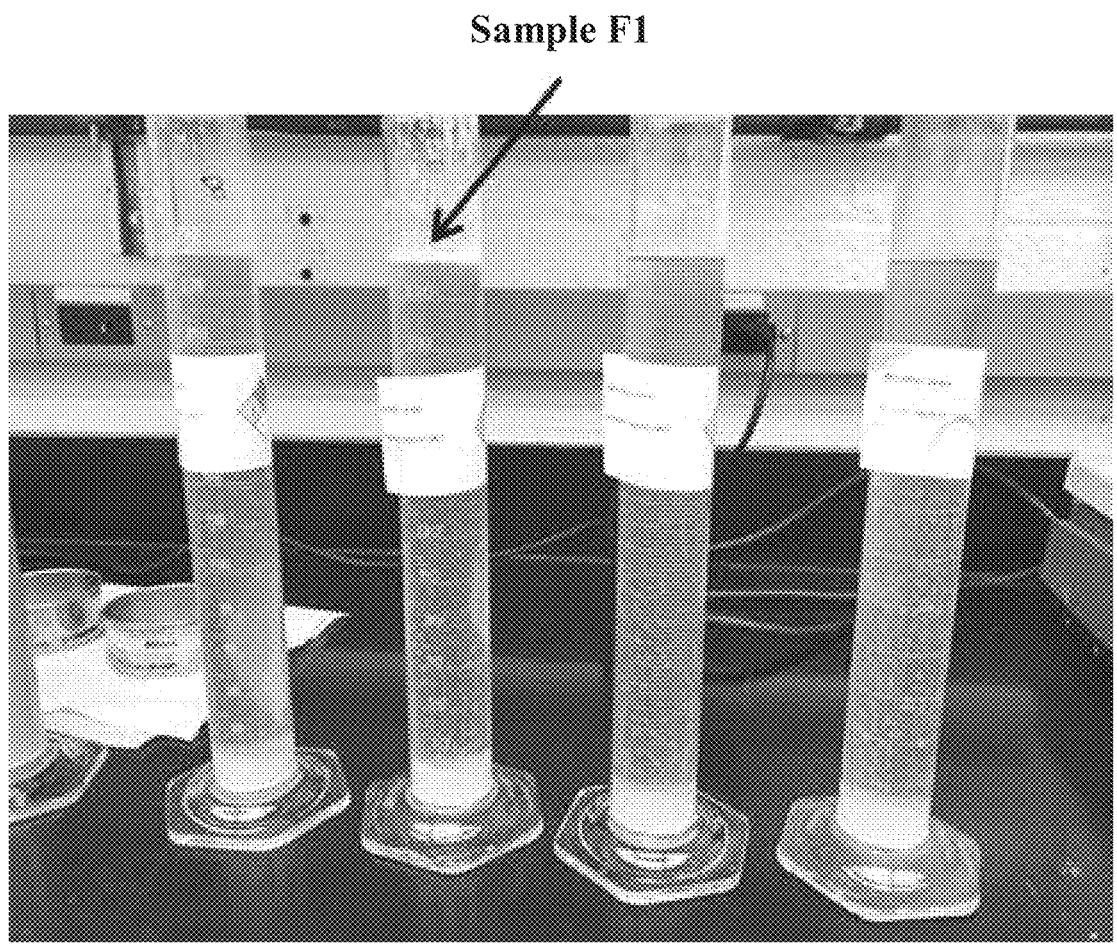
Figure 12B:

FIGS. 12A and 12B describe "Sample F1," FLU+CTD SC 414 (228 g/L+186 g/L) base with 5% xanthan gum MX (2% solution in water) and Fertilizer 32-0-0.

Figure 13A:
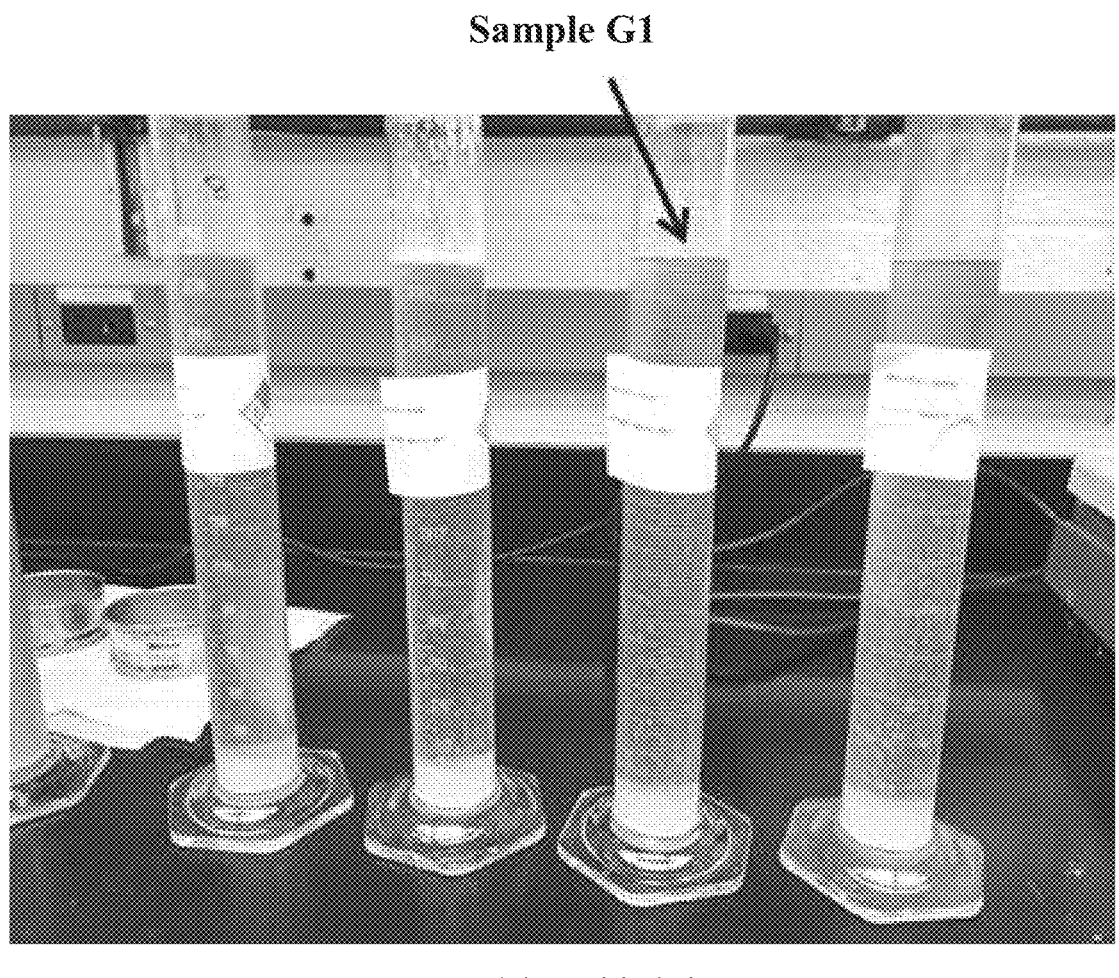
Figure 13B:

FIGS. 13A and 13B describe "Sample G1," FLU+CTD SC 414 (228 g/L+186 g/L) base with 5.0% structural agent (microfibrillar cellulose; EXILVA® FORTE (10% paste)) and Fertilizer 32-0-0.

Figure 14A:
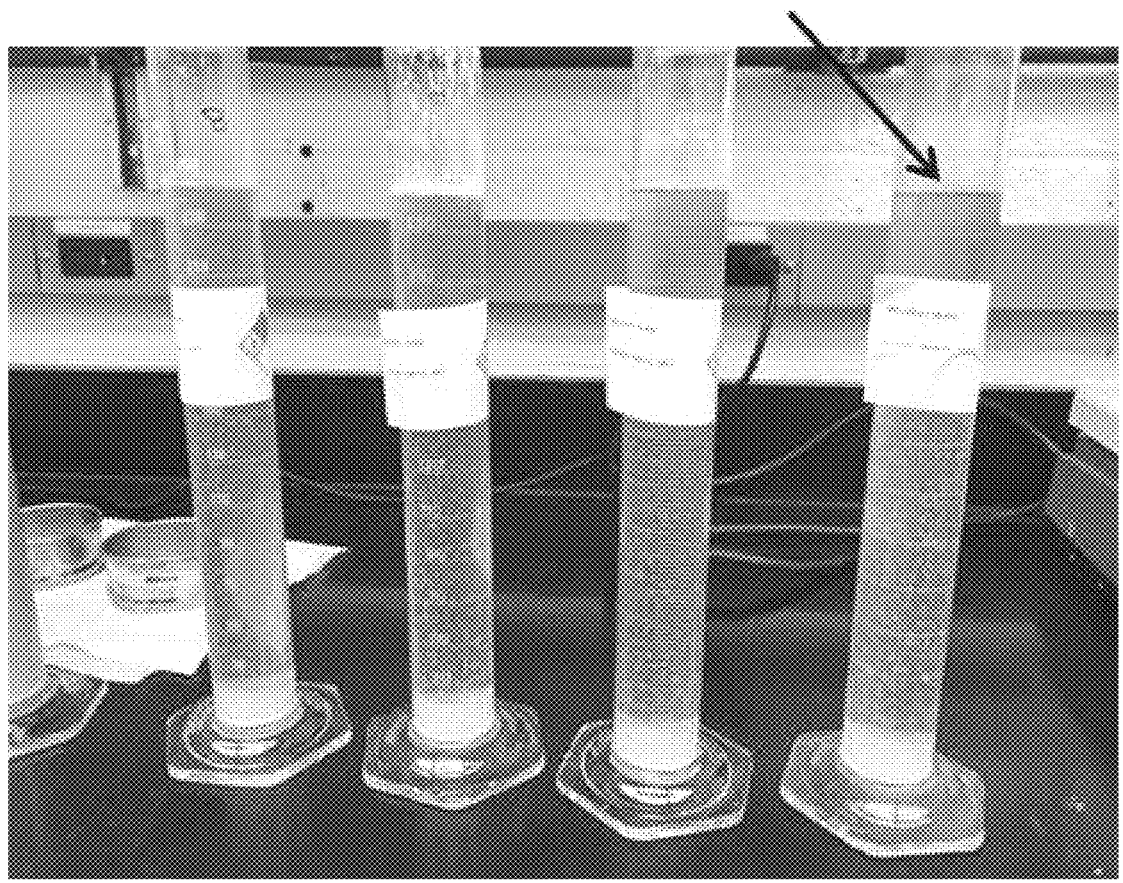
Figure 14B:
Figure 18:
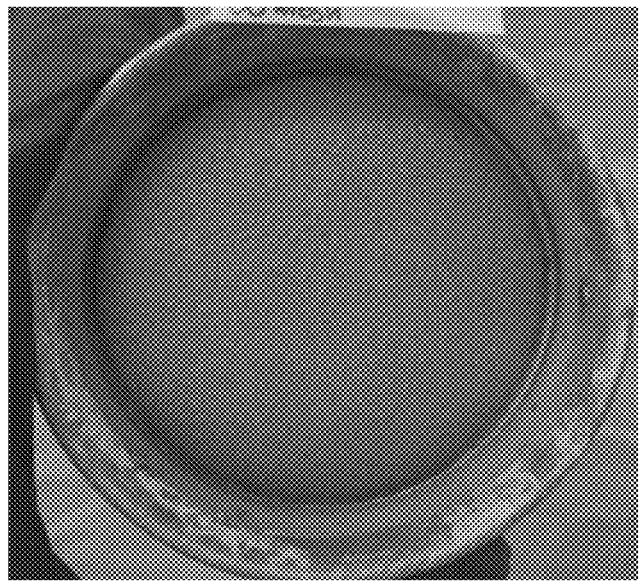
Figure 19:
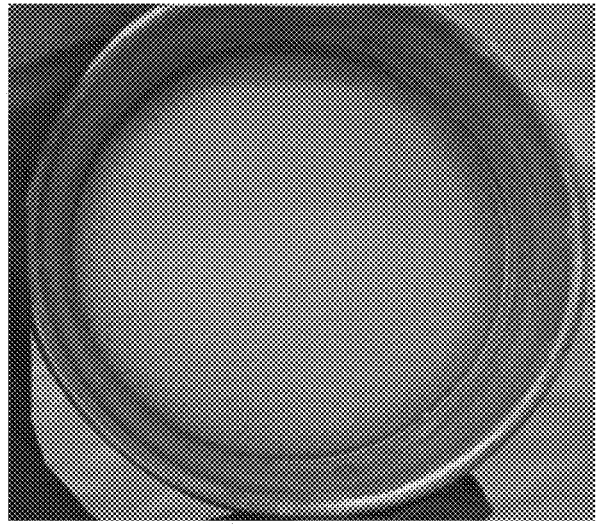
Figure 19:
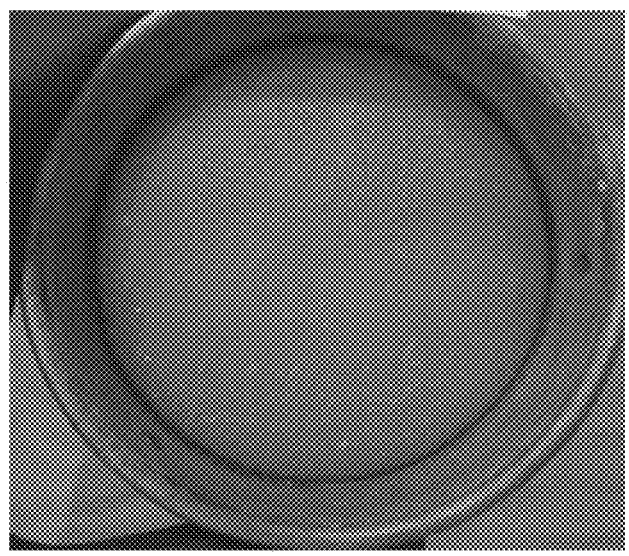
Figure 20:
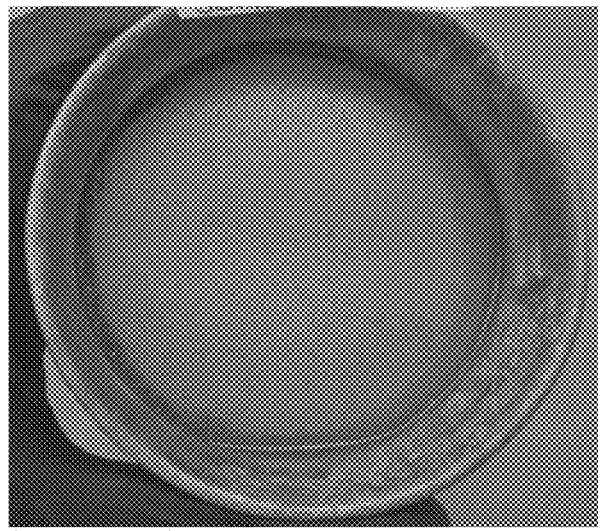
Figure 20:
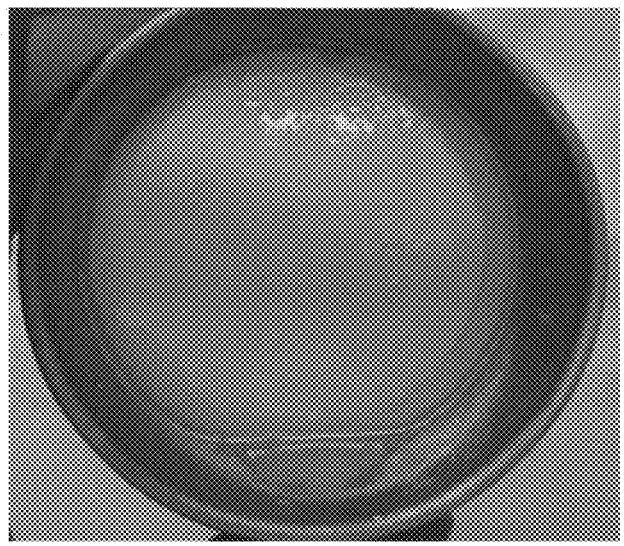

FIGS. 14A and 14B describe "Sample H1," FLU+CTD SC 414 (228 g/L+186 g/L) base with 5.0% structural agent (microfibrillar cellulose; EXILVA® PIANO (10% paste)) and Fertilizer 32-0-0.

FIG. 15 describes a *B. thuringiensis* fermentation product with xanthan gum and Fertilizer 10-34-0.

FIG. 16 describes a *B. thuringiensis* fermentation product with EXILVA® FORTE and Fertilizer 10-34-0.

FIG. 17 describes a *B. thuringiensis* fermentation product with EXILVA® PIANO and Fertilizer 10-34-0.

FIG. 18 describes a *B. megaterium* fermentation product with xanthan gum and Fertilizer 10-34-0.

FIG. 19 describes a *B. megaterium* fermentation product with EXILVA® FORTE and Fertilizer 10-34-0.

FIG. 20 describes a *B. megaterium* fermentation product with EXILVA® PIANO and Fertilizer 10-34-0.

BRIEF SUMMARY

In an aspect, the disclosure provides for a liquid fertilizer dispersible agriculturally bioactive composition comprising a fibril, microfibril, or nanofibril structuring agent described herein.

In another aspect, the present application relates to a composition comprising, consisting of, or consisting essentially of: (a) agriculturally bioactive material comprising a fungicide, insecticide, nematicide, herbicide, herbicide safener, plant growth regulator; and/or plant health promoter biostimulant, or combinations thereof composition; (b) at least one microfibril or nanofibril structuring agent, and (c) optionally, at least one surface active agent.

In some embodiments, the fibril, microfibril, or nanofibril structuring agent is microfibrillated cellulose, collagen, a synthetic polymeric microfiber or nanofiber, or any combination thereof. In a preferred embodiment, the structuring agent is microfibrillated cellulose.

In certain aspects, the bioactive material comprises a *Bacillus* sp. strain and/or a *Paenibacillus* sp. strain. In one embodiment, the *Bacillus* sp. strain is *Bacillus subtilis, Bacillus amyloliquefaciens, Bacillus pumilus, Bacillus megaterium, Bacillus firmus*, or *Bacillus thuringiensis*. In another embodiment, the *Bacillus* sp. strain is *Bacillus subtilis* strain QST713 having Accession No. NRRL B-21661, *Bacillus subtilis* strain QST30002 having Accession No. NRRL B-50421, *Bacillus subtilis* strain QST30004 having Accession No. NRRL B-50455, or a fungicidal mutant thereof.

In other aspects, the *Paenibacillus* sp. strain is *Paenibacillus polymyxa* or *Paenibacillus terrae*. In a particular aspect, the *Paenibacillus* sp. strain is *Paenibacillus* sp. strain NRRL B-50972, *Paenibacillus* sp. strain NRRL B-67304, *Paenibacillus* sp. strain NRRL B-67306, *Paenibacillus* sp. strain NRRL B-67615, or a fungicidal mutant thereof.

In yet other embodiments, the bioactive material comprises an herbicide selected from the group consisting of isoxaflutole, thiencarbazone-methyl, diflufenican, metribuzin, glufosinate-ammonium, glyphosate, and combinations thereof.

In one aspect, the bioactive material comprises isoxaflutole, thiencarbazone-methyl, and cyprosulfamide. In another aspect, the bioactive material comprises diflufenican and metribuzin. In another aspect, the bioactive material comprises isoxaflutole and metribuzin. In another aspect, the bioactive material comprises isoxaflutole. In yet another aspect, the bioactive material comprises diflufenican.

In some embodiments, the composition comprises an agriculturally bioactive material, comprising a fungicide, insecticide, nematicide, herbicide, herbicide safener, plant growth regulator; and/or plant health promoter biostimulant, or combinations thereof. In an aspect, the composition comprises a biopesticide, a pyrethroid insecticide, a systemic insecticide, a fungicide, or an herbicide. In some embodiments, the composition comprises is one or more of *Bacillus subtilis* strain QST713, bifenthrin, imidacloprid, fluopyram, acetamiprid, clothianidin, prothioconazole, trifloxystrobin, thiencarbazone-methyl, and/or isoxaflutole.

In some embodiments, a composition described herein contains a combination of a fibril, microfibril or nanofibril structuring agent which is used together with one, two, three or more additional structuring agents, such as, but not limited to, organic structuring agents or inorganic structuring agents, e.g., clays, silica, water-soluble gums, xanthan gum and other polymeric gums and chemical modifications thereof, cross-linked polyacrylic acid polymers (such as carbomers, carbopol), and/or combinations thereof. In another aspect, compositions described herein may contain water-soluble gums, such as xanthan gum, guar gum, agar, gum arabic, and/or gum tragacanth. In another aspect, compositions described herein may comprise synthetic polymers, such as, polyacrylamide, polyacrylic acid, polyoxyethylene, polyethylene glycol, polyvinyl alcohol, and polyvinylpyrrolidone.

In some embodiments, the agriculturally bioactive composition further comprises one or more surface active agent. In an aspect, a fibril, microfibril, or nanofibril structuring agent described herein is used together in combination one or more structuring surfactants.

In some embodiments, the agriculturally bioactive composition further comprises one or more of freeze-thaw stabilizers, biocides, preservatives, pigments, dyes, buffers and anti-foam agents.

Also provided is a composition comprising: (a) one or more liquid fertilizer(s), (b) an agricultural bioactive material, (c) a fibril, microfibril or nanofibril structuring agent, and (d) optionally, a surface-active agent. In another embodiment, the liquid fertilizer is aqueous-based and/or is high in phosphorus.

The present application also provides for methods of controlling unwanted pests and providing nutrients or plant promotion agents to plants, comprising applying to an area in need thereof, an effective amount of a liquid fertilizer and a composition comprising: (a) at least one of an agriculturally bioactive material, comprising a fungicide, insecticide, nematicide, herbicide, herbicide safener, plant growth regulator; and/or plant health promoter biostimulant, or combinations thereof; (b) at least one a fibril, microfibril, or nanofibril structuring agent; and (c) optionally, at least one surface active agent.

The present application also provides for methods of improving the flowability or dispersability of a composition comprising applying to an area in need thereof, an effective amount of a liquid fertilizer and a composition comprising: (a) at least one of an agriculturally bioactive material, comprising a fungicide, insecticide, nematicide, herbicide, herbicide safener, plant growth regulator; and/or plant health promoter biostimulant, or combinations thereof; (b) at least one a fibril, microfibril, or nanofibril structuring agent; and (c) optionally, at least one surface active agent.

In an aspect, the present application provides for methods of improving the uniformity and/or compatibility of a liquid fertilizer/structuring agent composition comprising applying to an area in need thereof, an effective amount of a liquid fertilizer and a composition comprising: (a) at least one of an agriculturally bioactive material, comprising a fungicide, insecticide, nematicide, herbicide, herbicide safener, plant growth regulator; and/or plant health promoter biostimulant, or combinations thereof; (b) at least one a fibril, microfibril, or nanofibril structuring agent; and (c) optionally, at least one surface active agent.

The present application also provides for methods of increasing plant or crop yield, comprising applying to an area in need thereof, an effective amount of a liquid fertilizer and a composition comprising: (a) at least one of an agriculturally bioactive material, comprising a fungicide, insecticide, nematicide, herbicide, herbicide safener, plant growth regulator; and/or plant health promoter biostimulant, or combinations thereof; (b) at least one a fibril, microfibril, or nanofibril structuring agent; and (c) optionally, at least one surface active agent.

In an aspect, a composition, fertilizer, or method described herein is utilized in a single application method step. In another aspect, a composition or fertilizer is ready to use in the field by farmers without a dilution step.

The disclosure also provides for compositions that are ready to use without additional modification. In an aspect, a composition, fertilizer, or method described herein excludes any additional surfactant added externally (for example, adjuvants termed compatibility agents including phosphate ester surfactants). In yet another aspect, a composition, fertilizer, or method described herein excludes any additional surfactant to achieve a uniform mixture.

In some embodiments, the liquid fertilizer and a composition described herein are mixed prior to applying to the area in need thereof. In a preferred embodiment, the liquid fertilizer and a composition described herein are applied to soil. In another aspect, the fertilizer and a composition described herein are applied in-furrow, or applied through a drip irrigation system, and/or applied to foliage.

DETAILED DESCRIPTION

In an aspect, the disclosure provides for an agricultural-based composition, for example a fertilizer, comprising a composition or structuring agent that comprises a fibril, microfibril, or nanofibril.

The disclosure provides for, in one aspect, a composition comprising, consisting of, or consisting essentially of: (a) an agriculturally bioactive material, comprising a fungicide, insecticide, nematicide, herbicide, herbicide safener, plant growth regulator; and/or plant health promoter biostimulant, or combinations thereof, (b) a fibril, microfibril, or nanofibril structuring agent, and (c) optionally, a surface-active agent.

The disclosure provides for, in another aspect a ready to use mixture of the above-mentioned composition with a liquid fertilizer.

In an aspect, a composition described herein includes from about 0.1% to about 65%, about 0.1% to about 25%, about 0.5% to about 20%, about 1% to about 15%, about 0.1% to about 10%, or about 0.1% to about 50% by weight of at least one (a) an agriculturally bioactive material, a fungicide, insecticide, nematicide, herbicide, plant growth regulator; and/or plant health promoter biostimulant, or combinations thereof.

In another aspect, a composition described herein includes from about 0.01% to about 15%, about 0.1% to about 10%, about 0.1% to about 5%, about 0.1% to about 2%, about 0.1% to about 1%, about 0.01% to about 1%, or about 0.05% to about 0.5% by weight of a fibril or microfibril or nanofibril composition described herein. In another aspect, a composition described herein includes no more than about 0.05%, no more than about 0.1%, no more than about 0.25%, no more than about 0.5% no more than about 1%, no more than about 2%, no more than about 3%, no more than about 4%, no more than about 5%, or no more than about 10% by weight of a fibril, microfibril or nanofibril composition described herein. In another aspect, a composition described herein includes a sufficient amount of a fibril, microfibril or nanofibril compound such that the agriculturally bioactive material composition remains physically stable while maintaining its flowable form.

In yet another aspect, a composition described herein includes from about 0.1% to about 25%, about 0.1% to about 15%, about 0.1% to about 10%, about 0.25% to about 5%, about 0.5% to about 5%, about 1.0% to about 5%, or about 0.5% to about 50% by weight of a surface-active agent, a suspension agent, or other component described herein.

In an aspect, a composition or method described herein comprises a material that is compatible and dispersible with a fertilizer composition, for example, clay, silica, xanthan gum, structuring surfactants, metallic oxides such as aluminium or titanium oxides, or other fertilizer-based material and combinations thereof. In another aspect, the composition described herein contains less than about 10%, 5%, 3%, 2%, 1%, or 0.5% by weight of a structuring agent or surface active agent other than microfibril or fibril-based compounds, such as microfibrillated cellulose. In yet another aspect, the composition described herein contains less than about 10%, 5%, 3%, 2%, 1%, 0.5%, or 0.1% by weight of one or more of clay, silica, xanthan gum, structuring surfactants, metallic oxides such as aluminium or titanium oxides and combinations thereof.

In another aspect, the composition described herein contains between about 0.1% and about 20% by weight, between about 0.1% and about 15% by weight, between about 0.1% and about 10% by weight, between about 0.1% and about 5% by weight, between about 1% and about 20% by weight, between about 1% and about 15% by weight, between about 1% and about 10% by weight, or between about 1% and about 5% by weight of a structuring agent or surface active agent other than microfibril or fibril-based compounds, such as microfibrillated cellulose. In one aspect, the composition contains between about 1% and about 10% by weight of a structuring agent or surface active agent other than microfibril or fibril-based compounds, such as microfibrillated cellulose.

In yet another aspect, the composition described herein contains between about 0.1% and about 20% by weight, between about 0.1% and about 15% by weight, between about 0.1% and about 10% by weight, between about 0.1% and about 5% by weight, between about 1% and about 20% by weight, between about 1% and about 15% by weight, between about 1% and about 10% by weight, or between about 1% and about 5% by weight of one or more of clay, silica, xanthan gum, structuring surfactants, metallic oxides such as aluminium or titanium oxides and combinations thereof. In one aspect, the composition contains between about 1% and about 10% by weight of one or more of clay, silica, xanthan gum, structuring surfactants, metallic oxides such as aluminium or titanium oxides and combinations thereof.

In an aspect, the disclosure provides for anionic surface active agents, cationic surface active agents, non-ionic surface active agents, zwitterionic, and/or amphoteric surface active agents.

Suitable surface active agents of the cationic type may include, for example, quaternary ammonium compounds (for example cetyltrimethyl ammonium bromide), imidazolines and amine salts.

Suitable anionic surface active agents may include, for example, alkali metals salts of fatty acids, salts of aliphatic monoesters of sulfuric acid (for example sodium lauryl sulfate), salts of sulfonated aromatic compounds (for example sodium dodecylbenzenesulfonate, calcium dodecylbenzenesulfonate, butylnaphthalene sulfonate and mixtures of sodium di-isopropyl- and tri-isopropyl-naphthalene sulfonates), ether sulfates, alcohol ether sulfates (for example sodium laureth-3-sulfate), ether carboxylates (for example sodium laureth-3-carboxylate), phosphate esters (products from the reaction between one or more fatty alcohols and phosphoric acid (predominately mono-esters) or phosphorus pentoxide (predominately di-esters), for example the reaction between lauryl alcohol and tetraphosphoric acid; additionally these products may be ethoxylated), sulfosuccinamates, paraffin or olefine sulfonates, taurates and lignosulfonates.

Suitable surface active agents of the amphoteric type may include, for example, include betaines, propionates and glycinates.

Suitable surface active agents of the non-ionic type include condensation products of alkylene oxides, such as ethylene oxide, propylene oxide, butylene oxide or mixtures thereof, with fatty alcohols (such as oleyl alcohol or cetyl alcohol) or with alkylphenols (such as octylphenol, nonylphenol or octylcresol); partial esters derived from long chain fatty acids or hexitol anhydrides; condensation products of said partial esters with ethylene oxide; block polymers (comprising ethylene oxide and propylene oxide); alkanolamides; simple esters (for example fatty acid polyethylene glycol esters); amine oxides (for example lauryl dimethyl amine oxide); Alkyl polyglycosides and lecithins.

Other surface active agents capable of use in the present disclosure include those, for example, as described in U.S. Pat. Nos. 5,429,741; 5,641,458; 8,916,499, and 9,661,850, the contents of each which are incorporated by reference in their entireties.

Another embodiment is directed to a fertilizer-ready composition comprising components described herein. In another aspect, the disclosure provides for a liquid fertilizer composition. In an aspect, the term "liquid fertilizer" refers to a fertilizer in a fluid or liquid form comprising, for example, differing ratios of nitrogen, phosphorous, potassium, and/or micronutrients (such as iron, manganese, sulfur, zinc, magnesium, boron, etc.) or combinations thereof. In a non-limiting aspect, an example of a liquid fertilizer described herein contains about 10% nitrogen, about 34% phosphorous, and less than 1% potassium. In yet another aspect, a liquid fertilizer described herein and micronutrients, commonly known as starter fertilizers that are high in phosphorus and promote rapid and vigorous root growth. In another aspect, a liquid fertilizer described herein is aqueous-based. In another aspect, the fertilizer composition could contain plant health promoting/stimulating/regulating substances.

In an aspect, compositions described herein may be added or mixed with urea/ammonium nitrate fertilizer. In another aspect, compositions described herein may be added or mixed with a solution of urea and ammonium nitrate in water (for example, a "UAN" fertilizer).

In an aspect, compositions described herein may be added or mixed with a fertilizer comprising nitrogen, phosphorous, and/or potassium. In yet another aspect, compositions described herein may be added or mixed with a three-component fertilizer comprising nitrogen, phosphorus, and potassium (for example, a "NPK" fertilizer). The disclosure further provides for two-component fertilizers comprising, for example, nitrogen and phosphorus. In another aspect, fertilizers used herein comprise monoammonium phosphate (MAP) and diammonium phosphate (DAP). Other fertilizers for use in the present invention may be found in "Fertilizer Manual," UN Industrial Development Organization, Int'l Fertilizer Development Center, Springer Science & Business Media, Mar. 31, 1998-616 pages, and "Chemistry and Technology of Fertilizers," Reinhold Pub. Corp., 1960, the contents of which are each incorporated by reference in their entireties.

The present disclosure also encompasses a method of controlling unwanted organisms while providing nutrients to plants, via applying an effective amount of a liquid fertilizer in combination with one of the compositions of this invention.

The disclosure further provides for compositions and methods for reducing sedimentation in the bioactive composition and/or in the mixture of the bioactive composition with a fertilizer composition. In an aspect, the addition of a fibril, microfibril, or nanofibril compound or composition to a fertilizer reduces sedimentation by at least about 10%, at least about 20%, at least about 30%, at least about 40%, at least about 50%, from about 10% to about 50%, or about 25% to about 75% relative to a composition without a fibril or microfibril compound or composition described herein. In another aspect, the addition of a fibril or microfibril compound or composition to a fertilizer reduces sedimentation by at least about 10%, at least about 20%, at least about 30%, at least about 40%, at least about 50%, from about 10% to about 50%, or about 25% to about 75% relative to a composition with a different structuring agent, for example, clay, silica, fumed silica, minerals, xanthan gum, structuring surfactants, metallic oxides such as aluminium or titanium oxides, or combinations thereof.

The disclosure further provides for compositions and methods for improving flowability in the bioactive composition and/or in the mixture of the bioactive composition with a fertilizer composition. In an aspect, the flowability is measured by passing the composition through a 50 mesh, 80 mesh, or 100 mesh filter. In an aspect, the size of the mesh filter corresponds to those described in, for example, NETAFIM™ "Mesh vs. Micron Comparison Chart," dated 2016 and also available at http://www.netafimusa.com/wp-content/uploads/2016/10/Mesh-vs-Micron.pdf.

In an aspect, the flowability is measured by passing the composition through a filter with mesh of about 50 to about 500 microns, a filter of about 150 microns, a filter of about 175 microns, a filter of about 200 microns, or a filter of about 300 microns. In an aspect, the 50 mesh filter corresponds to about 297 micron mesh, the 80 mesh filter corresponds to about 177 micron mesh, and the 100 mesh filter corresponds to about 149 micron mesh.

In an aspect, the addition of a fibril, microfibril, or nanofibril compound or composition to a liquid fertilizer improves flowability by at least about 10%, at least about 20%, at least about 30%, at least about 40%, at least about 50%, at least about 75%, at least about 90%, from about 5% to about 50%, from about 20% to about 75%, from about 30% to about 80%, from about 50% to about 90% relative to a composition without a fibril or microfibril compound or composition described herein. In another aspect, the addition of a fibril, microfibril, or nanofibril compound or composition to a liquid fertilizer improves flowability by at least about 10%, at least about 20%, at least about 30%, at least about 40%, at least about 50%, at least about 75%, at least about 90%, from about 5% to about 50%, from about 20% to about 75%, from about 30% to about 80%, from about 50% to about 90% relative to a composition with a different structuring agent, for example, clay, silica, fumed silica, minerals, xanthan gum, structuring surfactants, metallic oxides such as aluminium or titanium oxides, or combinations thereof. In another aspect, the flowability is improved relative to xanthan gum.

In an aspect, the disclosure further provides for compositions and methods for improving viscosity. In another aspect, the addition of a fibril, microfibril, or nanofibril compound or composition to a fertilizer improves viscosity relative to a composition without a fibril, microfibril, or nanofibril compound or composition.

In an aspect, the disclosure provides for methods of mixing or adding a structuring agent described herein to a fertilizer with no pre-dilution in a liquid, such as water. In another aspect, composition and methods described herein do not include "fertilizer compatibility aids," such as products, compounds, or compositions comprising phosphate esters.

The present disclosure further encompasses a process for preparing a composition according to the present disclosure by dispersing at least one agriculturally bioactive agent in a mixture of water and at least one microfibril structuring agent, and optionally a surfactant, a freeze-thaw stabilizing agent, an anti-foam agent and/or a preservative; wet milling the mixture to an average particle size of about 0.1 to about 100 microns, about 0.1 to about 10 microns, or about 1 to about 5 microns, and optionally adding a structuring agent selected from attapulgite clay, fumed silica, structuring surfactants, metallic oxides such as aluminium or titanium oxides, or combinations thereof. In another embodiment, the composition according to the present disclosure can be prepared by incorporating microfibril agent to an aqueous fermentation broth that contains at least one agriculturally bioactive agent. The process can further include the step of adding the resultant mixture to a liquid fertilizer.

In an aspect, the disclosure provides for a fibril, microfibril, or nanofibril with a diameter of from about 5 nm to about 100 nm, about 10 nm to about 50 nm, about 20 to about 50 nm, about 10 nm to about 500 nm, about l0nm to about 100 nm, about 1 nm to about 200nm. In an aspect, the disclosure provides for fibrils or microfibrils with a length of from about 0.5 μm to about 1000 about 1 pm to about 500 μm, about 5μm to about 250 μm.

In another aspect, the disclosure provides for a microfibril with a diameter from about 20 nm to about 200 nm and a length of up to 50 microns; a diameter of about 20 nm to about 100 nm and a length of up to 10 microns; a diameter from about 20 nm to about 60 nm and a length of about 1 micron to about 20 microns.

In an aspect, cellulose fibers described herein are built up of fibril bundles, which include a plurality of microfibrils. In an aspect, cellulose fibers comprise about 10 to about 100, about 10 to about 50, or about 20 to about 40 fibril, or more than 20 microfibril, or nanofibrils. In an aspect, cellulose fibers described herein are converted into a three-dimensional network of microfibrils with an ultra-high surface area.

In an aspect, the structuring agent comprises cellulose derivatives and/or modified celluloses. In another aspect, the structuring agent comprises hydroxyalkylcellulose and/or carboxymethylcellulose. The disclosure further provides for bacterial cellulose for use in composition and methods described herein. In another example, the disclosure provides for microfibrillated cellulose or nanocellulose, for example, such as those compounds and compositions described in "Microfibrillated Cellulose—Its Barrier Properties and Applications in Cellulosic Materials: A Review," Carbohydrate Polymers 90 (2012) 735-764, which is herein incorporated by reference in its entirety.

In another aspect, the structuring agent is in crystalline form, for example, crystal fibril, microfibril, or nanofibril form. In yet another aspect, the structuring agent is in a crystalline cellulose form. In an aspect, the crystalline form is a nanocrystalline form with a length of about 25 nm to about 100 nm in length and/or about 1 nm to about 25 nm in width. In yet another aspect, the crystalline form is a nanocrystalline form with a length of about 50 nm to about 75 nm in length and/or about 5 nm to about 20 nm in width.

As used herein, the term "dispersant" or "dispersing agent" may refer to substances added to a structuring of solid particles, typically a colloidal suspension, to improve the separation of the particles and to decrease or prevent settling or clumping.

In an aspect, the term "microfibril structuring agent" may refer to any structuring agent in the form of very fine fibrils, or fiber-like strands. Microfibril structuring agent can be any material that displays microfibrillar or nanofibrillar structural morphology. Examples of microfibril structuring agents include, for example, naturally-derived structures, such as animal-derived collagen or plant-derived celluloses. In another example, the disclosure provides for microfibrillated cellulose or nanocellulose, for example, such as those compounds and compositions described in "Microfibrillated Cellulose—Its Barrier Properties and Applications in Cellulosic Materials: A Review," Carbohydrate Polymers 90 (2012) 735-764, which is herein incorporated by reference in its entirety. Microfibril structuring agents may also be synthetically derived structures, such as polymeric micro-/nano-fibers produced via microfabrication or electrospinning.

In an aspect, "microfibrillated cellulose" or "MFC" refers to cellulose fibers of various origins, in which the fiber length and/or diameter is reduced vis-à-vis the fiber length/diameter of the original fiber. In another aspect, MFC is cellulose in fiber form that has been subjected to a mechanical treatment in order to increase the fiber's specific surface and to reduce their size in terms of cross-section and of length, wherein said size reduction leads to a fiber diameter in the nanometer range and a fiber length in the micrometer range. The microfibrillated cellulose may also have a high aspect ratio (ratio of length to diameter).

In an aspect, MFC is prepared from cellulose fibers that are defibrillated using high pressure or high mechanical force. Due to its large surface area and a high aspect ratio, microfibrillated cellulose is viewed as having a good ability to form rigid networks. The large surface area of the MFC and the high amount of accessible hydroxyl groups results in the MFC having high water holding capacity. The term "MFC", in accordance with the present invention, encompasses any single kind of microfibrillated cellulose as well as any mixture of structurally different microfibrillated celluloses.

Microfibrillated cellulose (also known as "reticulated" cellulose or as "superfine" cellulose, or as "cellulose nanofibrils", among others) is described, for example, in U.S. Pat. Nos. 4,481,077; 4,374,702; and 4,341,807, the contents of which are herein incorporated by reference in their entireties.

MFC in accordance with the "Turbak" (U.S. Pat. No. 4,374,702) process is produced by passing a liquid suspension of cellulose through a small diameter orifice in which the suspension is subjected to a pressure differential and high velocity shearing impact, followed by a high velocity decelerating impact, until the cellulose suspension becomes substantially stable. This process converts the cellulose into microfibrillated cellulose without inducing substantial chemical change to the cellulose as such. The microfibrillated cellulose is present in the form of individual fibrils or as fibril bundles (fibrils arranged together in a bundle).

An improved process for obtaining particularly homogeneous MFC is described in WO 2007/091942, the content of which is herein incorporated by reference in its entirety. A process for obtaining MFC with improved water retention properties and/or improved rheological properties, such as zero shear viscosity ($\eta_0$), in solution is described in WO 2015/180844, the content of which is herein incorporated by reference in its entirety.

In principle, the raw material ("origin") for the MFC in accordance with the present invention may be any cellulosic material, for example, wood, annual plants, cotton, flax, straw, ramie, bagasse (from sugar cane), suitable algae, jute, sugar beet, citrus fruits, waste from the food processing industry or energy crops or cellulose of bacterial origin or from animal origin, e.g., from tunicates.

In one preferred embodiment, wood-based materials are used as raw materials, either softwood or hardwood or both. Further preferably, softwood is used as raw material either one kind of softwood or mixtures of different types of softwood.

The MFC in accordance with the present invention may be produced according to any process known in the art. Preferably, said method comprises at least one mechanical pre-treatment step and at least one homogenizing step. The mechanical pre-treatment step preferably is or comprises a refining step. The method may also comprise a chemical pretreatment step. One examples of such pretreatment step might be oxidation of the $C_6$ hydroxyl groups on the surface of the microfibrils to carboxylic acids. The negative charges of the carboxylic groups cause repulsion between the microfibrils, which aids the defibrillation of the cellulose.

One purpose of the mechanical pretreatment step in accordance with the present process for manufacturing MFC is to "beat" the cellulose pulp in order to increase the accessibility of the cell walls, i.e., to increase the surface area. In the refiner that is preferably used in the mechanical pretreatment step, at least one rotating disk is employed. Therein, the cellulose pulp slurry is subjected to shear forces between the at least one rotating disk and at least one stationary disk.

Prior to the mechanical or chemical pretreatment step, or in between the mechanical or chemical pretreatment steps, or as the mechanical pretreatment step, enzymatic (pre) treatment of the cellulose pulp may be optionally performed, as preferred for some applications. Concerning enzymatic pretreatment in conjunction with microfibrillating cellulose, the respective content of WO 2007/091942 is cited and is incorporated herein by reference.

Physical modification of the cellulose microfibril surface may occur prior to the mechanical pretreatment step, between the mechanical pretreatment step and the defibrillation step or after the defibrillation step.

After the mechanical pretreatment step, the cellulose pulp slurry may optionally be passed through a homogenizer at least once, preferably at least twice, and subjected to a pressure drop by forcing the pulp slurry between opposing surfaces, preferably orifices. The term "orifice" means an opening or a nozzle or a valve contained in a homogenizer suitable for homogenizing cellulose. Concerning homogenization in conjunction with microfibrillating cellulose, the respective content of WO 2015/180844 is cited and is incorporated herein by reference.

The MFC according to the present invention may be subjected to at least one dewatering and/or drying step. The at least one drying step is preferably selected from freeze-, spray-, roller-drying; drying in a convection oven, flash drying or the like. "Never dried" microfibrillated cellulose may also be used and the microfibrillated cellulose used in the present invention might have a dry content ranging from 0.1%-100% before it is added to the composition.

Microfibrillated fibrous materials are now commercially available from such suppliers as: Borregaard (Sarpsborg, Norway) (products include EXILVA®, SENSEFI®); Wiedmann Fiber Technology (Rapperswil SG, Switzerland) (WMFC_QAdvanced); Engineered Fibers Technology LLC (Shelton, Conn.) (EFTECTM nanofibrillated fibers); American Process, Inc. (Atlanta, Ga.) (BIOPLUS® Fibrils); Celluforce (Montreal, Canada); Forest Products Laboratory (US Department of Agriculture); Lenzig AG (Austria)(products include Lyocell); Weyerhaeuser (Seattle, Wash.)(products include Lyocell); and other suppliers in Scandinavia and Japan.

In native cellulose structures there are native cellulose fibers (diameter=about 20,000 nm to about 60,000 nm), smaller macro fibril bundles, and still smaller micro fibril bundles. There are believed also to be single polymer chains (which do not visualize as easily in microscopy). In one aspect, microfibrillated cellulose is cellulose that has been treated mechanically, chemically, enzymatically, or with combination treatments to separate out macro fibril bundles and micro fibril bundles. These can loop off larger fibril bundles or extend from larger fibril bundles. It may be that there are unconnected micro fibril bundles, but the amounts are believed to be small, and the fibril bundles are believed to associate with the connected fibril bundles. There can be two or more tiers of diameter sizes. The micro fibril bundles (or their analog) are typically connected to stiffer, larger bundles.

A useful measurement parameter for MFC is the hydrodynamic size (HDS), especially the mean HDS (MHDS). This is measured by laser diffraction of a highly dilute suspension, using a Mastersizer 3000 (Malvern Instruments), [José et al., "On the Morphology of Cellulose Nanofibrils Obtained by TEMPO-mediated Oxidation and Mechanical Treatment," Micron, 72, 28-33 (2015)]. The substance so measured is a "fibrillated entity."

In some embodiments, the HDS or MHDS of the fibril, microbial, or nanofibril structuring agent is between about 1 micrometer and 1000 micrometers, between about 1 micrometer and 900 micrometers, between about 1 micrometer and 800 micrometers, between about 1 micrometer and 700 micrometers, between about 1 micrometer and 600 micrometers, between about 1 micrometer and 500 micrometers, between about 1 micrometer and 400 micrometers, between about 1 micrometer and 300 micrometers, between about 1 micrometer and 200 micrometers, between about 1 micrometer and 100 micrometers, between about 1 micrometer and 75 micrometers, or between about 1 micrometer and 50 micrometers. In one embodiment, the HDS or MHDS of the fibril, microbial, or nanofibril structuring agent is between about 1 micrometer and 100 micrometers.

In some embodiments, the hydrodynamic diameter or mean hydrodynamic diameter of the fibril, microbial, or nanofibril structuring agent is between about 1 nanometer and 500 nanometers, between about 1 nanometer and 400 nanometers, between about 1 nanometer and 300 nanometers, between about 1 nanometer and 200 nanometers, between about 1 nanometer and 100 nanometers, between about 10 nanometer and 200 nanometers, between about 10 nanometer and 100 nanometers, between about 10 nanometer and 75 nanometers, between about 10 nanometer and 50 nanometers, or between about 10 nanometer and 25 nanometers. In one embodiment, the hydrodynamic diameter or mean hydrodynamic diameter of the fibril, microbial, or nanofibril structuring agent is between about 1 nanometer and 100 nanometers.

In accordance with the present invention, the term "pesticide" or "agriculturally bioactive material" refers to at least one active compound selected from the groups of fungicides, insecticides, nematicides, herbicides, herbicide safeners, plant growth regulators; and/or plant health promoters biostimulants, or combinations thereof.

In some embodiments, the disclosure provides for any agriculturally bioactive material or combinations of, including a fungicide, insecticide, nematicide, herbicide, herbicide safener, plant growth regulator; and/or plant health promoter biostimulant, or combinations thereof suitable for soil application. In a preferred embodiment, the disclosure provides for any agriculturally bioactive material, comprising a fungicide, insecticide, nematicide, herbicide, herbicide safener, plant growth regulator; and/or plant health promoter biostimulant, or combinations thereof suitable for in-furrow application and/or application through a drip irrigation system; as well as application to foliage.

Examples of compounds according to the invention include, but are not limited to, biopesticides, such as *Bacillus subtilis* strain QST713 and GB03; *Bacillus subtilis* MB1600 *Bacillus cereus; Bacillus amyloliquefaciens; Bacillus pumilus; Bacillus thuringeinsis*; pyrethroid insecticides, such as bifenthrin, cyfluthrin; beta-cyfluthrin, tefluthrin; lambdacyhalothrin; gamma-cyhalothrin; alpha and zeta-cypermethrin; permethrin; insecticides, such as imidacloprid; thiamethoxam; mefenoxam; acetamidprid; dinotefuran; clothianidin; flupyradifurone; tetraniliprole, spirotetramat; thiacloprid; flonicamid; Abamectin; emamectin benzoate; avermectin B1; chlorantraniliprole; rynaxypyr; cyromazine; fipronil; ethiprole; cyflumetofen; spinosad; spinetoram; methoxyfenozide; sulfoxaflor; indoxacarb; Oxamyl; pyripoxyfen; etoxazole; fungicides, such as fluopyram prothioconazole trifloxystrobin; fludioxonil; azoxystrobin; pyraclostrobin; picoxystrobin; isopyrazam; lyserphenvalpyr; fenpicoxamid; fluoxastrobin; flutriafol; fludioxonil; acibenzolar-S-methyl; cyproconazole; tebuconazole; difenoconazole; methominostrobin; metconazole; mefentrifluconazole; tetraconazole; triticonazole; fenbuconazole; ipconazole; benzovindiflupyr; pydiflumetofen; mefentrifluconazole; isoflucypram; bixafen; metiram; metalxyl; propiconazole; cyprodinil; oxathiapiprolin; sedaxane; boscalid; fluxapyroxad; penthiopyrad; ametoctradin; myclobutanil; ethaboxam; mefenoxam; thiabendazole; fluopicolide; tolclofos-methyl; quinoxyfen; cymoxanil; famoxadone; cyazofamid; zoxamide; kresoxim-methyl; thiophanate-methyl; iprodione; iprovalicarb; BLAD polypeptide; and herbicides, thiencarbazone-methyl isoxaflutole; atrazine; simazine; metribuzin; mesotrione; tembotrione; topramezone; bicyclopyrone; S-metolachlor; acetochlor; dimethenamid-P; sulfentrazone; carfentrazone; carfentrazone-ethyl; pyroxasulfone; saflufenacil; formesafen; flumioxazin; sulfoxaflor; florasulam; cloransulam-methyl; penoxsulam; flumetsulam; pyroxsulam; diclosulam; aminopyralid; halauxifen-methyl; fluthiacet-methyl; diflufenican; chlorimuron ethyl; quinclorac; flumiclorac pentyl ester; (e.g., Nematacides including fluensufone; tioxazafen; steinernema riobrave; Plant health promoting stimulating substance, including biological organisms including pasteuria nishizawae-PN1; *Bacillus amyloliquefaciens* Strain D747 & MBI 600; extract of *Reynoutria sachalinensis*; chromobacterium subtsugae strain PRAA4-I-T; *Burkholderia* spp. strain A396; and Endomycorrhizal fungi.

Herbicide safeners include cyprosulfamide, benoxacor, dichlormid, mefenpyr, flurazole, furilazole, cloquintocet, naphthalic anhydride, fenchlorazole.

In an aspect, a composition described herein further includes an insecticide, herbicide, fungicide, or pesticide. In yet another aspect, the composition further includes one or more insecticidal active agents selected from the group consisting of acetamiprid, clothianidin (available as PONCHO®, Bayer CropScience LP, USA), dinotefuran, imidacloprid (available as GAUCHO®, Bayer CropScience LP, USA), nitenpyram, thiacloprid, tetraniliprole, thiamethoxam, isopyrazam, ethiprole, fipronil, and a combination of clothianidin and a biologic product of *Bacillus*. In another aspect, the *Bacillus*-based compound is selected from the group consisting of *Bacillus firmus, Bacillus cereus, Bacillus thuringiensis, Bacillus pumilus, Bacillus amyloliquefaciens, Bacillus subtilis, Bacillus subtilis* strain GB03, *Bacillus subtilis* strain QST713.

In an aspect, the composition described herein is in the form of a suspension concentrate.

In an aspect, the composition or fertilizer composition comprises about 10 grams to about 800 grams, about 100 grams to about 600 grams, about 100 to about 400 grams, about 200 grams to about 500 grams, about 300 grams to about 600 grams of active ingredient per liter of product.

In an aspect, the disclosure further provides for thickeners and/or thickening agents.

Optionally, a composition described herein further includes one or more additives selected from freeze-thaw stabilizers, surfactants, wetting agents, anti-foam agents, dyes and pigments, buffers, preservatives and biocides. In one embodiment, the surfactant is selected from anionic surfactants, alkyl d-glucopyranosides and mixtures of two or more thereof. In one embodiment, the alkyl d-glucopyranoside surfactant includes a mixture of $C_9$-$C_{11}$ alkyl d-glucopyranosides. The AGNIQUE® products of BASF SE are representative. A preferred product is AGNIQUE® PG9116, which is a mixture of $C_9$-$C_{11}$ alkyl d-glucopyranosides, having a degree of polymerization of about 1.6 and a hydrophilic-lipophilic balance (HLB) of about 13.1. In one embodiment, the anionic surfactant includes an alkylbenzene sulfonic acid salt, preferably a sodium salt. Representative anionic surfactants include the STEPWET® products of Stepan Company. A preferred product is STEPWET® DF-90, which is the sodium salt of dodecylbenzene sulfonic acid.

In one embodiment, the freeze-thaw stabilizer includes a polyalkylene glycol, preferably propylene glycol, present in an amount from about 1% to about 20% by weight, preferably about 5% to about 10% by weight of the total of all components in the composition, preferably about 9% by weight. In one embodiment, the freeze-thaw stabilizer includes glycerin, and is present in an amount from about 1% to about 20% by weight, preferably about 5% to about 10% by weight. In one embodiment, glycerin is present in about 9% by weight. In one embodiment, the freeze-thaw stabilizer includes ammonium sulfate (AMS), and is present in an amount from about 1% to about 20% by weight, preferably about 5% to about 10% by weight. In one embodiment, AMS is present in about 9% by weight. In one embodiment, the freeze-thaw stabilizer includes urea, and is present in an amount from about 1% to about 20% by weight, preferably about 5% to about 10% by weight. In one embodiment, urea is present in about 9% by weight. AMS and urea provide additional benefits to the formulation by also serving as a fertilizer and as a density modifier for the aqueous formulation. "Freeze-thaw stabilizers" are also known as "antifreeze agents".

In an embodiment, the anti-foam agent includes dimethylpolysiloxane or aqueous non-ionic emulsions thereof, including but not limited to 10%, 20% or 30% emulsions. In an embodiment, the anti-foam agent includes an alkylcyclotetrasiloxane, preferably an octamethylcyclotetrasiloxane silicone emulsion, for example, DOW CORNING® AF Emulsion or DOW CORNING® ANTIFOAM C Emulsion (Dow Corning Corporation). When present, the antifoam agent is present in an amount of from about 0.001% to about 1% by weight of all the components in the total formulation.

The preservative can be an isothiazolinone or a mixture of isothiazolinones, for example, KATHON® CG/ICP preservative (a mixture of 5-chloro-2-methyl-4-isothiazolin-3-one and 2-methyl-4-isothiazolin-3-one), or LEGEND® MK preservative (Rohm and Haas Corporation), or PROXEL® BR preservative (Avecia Corporation). The preservatives can also be 1,2-Benzisothiazolin-3-on as sodium salt (BIT), such as PROXEL® GXL 20%. The preservative can also be food grade preservatives, such as potassium sorbate or sodium benzoate. In an aspect, the preservative is present in an amount of from about 0.01 to about 2% or about 0.001% to about 1% by weight of the total of all components in the formulation. Preservatives include, but are not limited to, biocidal compounds, antimicrobial compounds, and the like.

In another aspect, a composition disclosed herein may optionally include one or more additional compounds providing an additional beneficial or otherwise useful effect. Such compounds include, without limitation, an adhesive, a surfactant, a solvent, a wetting agent, an emulsifying agent, a carrier, an adjuvant, a diluent, a dispersing agent an insecticide, a pesticide, a fungicide, a fertilizer of a micronutrient or macronutrient nature, a herbicide, a feeding inhibitor, an insect moulting inhibitor, an insect mating inhibitor, an insect maturation inhibitor, a nematicide, a nutritional or horticultural supplement, or any combination thereof. In an aspect, a composition described herein is odor free.

As used herein, the term "about" is used to indicate that certain preferred operating ranges, such as ranges for molar rations for reactants, material amounts, and temperature, are not fixedly determined. The meaning will often be apparent to one of ordinary skill. For example, a recitation of a temperature range of about 120° C. to about 135° C. in reference to, for example, an organic chemical reaction would be interpreted to include other like temperatures that can be expected to favor a useful reaction rate for the reaction, such as 105° C. or 150° C. Where guidance from the experience of those of ordinary skill is lacking, guidance from the context is lacking, and where a more specific rule is not recited below, the "about" range shall be not more than 10% of the absolute value of an end point or 10% of the range recited, whichever is less.

Compositions of the present invention can be obtained by culturing the disclosed bacterial strains or a fungicidal mutant (strain) derived therefrom according to methods well known in the art. Conventional large-scale microbial culture processes include submerged fermentation, solid state fermentation, or liquid surface culture. Towards the end of fermentation, as nutrients are depleted, cells begin the transition from growth phase to sporulation phase, such that the final product of fermentation is largely spores, metabolites and residual fermentation medium. Sporulation is part of the natural life cycle of *Bacillus* sp. and *Paenibacillus* sp. bacteria and is generally initiated by the cell in response to nutrient limitation. Fermentation is configured to obtain high levels of colony forming units of and to promote sporulation. The bacterial cells, spores and metabolites in culture media resulting from fermentation may be used directly or concentrated by conventional industrial methods, such as centrifugation, tangential-flow filtration, depth filtration, and evaporation.

Compositions of the present invention include fermentation products. In some embodiments, the concentrated fermentation broth is washed, for example, via a diafiltration process, to remove residual fermentation broth and metabolites. The term "broth concentrate," as used herein, refers to whole broth (fermentation broth) that has been concentrated by conventional industrial methods, as described above, but remains in liquid form. The term "fermentation solid," as used herein, refers to the solid material that remains after the fermentation broth is dried. The term "fermentation product," as used herein, refers to whole broth, broth concentrate and/or fermentation solids. Compositions of the present invention include fermentation products.

The fermentation broth or broth concentrate can be dried with or without the addition of carriers using conventional drying processes or methods such as spray drying, freeze drying, tray drying, fluidized-bed drying, drum drying, or evaporation.

The resulting dry products may be further processed, such as by milling or granulation, to achieve a specific particle size or physical format. Carriers, described below, may also be added post-drying.

Cell-free preparations of fermentation broth of the bacterial strains of the present invention can be obtained by any means known in the art, such as extraction, centrifugation and/or filtration of fermentation broth. Those of skill in the art will appreciate that so-called cell-free preparations may not be devoid of cells but rather are largely cell-free or essentially cell-free, depending on the technique used (e.g., speed of centrifugation) to remove the cells. The resulting cell-free preparation may be dried and/or formulated with components that aid in its application to plants or to plant growth media. Concentration methods and drying techniques described above for fermentation broth are also applicable to cell-free preparations.

In some embodiments, the composition comprises Bacillus bacteria. The *Bacillus* bacteria may be strains of *Bacillus alcalophilus, Bacillus alvei, Bacillus aminovorans, Bacillus amyloliquefaciens, Bacillus aneurinolyticus, Bacillus aquaemaris, Bacillus atrophaeus, Bacillus boroniphilius, Bacillus brevis, Bacillus caldolyticus, Bacillus centrosporus, Bacillus cereus, Bacillus circulans, Bacillus coagulans, Bacillus firmus, Bacillus flavothermus, Bacillus fusiformis,*

*Bacillus globigii, Bacillus infernus, Bacillus larvae, Bacillus laterosporus, Bacillus lentus, Bacillus licheniformis, Bacillus megaterium, Bacillus mesentericus, Bacillus mucilaginosus, Bacillus mycoides, Bacillus natto, Bacillus pantothenticus, Bacillus polymyxa, Bacillus pseudoanthracis, Bacillus pumilus, Bacillus schlegelii, Bacillus sphaericus, Bacillus sporothermodurans, Bacillus stearothermophillus, Bacillus subtilis, Bacillus thermoglucosidasius, Bacillus thuringiensis, Bacillus vulgatis, Bacillus weihenstephanensis*, or combinations thereof.

In other embodiments, the composition comprises *Paenibacillus* bacteria. The *Paenibacillus* bacteria may be strains of *Paenibacillus alvei; Paenibacillus amylolyticus; Paenibacillus azotofixans; Paenibacillus cookii; Paenibacillus macerans; Paenibacillus polymyxa; Paenibacillus terrae; Paenibacillus validus*, or combinations thereof.

In certain aspects, the composition comprises a bacterial strain selected from the group consisting of *Bacillus chitinosporus* AQ746 (NRRL Accession No. B-21618), *Bacillus mycoides* AQ726 (NRRL Accession No. B-21664), *Bacillus pumilus* (NRRL Accession No. B-30087), *Bacillus pumilus* AQ717 (NRRL Accession No. B-21662), *Bacillus* sp. AQ175 (ATCC Accession No. 55608), *Bacillus* sp. AQ177 (ATCC Accession No. 55609), *Bacillus* sp. AQ178 (ATCC Accession No. 53522), *Bacillus subtilis* AQ743 (NRRL Accession No. B-21665), *Bacillus subtilis* AQ713 (NRRL Accession No. B-21661), *Bacillus subtilis* AQ153 (ATCC Accession No. 55614), *Bacillus thuringiensis* BD#32 (NRRL Accession No. B-21530), *Bacillus thuringiensis* AQ52 (NRRL Accession No. B-21619), *Muscodor albus* 620 (NRRL Accession No. 30547), *Muscodor roseus* A3-5 (NRRL Accession No. 30548), *Rhodococcus globerulus* AQ719 (NRRL Accession No. B-21663), *Streptomyces galbus* (NRRL Accession No. 30232), *Streptomyces* sp. (NRRL Accession No. B-30145), *Bacillus thuringiensis* subspec. *kurstaki* BMP 123, *Bacillus subtilis* AQ30002 (NRRL Accession No. B-50421), and *Bacillus subtilis* AQ 30004 (NRRL Accession No. B-50455) and a mutant of these strains having all the identifying characteristics of the respective strain.

Mutants of the bacterial strains disclosed herein may be genetic variants having a genomic sequence that has greater than about 85%, greater than about 90%, greater than about 95%, greater than about 98%, or greater than about 99% sequence identity to the respective bacterial strains. Mutants may be obtained by treating cells of the disclosed bacterial strains with chemicals or irradiation or by selecting spontaneous mutants from a population of the respective strains (such as phage resistant or antibiotic resistant mutants), by genome shuffling, as described below, or by other means well known to those practiced in the art.

Genome shuffling among bacterial strains can be facilitated through the use of a process called protoplast fusion. The process begins with the formation of protoplasts from vegetative bacillary cells. The removal of peptidoglycan cell wall, typically using lysozyme and an osmotic stabilizer, results in the formation of a protoplast. This process is visible under a light microscope with the appearance of spherical cells. Addition of PEG, polyethylene glycol, then induces fusion among protoplasts, allowing genetic contents of two or more cells to come in contact facilitating recombination and genome shuffling. Fused cells then repartition and are recovered on a solid growth medium. During recovery, protoplasts rebuild peptidoglycan cell walls, transitioning back to bacillary shape. See Schaeffer, et al., (1976) PNAS USA, vol. 73, 6:2151-2155).

In some embodiments, the composition comprises a fungicide. The fungicide may be selected from any one of the following:

(1) Inhibitors of the ergosterol biosynthesis, for example (1.001) cyproconazole, (1.002) difenoconazole, (1.003) epoxiconazole, (1.004) fenhexamid, (1.005) fenpropidin, (1.006) fenpropimorph, (1.007) fenpyrazamine, (1.008) fluquinconazole, (1.009) flutriafol, (1.010) imazalil, (1.011) imazalil sulfate, (1.012) ipconazole, (1.013) metconazole, (1.014) myclobutanil, (1.015) paclobutrazol, (1.016) prochloraz, (1.017) propiconazole, (1.018) prothioconazole, (1.019) Pyrisoxazole, (1.020) spiroxamine, (1.021) tebuconazole, (1.022) tetraconazole, (1.023) triadimenol, (1.024) tridemorph, (1.025) triticonazole, (1.026) (1R,2S,5S)-5-(4-chlorobenzyl)-2-(chloromethyl)-2-methyl-1-(1H-1,2,4-triazol-1-ylmethyl)-cyclopentanol, (1.027) (1S,2R,5R)-5-(4-chlorobenzyl)-2-(chloromethyl)-2-methyl-1-(1H-1,2,4-triazol-1-ylmethyl)cyclopentanol, (1.028) (2R)-2-(1-chlorocyclopropyl)-4-[(1R)-2,2-dichloro-cyclopropyl]-1-(1H-1,2,4-triazol-1-yl)butan-2-ol, (1.029) (2R)-2-(1-chlorocyclopropyl)-4-[(1S)-2,2-dichlorocyclopropyl]-1-(1H-1,2,4-triazol-1-yl)butan-2-ol, (1.030) (2R)-2-[4-(4-chlorophenoxy)-2-(trifluoromethyl)phenyl]-1-(1H-1,2,4-triazol-1-yl)propan-2-ol, (1.031) (2S)-2-(1-chlorocyclopropyl)-4-[(1R)-2,2-dichlorocyclopropyl]-1-(1H-1,2,4-triazol-1-yl)butan-2-ol, (1.032) (2S)-2-(1-chlorocyclopropyl)-4-[(1S)-2,2-dichlorocyclopropyl]-1-(1H-1,2,4-triazol-1-yl)butan-2-ol, (1.033) (2S)-2-[4-(4-chlorophenoxy)-2-(trifluoromethyl)phenyl]-1-(1H-1,2,4-triazol-1-yl)propan-2-ol, (1,034) (R)-[3-(4-chloro-2-fluorophenyl)-5-(2,4-difluorophenyl)-1,2-(pyridin-3-yl) methanol, (1,035) (S)-[3-(4-chloro-2-fluorophenyl)-5-(2,4-difluoro-phenyl)-1,2-oxazol-4-yl](pyridin-3-yl)methanol, (1,036) [3-(4-chloro-2-fluorophenyl)-5-(2,4-difluorophenyl)-1,2-oxazol-4-yl](pyridin-3-yl)methanol, (1.037) 1-({(2R,4S)-2-[2-chloro-4-(4-chlorophenoxy)phenyl]-4-methyl-1,3-dioxolan-2-yl}methyl)-1H-1,2,4-triazole, (1.038) 1-({(2S ,4S)-2-[2-chloro-4-(4-chlorophenoxy)phenyl]-4-methyl-1 ,3-dioxolan-2-yl}methyl)-1H-1,2,4-triazole, (1,039) 1-{[3-(2-chlorophenyl)-2-(2,4-difluorophenyl) oxiran-2-yl]methyl}-1H-1,2,4-triazol-5-yl thiocyanate, (1,040) 1-{[rel(2R,3R)-3-(2-chlorophenyl)-2-(2,4-difluorophenyl)oxiran-2-yl]methyl}-1H-1,2,4-triazol-5-yl thiocyanate, (1.041) 1-{[rel(2R,3S)-3-(2-chlorophenyl)-2-(2,4-difluorophenyl)oxiran-2-yl]methyl}-1H-1,2,4-triazol-5-yl thiocyanate, (1.,042) 2-[(2R,4R,5R)-1-(2,4-dichlorophenyl)-5-hydroxy-2,6,6-trimethylheptan-4-yl]-2,4-dihydro-3H-1,2,4-triazole-3-thione, (1,043) 2-[(2R,4R,5S)-1-(2,4-dichlorophenyl)-5-hydroxy-2,6,6-trimethylheptan-4-yl]-2,4-dihydro-3H-1,2,4-triazole-3-thione, (1,044) 2-[(2R,4S,5R)-1-(2,4-dichlorophenyl)-5-hydroxy-2,6,6-trimethylheptan-4-yl]-2,4-dihydro-3H-1,2,4-triazole-3-thione, (1,045) 2-[(2R,4S,5S)-1-(2,4-dichlorophenyl)-5-hydroxy-2,6,6-trimethylheptan-4-yl]-2,4-dihydro-3H-1,2,4-triazole-3-thione, (1,046) 2-[(2S,4R,5R)-1-(2,4-dichlorophenyl)-5-hydroxy-2,6,6-trimethylheptan-4-yl]-2,4-dihydro-3H-1,2,4-triazole-3-thione, (1.047) 2-[(2S,4R,5S)-1-(2,4-dichlorophenyl)-5-hydroxy-2,6,6-trimethylheptan-4-yl]-2,4-dihydro-3H-1,2,4-triazole-3-thione, (1,048) 2-[(2S,4S ,5R)-1-(2,4-dichlorophenyl)-5-hydroxy-2,6,6-trimethylheptan-4-yl]-2,4-dihydro-3H-1,2,4-triazole-3-thione, (1.049) 2-[(2S,4S ,5S)-1-(2,4-dichlorophenyl)-5-hydroxy-2,6,6-trimethylheptan-4-yl]-2,4-dihydro-3H-1,2,4-triazole-3-thione, (1.050) 2-[1-(2,4-dichlorophenyl)-5-hydroxy-2,6,6-trimethylheptan-4-yl]-2,4-dihydro-3H-1,2,4-triazole-3-thione, (1.051) 242-chloro-4-(2,4-dichlorophenoxy)phenyl]-1-(1H-1,2,4-triazol-1-yl)

propan-2-ol, (1.052) 2-[2-chloro-4-(4-chlorophenoxy) phenyl]-1-(1H-1,2,4-triazol-1-yl)butan-2-ol, (1.053) 2-[4-(4-chlorophenoxy)-2-(trifluoromethyl)phenyl]-1-(1 H-1,2,4-triazol-1-yl)butan-2-ol, (1.054) 2-[4-(4-chlorophenoxy)-2-(trifluoromethyl)phenyl]-1-(1H-1,2,4-triazol-1-yl)pentan-2-ol, (1.055) Mefentrifluconazole, (1.056) 2-{[3-(2-chlorophenyl)-2-(2,4-difluorophenyl)oxiran-2-yl]methyl}-2,4-dihydro-3H-1,2,4-triazole-3-thione, (1.057) 2-{[rel(2R,3R)-3-(2-chlorophenyl)-2-(2,4-difluorophenyl)oxiran-2-yl] methyl}-2,4-dihydro-3H-1,2,4-triazole-3-thione, (1.058) 2-{[rel(2R,3S)-3-(2-chlorophenyl)-2-(2,4-difluorophenyl) oxiran-2-yl]methyl}-2,4-dihydro-3H-1,2,4-triazole-3-thione, (1.059) 5-(4-chlorobenzyl)-2-(chloro-methyl)-2-methyl-1-(1H-1,2,4-triazol-1-ylmethyl)cyclopentanol, (1.060) 5-(allylsulfanyl)-1-{[3-(2-chlorophenyl)-2-(2,4-difluorophenyl)oxiran-2-yl]methyl}-1H-1,2,4-triazole, (1.061) 5-(allylsulfanyl)-1-{[rel(2R,3R)-3-(2-chlorophenyl)-2-(2,4-difluorophenyl)oxiran-2-yl]methyl}-1H-1,2,4-triazole, (1.062) 5-(allylsulfanyl)-1-{[rel(2R,3S)-3-(2-chlorophenyl)-2-(2,4-difluorophenyl)oxiran-2-yl]methyl}-1H-1,2,4-triazole, (1.063) N'-(2,5-dimethyl-4-{[3-(1,1,2,2-tetrafluoroethoxy)phenyl]sulfanyl}phenyl)-N-ethyl-N-methylimidoformamide, (1.064) N'-(2,5-dimethyl-4-{[3-(2,2,2-trifluoroethoxy)phenyl]sulfanyl}phenyl)-N-ethyl-N-methylimidoform-amide, (1.065) N'-(2,5-dimethyl-4-{[3-(2,2,3,3-tetrafluoropropoxy)phenyl]sulfanyl}phenyl)-N-ethyl-N-methylimidoformamide, (1.066) N'-(2,5-dimethyl-4-{[3-(pentafluoroethoxy)phenyl]-sulfanyl}phenyl)-N-ethyl-N-methylimidoformamide, (1.067) N'-(2,5-dimethyl-4-{3-[(1,1,2,2-tetrafluoroethyl)sulfanyl]phenoxy}phenyl)-N-ethyl-N-methylimidoformamide, (1.068) N'-(2,5-dimethyl-4-{3-[(2,2,2-trifluoroethyl)sulfanyl]phenoxy}phenyl)-N-ethyl-N-methylimidoform-amide, (1.069) N'-(2,5-dimethyl-4-{3-[(2,2,3,3-tetrafluoropropyl)sulfanyl]phenoxy}phenyl)-N-ethyl-N-methylimidoformamide, (1.070) N'-(2,5-dimethyl-4-{3-[(pentafluoroethyl)sulfanyl]-phenoxy}phenyl)-N-ethyl-N-methylimidoformamide, (1.071) N'-(2,5-dimethyl-4-phenoxy-phenyl)-N-ethyl-N-methylimidoformamide, (1.072) N'-(4-{[3-(difluoromethoxy)phenyl]-sulfanyl}-2,5-dimethylphenyl)-N-ethyl-N-methylimidoformamide, (1.073) N'-(4-{3-[(difluoro-methyl)sulfanyl]phenoxy}-2,5-dimethylphenyl)-N-ethyl-N-methylimidoformamide, (1.074) N'-[5-bromo-6-(2,3-dihydro-1H-inden-2-yloxy)-2-methylpyridin-3-yl]-N-ethyl-N-methylimido-formamide, (1.075) N'-{4-[(4,5-dichloro-1,3-thiazol-2-yl)oxy]-2,5-dimethylphenyl}-N-ethyl-N-methylimidoformamide, (1.076) N'-{5-bromo-6-[(1R)-1-(3,5-difluorophenyl)ethoxy]-2-methylpyridin-3-yl}-N-ethyl-N-methylimidoformamide, (1.077) N'-{5-bromo-6-[(1S)-1-(3,5-difluorophenyl) ethoxy]-2-methylpyridin-3-yl}-N-ethyl-N-methylimidoformamide, (1.078) N'-{5-bromo-6-[(cis-4-isopropylcyclohexyl)oxy]-2-methylpyridin-3-yl}-N-ethyl-N-methylimidoformamide, (1.079) N'-{5-bromo-6-[(trans-4-isopropylcyclohexyl)oxy]-2-methylpyridin-3-yl}-N-ethyl-N-methylimidoformamide, (1.080) N'-{5-bromo-6-[1-(3,5-difluorophenyl)ethoxy]-2-methylpyridin-3-yl}-N-ethyl-N-methylimidoformamide, (1.081) Ipfentrifluconazole.

(2) Inhibitors of the respiratory chain at complex I or II, for example (2.001) benzovindiflupyr, (2.002) bixafen, (2.003) boscalid, (2.004) carboxin, (2.005) fluopyram, (2.006) flutolanil, (2.007) fluxapyroxad, (2.008) furametpyr, (2.009) Isofetamid, (2.010) isopyrazam (anti-epimeric enantiomer 1R,4S,9S), (2.011) isopyrazam (anti-epimeric enantiomer 1S,4R,9R), (2.012) isopyrazam (anti-epimeric racemate 1RS,4SR,9SR), (2.013) isopyrazam (mixture of syn-epimeric racemate 1RS,4SR,9RS and anti-epimeric racemate 1RS,4SR,9SR), (2.014) isopyrazam (syn-epimeric enantiomer 1R,4S,9R), (2.015) isopyrazam (syn-epimeric enantiomer 1S,4R,9S), (2.016) isopyrazam (syn-epimeric racemate 1RS,4SR,9RS), (2.017) penflufen, (2.018) penthiopyrad, (2.019) pydiflumetofen, (2.020) Pyraziflumid, (2.021) sedaxane, (2.022) 1,3-dimethyl-N-(1,1,3-trimethyl-2,3-dihydro-1H-inden-4-yl)-1H-pyrazole-4-carboxamide, (2.023) 1,3-dimethyl-N-[(3R)-1,1,3-trimethyl-2,3-dihydro-1H-inden-4-yl]-1H-pyrazole-4-carboxamide, (2.024) 1,3-dimethyl-N-[(3S)-1,1,3-trimethyl-2,3-dihydro-1H-inden-4-yl]-1H-pyrazole-4-carboxamide, (2.025) 1-methyl-3-(trifluoromethyl)-N-[2'-(trifluoromethyl)biphenyl-2-yl]-1H-pyrazole-4-carboxamide, (2.026) 2-fluoro-6-(trifluoromethyl)-N-(1,1,3-trimethyl-2,3-dihydro-1H-inden-4-yl)benzamide, (2.027) 3-(difluoromethyl)-1-methyl-N-(1,1,3-trimethyl-2,3-dihydro-1H-inden-4-yl)-1H-pyrazole-4-carboxamide, (2.028) 3-(difluoromethyl)-1-methyl-N-[(3R)-1,1,3-trimethyl-2,3-dihydro-1H-inden-4-yl]-1H-pyrazole-4-carboxamide, (2.029) 3-(difluoromethyl)-1-methyl-N-[(3S)-1,1,3-trimethyl-2,3-dihydro-1H-inden-4-yl]-1H-pyrazole-4-carboxamide, (2.030) Fluindapyr, (2.031) 3-(difluoromethyl)-N-[(3R)-7-fluoro-1,1,3-trimethyl-2,3-dihydro-1H-inden-4-yl]-1-methyl-1H-pyrazole-4-carboxamide, (2.032) 3-(difluoromethyl)-N-[(3S)-7-fluoro-1,1,3-trimethyl-2,3-dihydro-1H-inden-4-yl]-1-methyl-1H-pyrazole-4-carboxamide, (2.033) 5,8-difluoro-N-[2-(2-fluoro-4-{[4-(trifluoromethyl)pyridin-2-yl]oxy}phenyl) ethyl]quinazolin-4-amine, (2.034) N-(2-cyclopentyl-5-fluorobenzyl)-N-cyclopropyl-3-(difluoromethyl)-5-fluoro-1-methyl-1H-pyrazole-4-carboxamide, (2.035) N-(2-tert-butyl-5-methylbenzyl)-N-cyclopropyl-3-(difluoromethyl)-5-fluoro-1-methyl-1H-pyrazole-4-carboxamide, (2.036) N-(2-tert-butylbezyl)-N-cyclopropyl-3-(difluoromethyl)-5-fluoro-1-methyl-1H-pyrazole-4-carboxamide, (2.037) N-(5-chloro-2-ethylbenzyl)-N-cyclopropyl-3-(difluoromethyl)-5-fluoro-1-methyl-1H-pyrazole-4-carboxamide, (2.038) isoflucypram, (2.039) N-[(1R,4S)-9-(dichloromethylene)-1,2,3,4-tetrahydro-1,4-methanonaphthalen-5-yl]-3-(difluoromethyl)-1-methyl-1H-pyrazole-4-carboxamide, (2.040) N-[(1S,4R)-9-(dichloromethylene)-1,2,3,4-tetrahydro-1,4-methanonaphthalen-5-yl]-3-(difluoro-methyl)-1-methyl-1H-pyrazole-4-carboxamide, (2.041) N-[1-(2,4-dichlorophenyl)-1-methoxypropan-2-yl]-3-(difluoromethyl)-1-methyl-1H-pyrazole-4-carboxamide, (2.042) N-[2-chloro-6-(trifluoromethyl)benzyl]-N-cyclopropyl-3-(difluoromethyl)-5-fluoro-1-methyl-1H-pyrazole-4-carboxamide, (2.043) N-[3-chloro-2-fluoro-6-(trifluoromethyl)benzyl]-N-cyclo-propyl-3-(difluoromethyl)-5-fluoro-1-methyl-1H-pyrazole-4-carboxamide, (2.044) N -[5-chloro-2-(trifluoromethyl) benzyl]-N-cyclopropyl-3-(difluoromethyl)-5-fluoro-1-methyl-1H-pyrazole-4-carboxamide, (2.045) N-cyclopropyl-3-(difluoromethyl)-5-fluoro-1-methyl-N-[5-methyl-2-(trifluoromethyl)benzyl]-1H-pyrazole-4-carboxamide, (2.046) N-cyclopropyl-3-(difluoromethyl)-5-fluoro-N-(2-fluoro-6-isopropylbenzyl)-1-methyl-1H-pyrazole-4-carboxamide, (2.047) N-cyclopropyl-3-(difluoromethyl)-5-fluoro-N-(2-isopropyl-5-methyl-benzyl)-1-methyl-1H-pyrazole-4-carboxamide, (2.048) N-cyclopropyl-3-(difluoromethyl)-5-fluoro-N-(2-isopropylbenzyl)-1-methyl-1H-pyrazole-4-carbothioamide, (2.049) N-cyclopropyl-3-(difluoromethyl)-5-fluoro-N-(2-isopropylbenzyl)-1-methyl-1H-pyrazole-4-carboxamide, (2.050) N-cyclopropyl-3-(difluoromethyl)-5-fluoro-N-(5-fluoro-2-isopropylbenzyl)-1-methyl-1H-pyrazole-4-carboxamide, (2.051) N-cyclopropyl-3-(difluoromethyl)-N-(2-ethyl-4,5-dimethylbenzyl)-5-fluoro-1-methyl-1H-pyrazole-4-carboxamide, (2.052) N-cyclopropyl-3-(difluoromethyl)-N-(2-ethyl-5- fluorobenzyl)-5-fluoro-1-methyl-1H-pyrazole-4-carboxamide, (2.053)-N-cyclopropyl-3-(difluoromethyl)-N-(2-ethyl-5-methylbenzyl)-5-fluoro-1-methyl-1H-pyrazole-4-carboxamide, (2.054) N-cyclopropyl-N-(2-cyclopropyl-5-fluorobenzyl)-3-(difluoromethyl)-5-fluoro-1-methyl-1H-pyrazole-4-carboxamide, (2.055) N-cyclopropyl-N-(2-cyclopropyl-5-methylbenzyl)-3-(difluoromethyl)-5-fluoro-1-methyl-1H-pyrazole-4-carboxamide, (2.056) N-cyclopropyl-N-(2-cyclopropylbenzyl)-3-(difluoromethyl)-5-fluoro-1-methyl-1H-pyrazole-4-carboxamide, (2.057) pyrapropoyne.

(3) Inhibitors of the respiratory chain at complex III, for example (3.001) ametoctradin, (3.002) amisulbrom, (3.003) azoxystrobin, (3.004) coumethoxystrobin, (3.005) coumoxystrobin, (3.006) cyazofamid, (3.007) dimoxystrobin, (3.008) enoxastrobin, (3.009) famoxadone, (3.010) fenamidone, (3.011) flufenoxystrobin, (3.012) fluoxastrobin, (3.013) kresoxim-methyl, (3.014) metominostrobin, (3.015) orysastrobin, (3.016) picoxystrobin, (3.017) pyraclostrobin, (3.018) pyrametostrobin, (3.019) pyraoxystrobin, (3.020) trifloxystrobin, (3.021) (2E)-2-{2-[({[(1E)-1-(3-{[(E)-1-fluoro-2-phenylvinyl]oxy} phenyl)ethylidene]amino}oxy)methyl]phenyl}-2-(methoxyimino)-N-methylacetamide, (3.022) (2E,3Z)-5-{[1-(4-chlorophenyl)-1H-pyrazol-3-yl]oxy}-2-(methoxyimino)-N,3-dimethylpent-3-enamide, (3.023) (2R)-2-{2-[(2,5-dimethylphenoxy)methyl]phenyl}-2-methoxy-N-methylacetamide, (3.024) (2S)-2-{2-[(2,5-dimethylphenoxy)methyl]phenyl}-2-methoxy-N-methylacetamide, (3.025) (3S,6S,7R,8R)-8-benzyl-3-[({3-[(isobutyryloxy)methoxy]-4-methoxypyridin-2-yl}carbonyl)amino]-6-methyl-4,9-dioxo-1,5-dioxonan-7-yl 2-methylpropanoate, (3.026) mandestrobin, (3.027) N-(3-ethyl-3,5,5-trimethylcyclohexyl)-3-formamido-2-hydroxybenzamide, (3.028) (2E,3Z)-5-{[1-(4-chloro-2-fluorophenyl)-1H-pyrazol-3-yl]oxy}-2-(methoxyimino)-N,3-dimethylpent-3-enamide, (3.029) methyl {5-[3-(2,4-dimethylphenyl)-1H-pyrazol-1-yl]-2-methylbenzyl}carbamate, (3.030) metyltetraprole, (3.031) florylpicoxamid.

(4) Inhibitors of the mitosis and cell division, for example (4.001) carbendazim, (4.002) diethofencarb, (4.003) ethaboxam, (4.004) fluopicolide, (4.005) pencycuron, (4.006) thiabendazole, (4.007) thiophanate-methyl, (4.008) zoxamide, (4.009) 3-chloro-4-(2,6-difluorophenyl)-6-methyl-5-phenylpyridazine, (4.010) 3-chloro-5-(4-chlorophenyl)-4-(2,6-difluorophenyl)-6-methylpyridazine, (4.011) 3-chloro-5-(6-chloropyridin-3-yl)-6-methyl-4-(2,4,6-trifluorophenyl)pyridazine, (4.012) 4-(2-bromo-4-fluorophenyl)-N-(2,6-difluorophenyl)-1,3-dimethyl-1H-pyrazol-5-amine, (4.013) 4-(2-bromo-4-fluorophenyl)-N-(2-bromo-6-fluorophenyl)-1,3-dimethyl-1H-pyrazol-5-amine, (4.014) 4-(2-bromo-4-fluorophenyl)-N-(2-bromophenyl)-1,3-dimethyl-1H-pyrazol-5-amine, (4.015) 4-(2-bromo-4-fluorophenyl)-N-(2-chloro-6-fluorophenyl)-1,3-dimethyl-1H-pyrazol-5-amine, (4.016) 4-(2-bromo-4-fluorophenyl)-N-(2-chlorophenyl)-1,3-dimethyl-1H-pyrazol-5-amine, (4.017) 4-(2-bromo-4-fluorophenyl)-N-(2-fluorophenyl)-1,3-dimethyl-1H-pyrazol-5-amine, (4.018) 4-(2-chloro-4-fluorophenyl)-N-(2,6-difluorophenyl)-1,3-dimethyl-1H-pyrazol-5-amine, (4.019) 4-(2-chloro-4-fluorophenyl)-N-(2-chloro-6-fluorophenyl)-1,3-dimethyl-1H-pyrazol-5-amine, (4.020) 4-(2-chloro-4-fluorophenyl)-N-(2-chlorophenyl)-1,3-dimethyl-1H-pyrazol-5-amine, (4.021) 4-(2-chloro-4-fluorophenyl)-N-(2-fluorophenyl)-1,3-dimethyl-1H-pyrazol-5-amine, (4.022) 4-(4-chlorophenyl)-5-(2,6-difluorophenyl)-3,6-dimethylpyridazine, (4.023) N-(2-bromo-6-fluorophenyl)-4-(2-chloro-4-fluorophenyl)-1,3-dimethyl-1H-pyrazol-5-amine, (4.024) N-(2-bromophenyl)-4-(2-chloro-4-fluorophenyl)-1,3-dimethyl-1H-pyrazol-5-amine, (4.025) N-(4-chloro-2,6-difluorophenyl)-4-(2-chloro-4-fluorophenyl)-1,3-dimethyl-1H-pyrazol-5-amine.

(5) Compounds capable to have a multisite action, for example (5.001) bordeaux mixture, (5.002) captafol, (5.003) captan, (5.004) chlorothalonil, (5.005) copper hydroxide, (5.006) copper naphthenate, (5.007) copper oxide, (5.008) copper oxychloride, (5.009) copper(2+) sulfate, (5.010) dithianon, (5.011) dodine, (5.012) folpet, (5.013) mancozeb, (5.014) maneb, (5.015) metiram, (5.016) metiram zinc, (5.017) oxine-copper, (5.018) propineb, (5.019) sulfur and sulfur preparations including calcium polysulfide, (5.020) thiram, (5.021) zineb, (5.022) ziram, (5.023) 6-ethyl-5,7-dioxo-6,7-dihydro-5H-pyrrolo[3',4':5,6][1,4]dithiino[2,3-c][1,2]thiazole-3-carbonitrile.

(6) Compounds capable to induce a host defence, for example (6.001) acibenzolar-S-methyl, (6.002) isotianil, (6.003) probenazole, (6.004) tiadinil.

(7) Inhibitors of the amino acid and/or protein biosynthesis, for example (7.001) cyprodinil, (7.002) kasugamycin, (7.003) kasugamycin hydrochloride hydrate, (7.004) oxytetracycline, (7.005) pyrimethanil, (7.006) 3-(5-fluoro-3,3,4,4-tetramethyl-3,4-dihydroisoquinolin-1-yl)quinoline.

(8) Inhibitors of the ATP production, for example (8.001) silthiofam.

(9) Inhibitors of the cell wall synthesis, for example (9.001) benthiavalicarb, (9.002) dimethomorph, (9.003) flumorph, (9.004) iprovalicarb, (9.005) mandipropamid, (9.006) pyrimorph, (9.007) valifenalate, (9.008) (2E)-3-(4-tert-butylphenyl)-3-(2-chloropyridin-4-yl)-1-(morpholin-4-yl)prop-2-en-1-one, (9.009) (2Z)-3-(4-tert-butylphenyl)-3-(2-chloropyridin-4-yl)-1-(morpholin-4-yl)prop-2-en-1-one.

(10) Inhibitors of the lipid and membrane synthesis, for example (10.001) propamocarb, (10.002) propamocarb hydrochloride, (10.003) tolclofos-methyl.

(11) Inhibitors of the melanin biosynthesis, for example (11.001) tricyclazole, (11.002) 2,2,2-trifluoroethyl {3-methyl-1-[(4-methylbenzoyl)amino]butan-2-yl}carbamate.

(12) Inhibitors of the nucleic acid synthesis, for example (12.001) benalaxyl, (12.002) benalaxyl-M (kiralaxyl), (12.003) metalaxyl, (12.004) metalaxyl-M (mefenoxam).

(13) Inhibitors of the signal transduction, for example (13.001) fludioxonil, (13.002) iprodione, (13.003) procymidone, (13.004) proquinazid, (13.005) quinoxyfen, (13.006) vinclozolin.

(14) Compounds capable to act as an uncoupler, for example (14,001) fluazinam, (14,002) meptyldinocap.

(15) Further compounds, for example (15.001) Abscisic acid, (15.002) benthiazole, (15.003) bethoxazin, (15.004) capsimycin, (15.005) carvone, (15.006) chinomethionat, (15.007) cufraneb, (15.008) cyflufenamid, (15.009) cymoxanil, (15.010) cyprosulfamide, (15.011) flutianil, (15.012) fosetyl-aluminium, (15.013) fosetyl-calcium, (15.014) fosetyl-sodium, (15.015) methyl isothiocyanate, (15.016) metrafenone, (15.017) mildiomycin, (15.018) natamycin, (15.019) nickel dimethyldithiocarbamate, (15.020) nitrothal-isopropyl, (15.021) oxamocarb, (15.022) oxathiapiprolin, (15.023) oxyfenthiin, (15.024) pentachlorophenol and salts, (15.025) phosphorous acid and its salts, (15.026) propamocarb-fosetylate, (15.027) pyriofenone (chlazafenone), (15.028) tebufloquin, (15.029) tecloftalam, (15.030) tolnifanide, (15.031) 1-(4-{4-[(5R)-5-(2,6-difluorophenyl)-4,5-dihydro-1,2-oxazol-3-yl]-1,3-thiazol-2-yl}piperidin-1-yl)-2-[5-methyl-3-(trifluoromethyl)-1H-pyrazol-1-yl]ethanone, (15.032) 1-(4-{4-[(5S)-5-(2,6-difluorophenyl)-4,5- dihydro-1,2-oxazol-3-yl]-1,3-thiazol-2-yl}piperidin-1-yl)-2-[5-methyl-3-(trifluoromethyl)-1H-pyrazol-1-yl]ethanone, (15.033) 2-(6-benzylpyridin-2-yl)quinazoline, (15.034) dipymetitrone, (15.035) 2-[3,5-bis(difluoromethyl)-1H-pyrazol-1-yl]-1-[4-(4-{5-[2-(prop-2-yn-1-yloxy)phenyl]-4,5-dihydro-1,2-oxazol-3-yl}-1,3-thiazol-2-yl)piperidin-1-yl]ethanone, (15.036) 2-[3,5-bis(difluoromethyl)-1H-pyrazol-1-yl]-1-[4-(4-{5-[2-chloro-6-(prop-2-yn-1-yloxy)phenyl]-4,5-dihydro-1,2-oxazol-3-yl}-1,3-thiazol-2-yl)piperidin-1-yl]ethanone, (15.037) 2-[3,5-bis(difluoromethyl)-1H-pyrazol-1-yl]-1-[4-(4-{5-[2-fluoro-6-(prop-2-yn-1-yloxy)phenyl]-4,5-dihydro-1,2-oxazol-3-yl}-1,3-thiazol-2-yl)piperidin-1-yl]ethanone, (15.038) 2-[6-(3-fluoro-4-methoxyphenyl)-5-methylpyridin-2-yl]quinazoline, (15.039) 2-{(5R)-3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate, (15.040) 2-{(5S)-3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate, (15.041) Ipflufenoquin, (15.042) 2-{2-fluoro-6-[(8-fluoro-2-methylquinolin-3-yl)oxy]phenyl}propan-2-ol, (15.043) 2-{3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}-3-chlorophenyl methanesulfonate, (15.044) 2-{3-[2-(1-{[3,5-bis(difluoromethyl)-1H-pyrazol-1-yl]acetyl}piperidin-4-yl)-1,3-thiazol-4-yl]-4,5-dihydro-1,2-oxazol-5-yl}phenyl methanesulfonate, (15.045) 2-phenylphenol and salts, (15.046) 3-(4,4,5-trifluoro-3,3-dimethyl-3,4-dihydroisoquinolin-1-yl)quinoline, (15.047) quinofumelin, (15.048) 4-amino-5-fluoropyrimidin-2-ol (tautomeric form: 4-amino-5-fluoropyrimidin-2(1H)-one), (15.049) 4-oxo-4-[(2-phenylethyl)amino]butanoic acid, (15.050) 5-amino-1,3,4-thiadiazole-2-thiol, (15.051) 5-chloro-N'-phenyl-N'-(prop-2-yn-1-yl)thiophene-2-sulfonohydrazide, (15.052) 5-fluoro-2-[(4-fluorobenzyl)oxy]pyrimidin-4-amine, (15.053) 5-fluoro-2-[(4-methylbenzyl)-oxy]pyrimidin-4-amine, (15.054) 9-fluoro-2,2-dimethyl-5-(quinolin-3-yl)-2,3-dihydro-1,4-benzoxazepine, (15.055) but-3-yn-1-yl {6-[({[(Z)-(1-methyl-1H-tetrazol-5-yl)(phenyl)-methylene]amino}oxy)methyl]pyridin-2-yl}carbamate, (15.056) ethyl (2Z)-3-amino-2-cyano-3-phenylacrylate, (15.057) phenazine-1-carboxylic acid, (15.058) propyl 3,4,5-trihydroxybenzoate, (15.059) quinolin-8-ol, (15.060) quinolin-8-ol sulfate (2:1), (15.061) tert-butyl {6-[({[(1-methyl-1H-tetrazol-5-yl)(phenyl)methylene]amino}oxy)methyl]pyridin-2-yl}carbamate, (15.062) 5-fluoro-4-imino-3-methyl-1-[(4-methylphenyl)sulfonyl]-3,4-dihydropyrimidin-2(1H)-one, (15.063) aminopyrifen.

All named mixing partners of the classes (1) to (15) as described here above can be present in the form of the free compound and/or, if their functional groups enable this, an agriculturally acceptable salt thereof.

In other aspects, the composition comprises an insecticide. The insecticide may be selected from any one of the following:

(1) Acetylcholinesterase (AChE) inhibitors, such as, for example, carbamates, for example alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC and xylylcarb; or organophosphates, for example acephate, azamethiphos, azinphos-ethyl, azinphos-methyl, cadusafos, chlorethoxyfos, chlorfenvinphos, chlormephos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothiophosphoryl) salicylate, isoxathion, malathion, mecarbam, methamidophos, methidathion, mevinphos, monocrotophos, naled, omethoate, oxydemeton-methyl, parathion-methyl, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, triclorfon and vamidothion.

(2) GABA-gated chloride channel blockers, such as, for example, cyclodiene-organochlorines, for example chlordane and endosulfan or phenylpyrazoles (fiproles), for example ethiprole and fipronil.

(3) Sodium channel modulators, such as, for example, pyrethroids, e.g., acrinathrin, allethrin, d-cis-trans allethrin, d-trans allethrin, bifenthrin, bioallethrin, bioallethrin s-cyclopentenyl isomer, bioresmethrin, cycloprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin [(1R)-trans-isomer], deltamethrin, empenthrin [(EZ)-(1R)-isomer], esfenvalerate, etofenprox, fenpropathrin, fenvalerate, flucythrinate, flumethrin, tau-fluvalinate, halfenprox, imiprothrin, kadethrin, momfluorothrin, permethrin, phenothrin [(1R)-trans-isomer], prallethrin, pyrethrins (pyrethrum), resmethrin, silafluofen, tefluthrin, tetramethrin, tetramethrin [(1R)-isomer)], tralomethrin and transfluthrin or DDT or methoxychlor.

(4) Nicotinic acetylcholine receptor (nAChR) competitive modulators, such as, for example, neonicotinoids, e.g., acetamiprid, clothianidin, dinotefuran, imidacloprid, nitenpyram, thiacloprid and thiamethoxam or nicotine or sulfoxaflor or flupyradifurone.

(5) Nicotinic acetylcholine receptor (nAChR) allosteric modulators, such as, for example, spinosyns, e.g., spinetoram and spinosad.

(6) Glutamate-gated chloride channel (GluCl) allosteric modulators, such as, for example, avermectins/milbemycins, for example abamectin, emamectin benzoate, lepimectin and milbemectin.

(7) Juvenile hormone mimics, such as, for example, juvenile hormone analogues, e.g., hydroprene, kinoprene and methoprene or fenoxycarb or pyriproxyfen.

(8) Miscellaneous non-specific (multi-site) inhibitors, such as, for example, alkyl halides, e.g., methyl bromide and other alkyl halides; or chloropicrine or sulphuryl fluoride or borax or tartar emetic or methyl isocyanate generators, e.g. diazomet and metam.

(9) Modulators of Chordotonal Organs, such as, for example pymetrozine or flonicamid.

(10) Mite growth inhibitors, such as, for example clofentezine, hexythiazox and diflovidazin or etoxazole.

(11) Microbial disruptors of the insect gut membrane, such as, for example *Bacillus thuringiensis* subspecies *israelensis, Bacillus sphaericus, Bacillus thuringiensis* subspecies *aizawai, Bacillus thuringiensis* subspecies *kurstaki, Bacillus thuringiensis* subspecies *tenebrionis*, and B.t. plant proteins: Cry1Ab, Cry1Ac, Cry1Fa, Cry1A.105, Cry2Ab, Vip3A, mCry3A, Cry3Ab, Cry3Bb, Cry34Ab1/35Ab1.

(12) Inhibitors of mitochondrial ATP synthase, such as, ATP disruptors such as, for example, diafenthiuron or organotin compounds, for example azocyclotin, cyhexatin and fenbutatin oxide or propargite or tetradifon.

(13) Uncouplers of oxidative phosphorylation via disruption of the proton gradient, such as, for example, chlorfenapyr, DNOC and sulfluramid.

(14) Nicotinic acetylcholine receptor channel blockers, such as, for example, bensultap, cartap hydrochloride, thiocylam, and thiosultap-sodium.

(15) Inhibitors of chitin biosynthesis, type 0, such as, for example, bistrifluron, chlorfluazuron, diflubenzuron, flucycloxuron, flufenoxuron, hexaflumuron, lufenuron, novaluron, noviflumuron, teflubenzuron and triflumuron.

(16) Inhibitors of chitin biosynthesis, type 1, for example buprofezin.

(17) Moulting disruptor (in particular for Diptera, i.e., dipterans), such as, for example, cyromazine.

(18) Ecdysone receptor agonists, such as, for example, chromafenozide, halofenozide, methoxyfenozide and tebufenozide.

(19) Octopamine receptor agonists, such as, for example, amitraz.

(20) Mitochondrial complex III electron transport inhibitors, such as, for example, hydramethylnone or acequinocyl or fluacrypyrim.

(21) Mitochondrial complex I electron transport inhibitors, such as, for example from the group of the METI acaricides, e.g., fenazaquin, fenpyroximate, pyrimidifen, pyridaben, tebufenpyrad and tolfenpyrad or rotenone (Derris).

(22) Voltage-dependent sodium channel blockers, such as, for example indoxacarb or metaflumizone.

(23) Inhibitors of acetyl CoA carboxylase, such as, for example, tetronic and tetramic acid derivatives, e.g., spirodiclofen, spiromesifen and spirotetramat.

(24) Mitochondrial complex IV electron transport inhibitors, such as, for example, phosphines, e.g., aluminium phosphide, calcium phosphide, phosphine and zinc phosphide or cyanides, e.g., calcium cyanide, potassium cyanide and sodium cyanide.

(25) Mitochondrial complex II electron transport inhibitors, such as, for example, beta-ketonitrile derivatives, e.g., cyenopyrafen and cyflumetofen and carboxanilides, such as, for example, pyflubumide.

(28) Ryanodine receptor modulators, such as, for example, diamides, e.g., chlorantraniliprole, cyantraniliprole and flubendiamide.

Further active compounds such as, for example, Afidopyropen, Afoxolaner, Azadirachtin, Benclothiaz, Benzoximate, Bifenazate, Broflanilide, Bromopropylate, Chinomethionat, Chloroprallethrin, Cryolite, Cyclaniliprole, Cycloxaprid, Cyhalodiamide, Dicloromezotiaz, Dicofol, epsilon-Metofluthrin, epsilon-Momfluthrin, Flometoquin, Fluazaindolizine, Fluensulfone, Flufenerim, Flufenoxystrobin, Flufiprole, Fluhexafon, Fluopyram, Fluralaner, Fluxametamide, Fufenozide, Guadipyr, Heptafluthrin, Imidaclothiz, Iprodione, kappa-Bifenthrin, kappa-Tefluthrin, Lotilaner, Meperfluthrin, Paichongding, Pyridalyl, Pyrifluquinazon, Pyriminostrobin, Spiro budiclofen, Tetramethylfluthrin, Tetraniliprole, Tetrachlorantraniliprole, Tigolaner, Tioxazafen, Thiofluoximate, Triflumezopyrim and iodomethane; furthermore preparations based on *Bacillus firmus* (I-1582, BIONEEM®, VOTIVO®), and also the following compounds: 1-{2-fluoro-4-methyl-5-[(2,2,2-trifluoroethyl)sulphinyl] phenyl}-3-(trifluoromethyl)-1H-1,2,4-triazole-5-amine (known from WO 2006/043635) (CAS 885026-50-6), {1'-[(2E)-3-(4-chlorophenyl)prop-2-en-1-yl]-5-fluorospiro[indol-3,4'-piperidin]-1(2H)-yl}(2-chloropyridin-4-yl)methanone (known from WO 2003/106457) (CAS 637360-23-7), 2-chloro-N-[2-{1-[(2E)-3-(4-chlorophenyl)prop-2-en-1-yl] piperidin-4-yl}-4-(trifluoromethyl)phenyl]isonicotinamide (known from WO 2006/003494) (CAS 872999-66-1), 3-(4-chloro-2,6-dimethylphenyl)-4-hydroxy-8-methoxy-1,8-diazaspiro[4.5]dec-3-en-2-one (known from WO 2010/052161) (CAS 1225292-17-0), 3-(4-chloro-2,6-dimethylphenyl)-8-methoxy-2-oxo-1,8-diazaspiro[4.5]dec-3-en-4-yl ethyl carbonate (known from EP2647626) (CAS 1440516-42-6) , 4-(but-2-yn-1-yloxy)-6-(3,5-dimethylpiperidin-1-yl)-5-fluoropyrimidine (known from WO 2004/099160) (CAS 792914-58-0), PF1364 (known from JP 2010/018586) (CAS 1204776-60-2), N-[(2E)-1-[(6-chloropyridin-3-yl)methyl]pyridin-2(1H)-ylidene]-2,2,2-trifluoroacetamide (known from WO2012/029672) (CAS 1363400-41-2), (3E)-3-[1-[(6-chloro-3-pyridyl)methyl]-2-pyridylidene]-1,1,1-trifluoro-propan-2-one (known from WO 2013/144213) (CAS 1461743-15-6), N-[3-(benzylcarbamoyl)-4-chlorophenyl]-1-methyl-3-(pentafluoroethyl)-4-(trifluoromethyl)-1H-pyrazole-5-carboxamide (known from WO 2010/051926) (CAS 1226889-14-0), 5-bromo-4-chloro-N-[4-chloro-2-methyl-6-(methylcarbamoyl)phenyl]-2-(3-chloro-2-pyridyl)pyrazole-3-carboxamide (known from CN 103232431) (CAS 1449220-44-3), 4-[5-(3,5-dichlorophenyl)-4,5-dihydro-5-(trifluoromethyl)-3-isoxazolyl]-2-methyl-N-(cis-1-oxido-3-thietanyl)-benzamide, 4-[5-(3,5-dichlorophenyl)-4,5-dihydro-5-(trifluoromethyl)-3-isoxazolyl]-2-methyl-N-(trans-1-oxido-3-thietanyl)-benzamide and 4-[(5S)-5-(3,5-dichlorophenyl)-4,5-dihydro-5-(trifluoromethyl)-3-isoxazolyl]-2-methyl-N-(cis-1-oxido-3-thietanyl)benzamide (known from WO 2013/050317 A1) (CAS 1332628-83-7), N-[3-chloro-1-(3-pyridinyl)-1H-pyrazol-4-yl]-N-ethyl-3-[(3,3,3-trifluoropropyl)sulfinyl]-propanamide, (+)-N-[3-chloro-1-(3-pyridinyl)-1H-pyrazol-4-yl]-N-ethyl-3-[(3,3,3-trifluoropropyl)sulfinyl]-propanamide and (−)-N-[3-chloro-1-(3-pyridinyl)-1H-pyrazol-4-yl]-N-ethyl-3-[(3,3,3-trifluoropropyl)sulfinyl]-propanamide (known from WO 2013/162715 A2, WO 2013/162716 A2, US 2014/0213448 A1) (CAS 1477923-37-7), 5-[[(2E)-3-chloro-2-propen-1-yl]amino]-1-[2,6-dichloro-4-(trifluoromethyl)phenyl]-4-[(trifluoromethyl)sulfinyl]-1H-pyrazole-3-carbonitrile (known from CN 101337937 A) (CAS 1105672-77-2), 3-bromo-N-[4-chloro-2-methyl-6-[(methylamino)thioxomethyl]phenyl]-1-(3-chloro-2-pyridinyl)-1H-pyrazole-5-carboxamide, (Liudaibenjiaxuanan, known from CN 103109816 A) (CAS 1232543-85-9); N-[4-chloro-2-[[(1,1-dimethylethyl)amino]carbonyl]-6-methylphenyl]-1-(3-chloro-2-pyridinyl)-3-(fluoromethoxy)-1H-Pyrazole-5-carboxamide (known from WO 2012/034403 A1) (CAS 1268277-22-0), N-[2-(5-amino-1,3,4-thiadiazol-2-yl)-4-chloro-6-methylphenyl]-3-bromo-1-(3-chloro-2-pyridinyl)-1H-pyrazole-5-carboxamide (known from WO 2011/085575 A1) (CAS 1233882-22-8), 4-[3-[2,6-dichloro-4-[(3,3-dichloro-2-propen-1-yl)oxy]phenoxy]propoxy]-2-methoxy-6-(trifluoromethyl)-pyrimidine (known from CN 101337940 A) (CAS 1108184-52-6); (2E)- and 2(Z)-2-[2-(4-cyanophenyl)-1-[3-(trifluoromethyl)phenyl]ethylidene]-N-[4-(difluoromethoxy)phenyl]-hydrazinecarboxamide (known from CN 101715774 A) (CAS 1232543-85-9); 3-(2,2-dichloroethenyl)-2,2-dimethyl-4-(1H-benzimidazol-2-yl)phenyl-cyclopropanecarboxylic acid ester (known from CN 103524422 A) (CAS 1542271-46-4); (4aS)-7-chloro-2,5-dihydro-2-[[(methoxycarbonyl)[4-[(trifluoromethyl)thio] phenyl]amino]carbonyl]-indeno[1,2-e][1,3,4]oxadiazine-4a (3H)-carboxylic acid methyl ester (known from CN 102391261 A) (CAS 1370358-69-2); 6-deoxy-3-O-ethyl-2, 4-di-O-methyl-, 1-[N-[4-[1-[4-(1,1,2,2,2-pentafluoroethoxy)phenyl]-1H-1,2,4-triazol-3-yl]phenyl]carbamate]-α-L-mannopyranose (known from U.S. Patent Application Publication No. 2014/0275503 A1) (CAS 1181213-14-8); 8-(2-cyclopropylmethoxy-4-trifluoromethyl-phenoxy)-3-(6-trifluoromethyl-pyridazin-3-yl)-3-aza-bicyclo[3.2.1]octane (CAS 1253850-56-4), (8-anti)-8-(2-cyclopropylmethoxy-4-trifluoromethyl-phenoxy)-3-(6-trifluoromethyl-pyridazin-3-yl)-3-aza-bicyclo[3.2.1]octane (CAS 933798-27-7), (8-syn)-8-(2-cyclopropylmethoxy-4-trifluoromethyl-phenoxy)-3-(6-trifluoromethyl-pyridazin-3-yl)-3-aza-bicyclo[3.2.1]octane (known from WO 2007/040280 A1, WO 2007/040282 A1) (CAS 934001-66-8), N-[3-chloro-1-(3-pyridinyl)-1H-pyrazol-4-yl]-N-ethyl-3-[(3,3,3-trifluoropropyl)thio]-propanamide (known from WO 2015/058021 A1, WO 2015/058028 A1) (CAS 1477919-27-9) and N-[4-(aminothioxomethyl)-2-methyl-6-[(methylamino)carbonyl]phenyl]-3-bromo-1-(3-chloro-2-pyridinyl)-1H-pyrazole-5-carboxamide (known from CN 103265527 A) (CAS 1452877-50-7), 5-(1,3-dioxan-2-yl)-4-[[4-(trifluoromethyl)phenyl]methoxy]-pyrimidine (known from WO 2013/115391 A1) (CAS 1449021-97-9), 3-(4-chloro-2,6-dimethylphenyl)-4-hydroxy-8-methoxy-1-methyl-1,8-diazaspiro[4.5]dec-3-en-2-one (known from WO 2010/066780 A1, WO 2011/151146 A1) (CAS 1229023-34-0), 3-(4-chloro-2,6-dimethylphenyl)-8-methoxy-1-methyl-1,8-diazaspiro[4.5]decane-2,4-dione (known from WO 2014/187846 A1) (CAS 1638765-58-8), 3-(4-chloro-2,6-dimethylphenyl)-8-methoxy-1-methyl-2-oxo-1,8-diazaspiro[4.5]dec-3-en-4-yl-carbonic acid ethyl ester (known from WO 2010/066780 A1, WO 2011/151146 A1) (CAS 1229023-00-0), N-[1-[(6-chloro-3-pyridinyl)methyl]-2(1H)-pyridinylidene]-2,2,2-trifluoro-acetamide (known from DE 3639877 A1, WO 2012029672 A1) (CAS 1363400-41-2), [N(E)]-N-[1-[(6-chloro-3-pyridinyl)methyl]-2(1H)-pyridinylidene]-2,2,2-trifluoro-acetamide, (known from WO 2016/005276 A1) (CAS 1689566-03-7), [N(Z)]-N-[1-[(6-chloro-3-pyridinyl)methyl]-2(1H)-pyridinylidene]-2,2,2-trifluoro-acetamide, (CAS 1702305-40-5), 3-endo-3-[2-propoxy-4-(trifluoromethyl)phenoxy]-9-[[5-(trifluoromethyl)-2-pyridinyl]oxy]-9-azabicyclo[3.3.1]nonane (known from WO 2011/105506 A1, WO 2016/133011 A1) (CAS 1332838-17-1).

In yet other embodiments, the composition comprises an herbicide. Examples for herbicides include: acetochlor, acifluorfen, acifluorfen-sodium, aclonifen, alachlor, aldochlor, alloxydim, alloxydim-sodium, ametryn, amicarbazone, amidochlor, amidosulfuron, aminocyclopyrachlor, aminocyclopyrachlor-potassium, aminocyclopyrachlor-methyl, aminopyralid, amitrole, ammoniumsulfamate, anilofos, asulam, atrazine, azafenidin, azimsulfuron, beflubutamid, benazolin, benazolin-ethyl, benfluralin, benfuresate, bensulfuron, bensulfuron-methyl, bensulide, bentazone, benzobicyclon, benzofenap, bicyclopyron, bifenox, bilanafos, bilanafos-sodium, bispyribac, bispyribac-sodium, bromacil, bromobutide, bromofenoxim, bromoxynil, bromoxynil-butyrate, -potassium, -heptanoate, and -octanoate, busoxinone, butachlor, butafenacil, butamifos, butenachlor, butralin, butroxydim, butylate, cafenstrole, carbetamide, carfentrazone, carfentrazone-ethyl, chloramben, chlorbromuron, chlorfenac, chlorfenac-sodium, chlorfenprop, chlorflurenol, chlorflurenol-methyl, chloridazon, chlorimuron, chlorimuron-ethyl, chlorophthalim, chlorotoluron, chlorthal-dimethyl, 3-[5-chloro-4-(trifluormethyl)pyridine-2-yl]-4-hydroxy-1-methylimidazolidine-2-on, chlorsulfuron, cinidon, cinidon-ethyl, cinmethylin, cinosulfuron, clacyfos, clethodim, clodinathp, clodinafop-propargyl, clomazone, clomeprop, clopyralid, cloransulam, cloransulam-methyl, cumyluron, cyanamide, cyanazine, cycloate, cyclopyranil, cyclopyrimorate, cyclosulfamuron, cycloxydim, cyhalofop, cyhalofop-butyl, cyprazine, 2,4-D, 2,4-D-butotyl, -butyl, -dimethylammonium, -diolamin, -ethyl, -2-ethylhexyl, -isobutyl, -isooctyl, -isopropylammonium, -potassium, -triisopropanolammonium, and -trolamine, 2,4-DB, 2,4-DB-butyl, -dimethylammonium, -isooctyl, -potassium, and -sodium, daimuron (dymron), dalapon, dazomet, n-decanol, desmedipham, detosyl-pyrazolate (DTP), dicamba, dichlobenil, 2-(2,4-dichlorobenzyl)-4,4-dimethyl-1,2-oxazolidin-3-one, 2-(2,5-dichlorobenzyl)-4,4-dimethyl-1,2-oxazolidin-3-one, dichlorprop, dichlorprop-P, diclofop, diclofop-methyl, diclofop-P-methyl, diclosulam, difenzoquat, diflufenican, diflufenzopyr, diflufenzopyr-sodium, dimefuron, dimepiperate, dimethachlor, dimethametryn, dimethenamid, dimethenamid-P, dimetrasulfuron, dinitramine, dinoterb, diphenamid, diquat, diquat-dibromid, dithiopyr, diuron, DNOC, endothal, EPTC, esprocarb, ethalfluralin, ethametsulfuron, ethametsulfuron-methyl, ethiozin, ethofumesate, ethoxyfen, ethoxyfen-ethyl, ethoxysulfuron, etobenzanid, F-5231, i.e. N-{2-chloro-4-fluoro-5-[4-(3-fluoropropyl)-5-oxo-4,5-dihydro-1H-tetrazol-1-yl]phenyl}ethanesulfonamide, F-7967, i. e. 3-[7-chloro-5-fluoro-2-(trifluoromethyl)-1H-benzimidazol-4-yl]-1-methyl-6-(trifluoromethyl)pyrimidine-2,4(1H,3H)-dione, fenoxaprop, fenoxaprop-P, fenoxapropethyl, fenoxaprop-P-ethyl, fenoxasulfone, fenquinotrione, fentrazamide, flamprop, flamprop-M-isopropyl, flamprop-M-methyl, flazasulfuron, florasulam, fluazifop, fluazifop-P, fluazifop-butyl, fluazifop-P-butyl, flucarbazone, flucarbazone-sodium, flucetosulfuron, fluchloralin, flufenacet, flufenpyr, flufenpyr-ethyl, flumetsulam, flumiclorac, flumiclorac-pentyl, flumioxazin, fluometuron, flurenol, flurenol-butyl, -dimethylammonium and -methyl, fluoroglycofen, fluoroglycofen-ethyl, flupropanate, flupyrsulfuron, flupyrsulfuron-methyl-sodium, fluridone, flurochloridone, fluroxypyr, fluroxypyr-meptyl, flurtamone, fluthiacet, fluthiacet-methyl, fomesafen, fomesafen-sodium, foramsulfuron, fosamine, glufosinate, glufosinate-ammonium, glufosinate-P-sodium, glufosinate-P-ammonium, glufosinate-P-sodium, glyphosate, glyphosate-ammonium, -isopropylammonium, -diammonium, dimethylammonium, -potassium, -sodium, and -trimesium, H-9201, i.e., O-(2,4-dimethyl-6-nitrophenyl) O-ethyl isopropylphosphoramidothioate, halauxifen, halauxifen-methyl, halosafen, halosulfuron, halosulfuron-methyl, haloxyfop, haloxyfop-P, haloxyfop-ethoxyethyl, haloxyfop-P-ethoxyethyl, haloxyfop-methyl, haloxyfop-P-methyl, hexazinone, HW-02, i.e., 1-(dimethoxyphosphoryl)ethyl-(2,4-dichlorophenoxy)acetate, 4-hydroxy-1-methoxy-5-methyl-3-[4-(trifluormethyl)pyridine-2-yl]imidazolidine-2-on, 4-hydroxy-1-methyl-3-[4-(trifluormethyl)pyridine-2-yl]imidazolidine-2-on, imazamethabenz, imazamethabenz-methyl, imazamox, imazamox-ammonium, imazapic, imazapic-ammonium, imazapyr, imazapyr-isopropylammonium, imazaquin, imazaquin-ammonium, imazethapyr, imazethapyr-immonium, imazosulfuron, indanofan, indaziflam, iodosulfuron, iodosulfuron-methyl-sodium, ioxynil, ioxynil-octanoate, -potassium and -sodium, ipfencarbazone, isoproturon, isouron, isoxaben, isoxaflutole, karbutilate, KUH-043, i.e., 3-({[5-(difluoromethyl)-1-methyl-3-(trifluoromethyl)-1H-pyrazol-4-yl]methyl}sulfonyl)-5,5-dimethyl-4,5-dihydro-1,2-oxazole, ketospiradox, lactofen, lenacil, linuron, MCPA, MCPA-butotyl, -dimethylammonium, -2-ethylhexyl, -isopropylammonium, -potassium, and -sodium, MCPB, MCPB-methyl, -ethyl, and -sodium, mecoprop, mecoprop-sodium, and -butotyl, mecoprop-P, mecoprop-P-butotyl, -dimethylammonium, -2-ethylhexyl, and -potassium, mefenacet, mefluidide, mesosulfuron, mesosulfuron-methyl, mesotrione, methabenzthiazuron, metam, metamifop, metamitron, metazachlor, metazosulfuron, methabenzthiazuron, methiopyrsulfuron, methiozolin, methyl isothiocyanate, metobromuron, metolachlor, S-metolachlor, metosulam, metoxuron, metribuzin, metsulfuron, metsulfuron-methyl, molinat, monolinuron, monosulfuron, monosulfuron-ester, MT-5950, i.e., N-(3-chloro-4-isopropylphenyl)-2-methylpentan amide, NGGC-011, napropamide, NC-310, i.e., [5-(benzyloxy)-1-methyl-1H-pyrazol-4-yl](2,4-dichlorophenyl)methanone, neburon, nicosulfuron, nonanoic acid (pelargonic acid), norflurazon, oleic acid (fatty acids), orbencarb, orthosulfamuron, oryzalin, oxadiargyl, oxadiazon, oxasulfuron, oxaziclomefon, oxyfluorfen, paraquat, paraquat dichloride, pebulate, pendimethalin, penoxsulam, pentachlorphenol, pentoxazone, pethoxamid, petroleum oils, phenmedipham, picloram, picolinafen, pinoxaden, piperophos, pretilachlor, primisulfuron, primisulfuron-methyl, prodiamine, profoxydim, prometon, prometryn, propachlor, propanil, propaquizafop, propazine, propham, propisochlor, propoxycarbazone, propoxycarbazone-sodium, propyrisulfuron, propyzamide, prosulfocarb, prosulfuron, pyraclonil, pyraflufen, pyraflufen-ethyl, pyrasulfotole, pyrazolynate (pyrazolate), pyrazosulfuron, pyrazosulfuron-ethyl, pyrazoxyfen, pyribambenz, pyribambenz-isopropyl, pyribambenz-propyl, pyribenzoxim, pyributicarb, pyridafol, pyridate, pyriftalid, pyriminobac, pyriminobac-methyl, pyrimisulfan, pyrithiobac, pyrithiobac-sodium, pyroxasulfone, pyroxsulam, quinclorac, quinmerac, quinoclamine, quizalofop, quizalofop-ethyl, quizalofop-P, quizalofop-P-ethyl, quizalofop-P-tefuryl, rimsulfuron, saflufenacil, sethoxydim, siduron, simazine, simetryn, SL-261, sulcotrion, sulfentrazone, sulfometuron, sulfometuron-methyl, sulfosulfuron, SYN-523,SYP-249, i.e. 1-ethoxy-3-methyl-1-oxobut-3-en-2-yl 5-[2-chloro-4-(trifluoromethyl)phenoxy]-2-nitrobenzoate, SYP-300, i.e. 1-[7-fluoro-3-oxo-4-(prop-2-yn-1-yl)-3,4-dihydro-2H-1,4-benzoxazin-6-yl]-3-propyl-2-thioxoimidazolidine-4,5-dione, 2,3,6-TBA, TCA (trichloroacetic acid), TCA-sodium, tebuthiuron, tefuryltrione, tembotrione, tepraloxydim, terbacil, terbucarb, terbumeton, terbuthylazin, terbutryn, thenylchlor, thiazopyr, thiencarbazone, thiencarbazone-methyl, thifensulfuron, thifensulfuron-methyl, thiobencarb, tiafenacil, tolpyralate, topramezone, tralkoxydim, triafamone, tri-allate, triasulfuron, triaziflam, tribenuron, tribenuron-methyl, triclopyr, trietazine, trifloxysulfuron, trifloxysulfuron-sodium, trifludimoxazin, trifluralin, triflusulfuron, triflusulfuron-methyl, tritosulfuron, urea sulfate, vernolate, ZJ-0862, i.e. 3,4-dichloro-N-{2-[(4,6-dimethoxypyrimidin-2-yl)oxy]benzyl}aniline, and the following compounds:

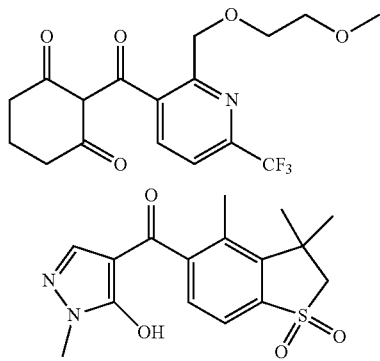

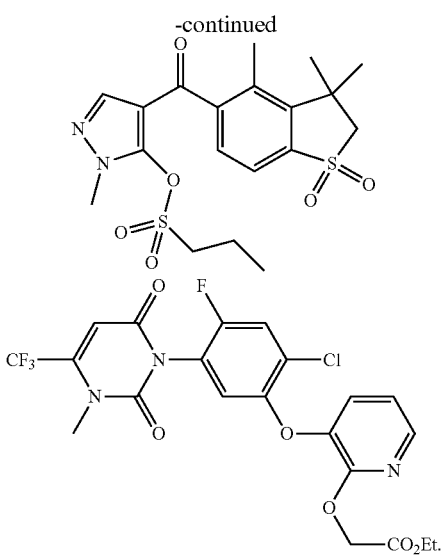

In other aspects, the composition comprises a plant growth regulator. Examples of plant growth regulators include: acibenzolar, acibenzolar-S-methyl, 5-aminolevulinic acid, ancymidol, 6-benzylaminopurine, Brassinolid, catechine, chlormequat chloride, cloprop, cyclanilide, 3-(cycloprop-1-enyl) propionic acid, daminozide, dazomet, n-decanol, dikegulac, dikegulac-sodium, endothal, endothal-dipotassium, -disodium, and -mono(N,N-dimethylalkylammonium), ethephon, flumetralin, flurenol, flurenol-butyl, flurprimidol, forchlorfenuron, gibberellic acid, inabenfide, indol-3-acetic acid (IAA), 4-indol-3-ylbutyric acid, isoprothiolane, probenazole, jasmonic acid, maleic hydrazide, mepiquat chloride, 1-methylcyclopropene, methyl j asmonate, 2-(1-naphthyl)acetamide, 1-naphthylacetic acid, 2-naphthyloxyacetic acid, nitrophenolate-mixture, paclobutrazol, N-(2-phenylethyl)-beta-alanine, N-phenylphthalamic acid, prohexadione, prohexadione-calcium, prohydrojasmone, salicylic acid, strigolactone, tecnazene, thidiazuron, triacontanol, trinexapac, trinexapac-ethyl, tsitodef, uniconazole, uniconazole-P.

Deposit Information

Samples of the *Bacillus* sp. and *Paenibacillus* sp. strains of the invention have been deposited with the Agricultural Research Service Culture Collection located at the National Center for Agricultural Utilization Research, Agricultural Research Service, U.S. Department of Agriculture (NRRL), 1815 North University Street, Peoria, Ill. 61604, U.S.A., under the Budapest Treaty. *Paenibacillus* sp. NRRL B-50972 was deposited on Aug. 28, 2014. *Paenibacillus* sp. NRRL B-67129 was deposited on Sep. 1, 2015. *Paenibacillus* sp. NRRL B-67304 and *Paenibacillus* sp. NRRL B-67304 were both deposited on Jul. 22, 2016. *Paenibacillus* sp. NRRL B-67615 was deposited on May 3, 2018. *Bacillus subtilis* strain QST713 has been deposited on Mar. 17, 1997 and assigned the following depository designation: NRRL B-21661. *Bacillus subtilis* strain QST30002 has been deposited on November 15, 2010, and assigned the following depository designation: NRRL B-50421. *Bacillus subtilis* strain QST30004 has been deposited on Mar. 8, 2011, and assigned the following depository designation: NRRL B-50455.

The *Bacillus* sp. and *Paenibacillus* sp. strains have been deposited under conditions that assure that access to the culture will be available during the pendency of this patent application to one determined by the Commissioner of Patents and Trademarks to be entitled thereto under 37 C.F.R. § 1.14 and 35 U.S.C. § 122. However, it should be understood that the availability of a deposit does not constitute a license to practice the subject invention in derogation of patent rights granted by governmental action.

The following examples are given for purely illustrative and non-limiting purposes of the present invention.

EXAMPLES

Example 1

This example provides an overview of compositions containing representative bioactive compositions with representative structuring agents as described herein.

Composition A-1: A bioactive fermentation broth-based composition containing *Bacillus subtilis* or *Bacillus amyloliquefaciens* QST713 along with natural product chemistry that the biological organism produces was used as a model formulation, hereon referred to as QST713 HiCFU formulation. No structuring agent was added to the QST713 HiCFU formulation. This formulation (2.5 mL) was mixed using 10 inversions with the fertilizer (10-34-0; 247.5 mL, obtained from Plant Food Company Inc. The formulation-fertilizer mixture was left for >2 h under static conditions, and again mixed using five inversions prior to filtering through 50 and 100 mesh stacked screens.

Composition B-1: 2.5% structuring agent (microfibrillar cellulose; EXILVA® FORTE (10%)) was combined with QST713 HiCFU formulation and mixed using an overhead stirrer under low shear condition. The composition thus produced (2.5 mL) was mixed using 10 inversions with the fertilizer (10-34-0; 247.5 mL). The formulation-fertilizer mixture was left for >2 h under static conditions, and again mixed using five inversions prior to filtering through 50 and 100 mesh stacked screens. EXILVA® FORTE was obtained from Borregaard (Norway). EXILVA® FORTE is microfibrillar cellulose designed to ensure good shear thinning capabilities, high water retention values, great surface area, and highly effective multifunctional performance.

Composition C-1: 2.5% structuring agent (microfibrillar cellulose; EXILVA® PIANO (10%)) was combined with QST713 HiCFU formulation and mixed using an overhead stirrer under low shear condition. The composition thus produced (2.5 mL) was mixed using 10 inversions with fertilizer (10-34-0; 247.5 mL). The formulation-fertilizer mixture was left for >2 h under static conditions, and again mixed using five inversions prior to filtering through 50 and 100 mesh stacked screens. EXILVA® PIANO was obtained from Borregaard (Norway). EXILVA® PIANO is microfibrillar cellulose designed to ensure high control of rheology in systems where large/heavy particles create increased complexity in stabilization.

Composition D-1: 2.5% structuring agent (xanthan gum (2%), obtained from) was combined with QST713 HiCFU formulation and mixed using an overhead stirrer under low shear condition. The composition thus produced (2.5 mL) was mixed using ten inversions with fertilizer (10-34-0; 247.5 mL). The formulation-fertilizer mixture was left for >2 h under static conditions, and again mixed using five inversions prior to filtering through 50 and 100 mesh stacked screens.

Composition E-1: 2.5% structuring agent (microfibrillar cellulose; EXILVA® FORTE (10%)) was combined with QST713 HiCFU formulation and mixed using an overhead stirrer under low shear condition. The composition thus produced (2.5 mL) was mixed using ten inversions with the fertilizer (32-0-0; 247.5 mL). The formulation-fertilizer mixture was left for >2 h under static conditions, and again mixed using five inversions prior to filtering through 50 and 100 mesh stacked screens.

Composition F-1: 2.5% structuring agent (microfibrillar cellulose; EXILVA® FORTE (10%)) was combined with QST713 HiCFU formulation and mixed using an overhead stirrer under low shear condition. The composition thus produced (2.5 mL) was mixed using ten inversions with the fertilizer (6-24-6; 247.5 mL). The formulation-fertilizer mixture was left for >2 h under static conditions, and again mixed using five inversions prior to filtering through 50 and 100 mesh stacked screens.

Composition A-2: A suspension concentrate formulation consisting of fluopyram and clothianidin as active ingredients (fluopyram 228 g/L+clothianidin 186 g/L) was used as the second model formulation, hereon referred to as FLU+CTD SC concentrate. The formulation contained an anionic and a non-ionic surface active agent along with other auxiliary formulation components, and did not contain any structuring agent. The FLU+CTD SC concentrate (5 mL) was mixed using ten inversions with the fertilizer (10-34-0; 240 mL). The formulation-fertilizer mixture was stored overnight under static conditions (-16-17 hours) and was again mixed using ten inversions prior to filtering through 50 and 100 mesh stacked screens.

Composition B-2: 5% structural agent (xanthan gum MX (2%)) was combined with FLU+CTD SC concentrate and mixed using an overhead stirrer under low shear condition. The composition thus produced (5 mL) was mixed using ten inversions with the fertilizer (10-34-0; 240 mL). The formulation-fertilizer mixture was stored overnight under static conditions (about 16-17 hours) and was again mixed using ten inversions prior to filtering through 50 and 100 mesh stacked screens.

Composition C-2: 5% structural agent (microfibrillar cellulose; EXILVA® FORTE (10%)) was combined with FLU+CTD SC concentrate and mixed using an overhead stirrer under low shear condition. The composition thus produced (5 mL) was mixed using ten inversions with the fertilizer (10-34-0; 240 mL). The formulation-fertilizer mixture was stored overnight under static conditions (about 16-17 hours) and was again mixed using ten inversions prior to filtering through 50 and 100 mesh stacked screens.

Composition D-2: 5% structural agent (microfibrillar cellulose; EXILVA® PIANO (10%)) was combined with FLU+CTD SC concentrate and mixed using an overhead stirrer under low shear condition. The composition thus produced (5 mL) was mixed using ten inversions with the fertilizer (10-34-0; 240 mL). The formulation-fertilizer mixture was stored overnight under static conditions (about 16-17 hours) and was again mixed using ten inversions prior to filtering through 50 and 100 mesh stacked screens.

Composition E-2: FLU+CTD SC concentrate (5 mL) was mixed using ten inversions with the fertilizer (32-0-0; 240 mL). The formulation-fertilizer mixture was stored overnight under static conditions (about 16-17 hours) and was again mixed using ten inversions prior to filtering through 50 and 100 mesh stacked screens.

Composition F-2: 5% structural agent (xanthan gum MX (2%)) was combined with FLU+CTD SC concentrate and mixed using an overhead stirrer under low shear condition.

The composition thus produced (5 mL) was mixed using ten inversions with the fertilizer (32-0-0; 240 mL). The formulation-fertilizer mixture was stored overnight under static conditions (about 16-17 hours) and was again mixed using ten inversions prior to filtering through 50 and 100 mesh stacked screens.

Composition G-2: 5% structural agent (microfibrillar cellulose; EXILVA® FORTE (10%)) was combined with FLU+CTD SC concentrate and mixed using an overhead stirrer under low shear condition. The composition thus produced (5 mL) was mixed using ten inversions with the fertilizer (32-0-0; 240 mL). The formulation-fertilizer mixture was stored overnight under static conditions (about 16-17 hours) and was again mixed using ten inversions prior to filtering through 50 and 100 mesh stacked screens.

Composition H-2: 5% structural agent (microfibrillar cellulose; EXILVA® PIANO (10%)) was combined with FLU+CTD SC concentrate and mixed using an overhead stirrer under low shear condition. The composition thus produced (5 mL) was mixed using ten inversions with the fertilizer (32-0-0; 240 mL). The formulation-fertilizer mixture was stored overnight under static conditions (about 16-17 hours) and was again mixed using ten inversions prior to filtering through 50 and 100 mesh stacked screens.

Tables 1 and 2 summarize each of the representative compositions listed above. In Table 1, the product-fertilizer ratio is 2.5 mL of product (QST713 HiCFU formulation with or without additional structuring agents) to 247.5 mL fertilizer. In Table 2, the product-fertilizer ratio is 5 mL of product (FLU+CTD SC concentrate with or without additional structuring agents) to 240 mL fertilizer.

TABLE 1

| Composition | Pesticide | Structuring Agent | Fertilizer |
|---|---|---|---|
| A-1 | HiCFU | None | 10-34-0 |
| B-1 | HiCFU | EXILVA® FORTE | 10-34-0 |
| C-1 | HiCFU | EXILVA® PIANO | 10-34-0 |
| D-1 | HiCFU | Xanthan Gum | 10-34-0 |
| E-1 | HiCFU | EXILVA® FORTE | 32-0-0 |
| F-1 | HiCFU | EXILVA® FORTE | 6-24-6 |

TABLE 2

| Composition | Herbicide | Structuring Agent | Fertilizer |
|---|---|---|---|
| A-2 | FLU+CTD SC 474 | None | 10-34-0 |
| B-2 | FLU+CTD SC 474 | Xanthan Gum | 10-34-0 |
| C-2 | FLU+CTD SC 474 | EXILVA® FORTE | 10-34-0 |
| D-2 | FLU+CTD SC 474 | EXILVA® PIANO | 10-34-0 |
| E-2 | FLU+CTD SC 474 | None | 32-0-0 |
| F-2 | FLU+CTD SC 474 | Xanthan Gum | 32-0-0 |
| G-2 | FLU+CTD SC 474 | EXILVA® FORTE | 32-0-0 |
| H-2 | FLU+CTD SC 474 | EXILVA® PIANO | 32-0-0 |

Example 2

This example provides a comparison of fertilizer compatibility with QST713 HiCFU compositions.

After about 18 hours of storage under static conditions, fertilizer compositions comprising HiCFU +/− structural agent (Compositions A1-F1) were analysed for sedimentation. Aliquots of each composition were filtered through stacked 50 mesh and 100 mesh and residue collected on the screens was measured by visual inspection. Visual inspection was rated as +++ being negligible visual residue, whereas −−− being heavy residue on the screen (leading to complete blockage). In an aspect, "+++" refers to negligible visual residue, "++" refers to very little visible residue on the screen, "+" refers to little visible residue, "−" refers to visible residue on the screen such that the mesh screen is slightly blocked and impedes the flow through the mesh screens, "−" refers to significant visible residue on the screen such that the mesh screen is significantly blocked and significantly impedes the flow through the mesh screens, and "−−−" refers to heavy visible residue on the screen such that the mesh screen is completely blocked and severely impedes the flow through the mesh screens to an extent of almost complete blockage. As a representative analysis, "+++" refers to 0% to about 5% visible residue verses the material that passes through the respective mesh, "++" refers to about 6% to about 15% visible residue verses the material that passes through the respective mesh, "+" refers to about 16% to about 25% visible residue verses the material that passes through the respective mesh, "−" refers to about 30% to about 50% visible residue verses the material that passes through the respective mesh, "−−" refers to about 55% to about 75% visible residue verses the material that passes through the respective mesh, and "−−−" refers to about 80% to about 100% visible residue verses the material that passes through the respective mesh. These percentages described before are based on flow of a 250 mL test substance through a U.S. Std. #12 Test Sieve (3" dia.).

The results are presented below in Table 3 and in FIGS. 1-6. Microfibrillar cellulose was compatible with each fertilizer tested. These results indicate that microfibrillar cellulose can be used as a structuring agent for agricultural bioactive compositions, which can be readily mixed with liquid fertilizers. Microfibrillar cellulose was distinctly superior to the commonly used stabilizer, xanthan gum.

TABLE 3

| Composition | Structuring Agent | Fertilizer | 50 Mesh | 100 Mesh |
|---|---|---|---|---|
| A-1 | None | 10-34-0 | + | + |
| B-1 | EXILVA® FORTE | 10-34-0 | ++ | + |
| C-1 | EXILVA® PIANO | 10-34-0 | ++ | + |
| D-1 | Xanthan Gum | 10-34-0 | − | − |
| E-1 | EXILVA® FORTE | 32-0-0 | +++ | +++ |
| F-1 | EXILVA® FORTE | 6-24-6 | ++ | + |

Example 3

This example provides a comparison of fertilizer compatibility with FLU+CTD SC 474 compositions.

After about 16 hours of storage under static conditions, fertilizer compositions comprising FLU+CTD SC 474+/− structural agent (Compositions A2-H2) were analysed for sedimentation. Aliquots of each composition were filtered through 50 mesh or 100 mesh and sedimentation was measured by visual inspection.

The results are presented below in Table 4 and in FIGS. 7-14. Microfibrillar cellulose is a better structuring agent than xanthan gum for fertilizers, particularly fertilizers with high phosphorus content (i.e., 10-34-0). These results further confirm that microfibrillar cellulose can be used as a structuring agent for pesticidal compositions requiring fertilizer compatibility.

TABLE 4

| Composition | Structural Agent | Fertilizer | 50 Mesh | 100 Mesh |
|---|---|---|---|---|
| A-2 | None | 10-34-0 | +++ | ++ |
| B-2 | Xanthan Gum | 10-34-0 | − | − |
| C-2 | EXILVA® FORTE | 10-34-0 | +++ | + |
| D-2 | EXILVA® PIANO | 10-34-0 | +++ | + |
| E-2 | None | 32-0-0 | ++ | + |
| F-2 | Xanthan Gum | 32-0-0 | + | + |
| G-2 | EXILVA® FORTE | 32-0-0 | +++ | − |
| H-2 | EXILVA® PIANO | 32-0-0 | ++ | − |

Example 4

This example provides a comparison of fertilizer compatibility with compositions comprising fermentation products of *Bacillus thuringiensis* or *Bacillus megaterium*. These fermentation products were made from cultures of *Bacillus thuringiensis* or *Bacillus megaterium* containing spores and biological chemistries.

To evaluate the fertilizer compatibility of the formulations with the *Bacillus thuringiensis* or *Bacillus megaterium* fermentation products 2.5% structuring agent was added to each fermentation product and mixed at low shear with an overhead mixer. The structuring agents were 10% EXILVA® PIANO, 10% EXILVA® FORTE, or 2% xanthum gum. 2.5 mL of the mixture of fermentation product and structuring agent was then added to 247.5 mL of fertilizer (i.e., Fertilizer 10-34-0 or Fertilizer 6-24-6) in a graduated cylinder and inverted 10 times. The mixture was allowed to settle for at least 2 hours and then mixed with another 5 inversions prior to filtering through 50 and 100 mesh stacked sieves. After about 18 hours of storage under static conditions, each mixture was analysed with a 50 mesh and a 100 mesh for sedimentation via visual inspection. Visual inspection of sedimentation was rated as outline in Example 2. The *Bacillus thuringiensis* and *Bacillus megaterium* fermentation products alone without structuring agent or fertilizer and the Fertilizer 10-34-0 alone were also evaluated for sedimentation in the same manner.

The results of the analysis are presented in Table 5 and FIGS. 15-20. Analysis of the control samples without any structuring agent indicated that the fermentation products alone did not produce significant deposits whereas the Fertilizer 10-34-0 did as a result of the solids present in the fertilizer. When EXILVA® PIANO or EXILVA® FORTE was the structuring agent with the fermentation products there was consistently less sedimentation with both Fertilizer 10-34-0 and Fertilizer 6-24-6 than when xanthum gum was the structuring agent.

TABLE 5

| Composition | Fertilizer | 50 Mesh | 100 Mesh |
|---|---|---|---|
| *B. thuringiensis* | None | +++ | ++ |
| *B. megaterium* | None | +++ | +++ |
| None | 10-34-0 | – | – |
| *B. thuringiensis* + EXILVA® PIANO | 10-34-0 | + | + |
| *B. thuringiensis* + EXILVA® FORTE | 10-34-0 | +++ | + |
| *B. thuringiensis* + xanthum gum | 10-34-0 | – | – |
| *B. megaterium* + EXILVA® PIANO | 10-34-0 | \| | + |
| *B. megaterium* + EXILVA® FORTE | 10-34-0 | ++ | – |
| *B. megaterium* + xanthum gum | 10-34-0 | – | – |
| *B. thuringiensis* + EXILVA® PIANO | 6-24-6 | +++ | +++ |
| *B. thuringiensis* + EXILVA® FORTE | 6-24-6 | + | +++ |
| *B. thuringiensis* + xanthum gum | 6-24-6 | ++ | ++ |
| *B. megaterium* + EXILVA® PIANO | 6-24-6 | ++ | ++ |
| *B. megaterium* + EXILVA® FORTE | 6-24-6 | ++ | + |
| *B. megaterium* + xanthum gum | 6-24-6 | + | + |

All references cited in this specification are herein incorporated by reference as though each reference was specifically and individually indicated to be incorporated by reference. The citation of any reference is for its disclosure prior to the filing date and should not be construed as an admission that the present disclosure is not entitled to antedate such reference by virtue of prior invention.

It will be understood that each of the elements described above, or two or more together may also find a useful application in other types of methods differing from the type described above. Without further analysis, the foregoing will so fully reveal the gist of the present disclosure that others can, by applying current knowledge, readily adapt it for various applications without omitting features that, from the standpoint of prior art, fairly constitute essential characteristics of the generic or specific aspects of this disclosure set forth in the appended claims. The foregoing embodiments are presented by way of example only; the scope of the present disclosure is to be limited only by the following claims.

What is claimed is:

1. A composition comprising:

a) a *Bacillus* sp. strain and/or a *Paenibacillus* sp. strain;

b) at least one fibril, microfibril, or nanofibril structuring agent, wherein the fibril, microfibril, or nanofibril structuring agent is microfibrillated cellulose; and c) a liquid fertilizer, wherein the liquid fertilizer comprises nitrogen and/or phosphorous.

2. The composition according to claim 1, wherein the *Bacillus* sp. strain is *Bacillus subtilis, Bacillus amyloliquefaciens, Bacillus pumilus, Bacillus megaterium, Bacillus firmus,* or *Bacillus thuringiensis.*

3. The composition according to claim 2, wherein the *Bacillus* sp. strain is *Bacillus subtilis* strain QST713 having Accession No. NRRL B-21661, *Bacillus subtilis* strain QST30002 having Accession No. NRRL B-50421, or *Bacillus subtilis* strain QST30004 having Accession No. NRRL B-50455.

4. The composition according to claim 1, wherein the *Paenibacillus* sp. strain is *Paenibacillus polymyxa* or *Paenibacillus terrae.*

5. The composition according to claim 1, wherein the *Paenibacillus* sp. strain is *Paenibacillus* sp. strain NRRL B-50972, *Paenibacillus* sp. strain NRRL B-67304, *Paenibacillus* sp. strain NRRL B-67306, or *Paenibacillus* sp. strain NRRL B-67615.

6. The composition according to claim 1, further comprising a second structuring agent that is different from the at least one fibril, microfibril, or nanofibril structuring agent.

7. The composition of claim 1, further comprising clay, silica, mica, mineral components, mineral-earth components, polymeric gums, xanthan gum, structuring surfactants, metallic oxides, and combinations thereof.

8. The composition of claim 1, further comprising one or more of: a freeze-thaw stabilizer, a surface active agent, a wetting agent, a biocide, a preservative, a pigment, a buffer, a dye, and an anti-foam agent.

9. The composition according to claim 1, wherein the liquid fertilizer is aqueous-based.

10. The composition according to claim 1, wherein the composition comprises:

a) from about 0.5% to about 65% of a *Bacillus* sp. strain and/or a *Paenibacillus* sp. strain; and
b) from about 0.01% to about 15% of the at least one fibril, microfibril, or nanofibril structuring agent.

11. The composition of claim 1, wherein a) and b) are admixed with c) and the admixed composition is about 10% to about 90% more flowable through a 50 mesh or 100 mesh filter as compared to the same composition without the at least one fibril, microfibril, or nanofibril structuring agent.

12. The composition of claim 1, wherein a) and b) are admixed with c) and the admixed composition is at least about 20% more flowable through a 50 mesh or 100 mesh filter as compared to the same composition with xanthan gum as a structuring agent instead of with the at least one fibril, microfibril, or nanofibril structuring agent.

13. A method for controlling unwanted pests and providing nutrients to plants, comprising applying to an area in need thereof an effective amount of the composition of claim 1.

14. The method of claim 13, wherein the composition comprises at least one surface active agent.

15. The method of claim 13, wherein the liquid fertilizer is aqueous-based.

\* \* \* \* \*